US006476580B1

(12) United States Patent
Nakamiya et al.

(10) Patent No.: US 6,476,580 B1
(45) Date of Patent: Nov. 5, 2002

(54) ELECTRONIC APPARATUS AND CONTROL METHOD FOR ELECTRONIC APPARATUS

(75) Inventors: Shinji Nakamiya, Matsumoto; Teruhiko Fujisawa, Shiojiri; Yoshitaka Iijima, Shiojiri; Kenji Iida, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/701,537

(22) PCT Filed: Mar. 31, 2000

(86) PCT No.: PCT/JP00/02088

§ 371 (c)(1),
(2), (4) Date: Jan. 18, 2001

(87) PCT Pub. No.: WO00/58793

PCT Pub. Date: Oct. 5, 2000

(30) Foreign Application Priority Data

Mar. 31, 1999 (JP) .......................................... 11-094025
Mar. 31, 1999 (JP) .......................................... 11-094026

(51) Int. Cl.[7] ................................................ H02P 8/00

(52) U.S. Cl. ...................... 318/696; 318/685; 368/204; 368/218

(58) Field of Search ................................ 318/560, 599, 318/696, 685, 647; 368/204, 203, 205, 201, 183, 66, 180, 64, 179, 160, 157, 76, 80, 85, 86, 67, 218, 217

(56) References Cited

FOREIGN PATENT DOCUMENTS

| | | |
|---|---|---|
| EP | 0 859 294 A1 | 8/1998 |
| JP | 57-17884 | 1/1982 |
| JP | 10-225191 | 8/1998 |
| JP | 11-6881 | 1/1999 |
| WO | WO98/41906 | 9/1998 |

*Primary Examiner*—Bentsu Ro
*Assistant Examiner*—Edgardo San Martin
(74) *Attorney, Agent, or Firm*—Mark P. Watson

(57) ABSTRACT

In an electronic apparatus including a generator device for generating power, a storage device for storing the generated electric energy, and a motor driven by the electric energy stored in the storage device, it is detected whether a magnetic field is generated by power generation. If it is detected that a magnetic field is generated by power generation, a correcting driving-pulse signal having an effective power larger than a normal driving-pulse signal, which is output for controlling the driving of the motor, is output to the motor. In performing this operation, a determination is made by assuming that a magnetic field is generated while the storage device is in the charging state.

52 Claims, 26 Drawing Sheets

ELECTRONIC APPARATUS AND CONTROL METHOD FOR ELECTRONIC APPARATUS

TECHNICAL FIELD

The present invention relates to an electronic apparatus and a control method therefor, and more preferably, to an electronic apparatus, such as a portable electronic timepiece apparatus, having a built-in storage device and a drive motor, and to a control method for such an electronic apparatus.

BACKGROUND ART

Recently, small electronic timepieces, such as watches, which have a built-in generator device, such as a solar cell, and which can be operated without the need for replacing batteries have been implemented. These electronic timepieces are provided with a function of temporarily charging power generated in the generator device into, for example, a large-capacitance capacitor, and when power is not being generated, time is indicated by the power discharged from the capacitor. Accordingly, such electronic timepieces can be stably operated for a long time without batteries, and considering the effort required to replace batteries and the problem of disposing of them, it can be expected that many electronic timepieces will have a built-in generator device.

As such an electronic timepiece having a built-in generator device, there is an electronic timepiece with a generator device disclosed in International Patent Publication No. WO98/41906.

In this electronic timepiece with a generator device, the presence or the absence of power generation is detected when the rotation of the motor is to be detected. When power generation is detected, correcting driving pulses are output regardless of the detection result of the rotation of the motor, thereby ensuring the reliable rotation of the motor.

The above-described example of related art presents the following problems. The presence or the absence of power generation is detected when the rotation of the motor is to be detected. Accordingly, if power has been continuously generated before the rotation of the motor is detected, the power of normal motor-driving pulses are wasted since correcting driving pulses are output after the normal motor-driving pulses have been output.

Additionally, a power-generation operation detection circuit is provided at the stage subsequent to a rectifier circuit. This means that the power-generation operation detection circuit is provided in a charging path to a secondary power supply. Accordingly, in detecting power generation, charging must be interrupted, thereby lowering the charging efficiency.

Moreover, the amount of generation power which causes a malfunction of the motor is preset by measurements. Thus, every time the mechanical structure of the generator or the motor is changed, the amount of generation power, which can be used as a reference, has to be set by measurements.

Further, since the charging current varies according to the stored voltage of the secondary power supply, an AC magnetic field generated by the generator device is different according to the stored voltage of the secondary power supply.

In the above-described example of related art, the charging path to the secondary power supply is interrupted when power generation is detected. Accordingly, when the stored voltage of the secondary power supply is high, namely, when the AC magnetic field is not easily generated since the charging current is prevented from flowing into the secondary power supply, correcting driving pulses are disadvantageously output although the motor can be driven under normal conditions. As a result, power is wasted.

Additionally, in the above-described example of related art, when an overcharge-prevention circuit for preventing the overcharging of the secondary power supply is operated, the detection result of the power-generation operation detection circuit is fixed in the generating state. Thus, even when the generator device is not generating power so that an AC magnetic field is not generated from the generator device, and even when the motor can be driven under normal conditions, correcting driving pulses are disadvantageously output, thereby wasting power.

Accordingly, it is an object of the present invention to provide an electronic apparatus and a control method therefor in which wasteful power consumption can be reduced and the charging efficiency is not lowered by reliably driving a motor of the electronic apparatus having a generator, and in which the power-generation state can be detected without being influenced by a change in the configuration of the generator or the motor.

SUMMARY OF THE INVENTION

A first aspect of the present invention is characterized by including: a power generating unit for generating power; a storage unit for storing the generated electric energy; a single or a plurality of motors driven by the electric energy stored by the storage unit; a pulse driving control unit for controlling the driving of the motor by outputting a normal driving-pulse signal; a power-generation magnetic-field detection unit for detecting whether a magnetic field is generated by the power generation; and a correcting-driving-pulse output unit for outputting a correcting driving-pulse signal having an effective power larger than the normal driving-pulse signal to the motor when it is detected by the power-generation magnetic-field detection unit that the magnetic field is generated by the power generation. The power-generation magnetic-field detection unit includes a charging-state determining unit for making a determination by assuming that the magnetic field is generated by the power generation when a charging current flows into the storage unit by the power generation of the power generating unit.

A second aspect of the present invention is characterized by including: a power generating unit for generating power; a storage unit for storing the generated electric energy; a single or a plurality of motors driven by the electric energy stored by the storage unit; a pulse driving control unit for controlling the driving of the motor by outputting a normal driving-pulse signal; a power-generation magnetic-field detection unit for detecting whether a magnetic field is generated by the power generation; and a correcting-driving-pulse output unit for outputting a correcting driving-pulse signal having an effective power larger than the normal driving-pulse signal to the motor when it is detected by the power-generation magnetic-field detection unit that the magnetic field is generated by the power generation. The power-generation magnetic-field detection unit includes an overcharging-prevention-current generation determining unit for making a determination by assuming that the magnetic field is generated by the power generation according to an overcharging-prevention current flowing into the power generating unit when the storage unit is in an overcharging-prevention state.

A third aspect of the present invention according to the first aspect of the present invention or the second aspect of the present invention is characterized in that the power-generation magnetic-field detection unit includes a generation-current determining unit for determining whether a value of a generation current output from the power generating unit exceeds a predetermined generation current value.

A fourth aspect of the present invention according to the first aspect of the present invention or the second aspect of the present invention is characterized in that the power-generation magnetic-field detection unit includes a stored-voltage determining unit for calculating a stored voltage of the storage unit based on a generation current output from the power generating unit and for determining whether the stored voltage exceeds a predetermined reference stored voltage.

A fifth aspect of the present invention according to the first aspect of the present invention or the second aspect of the present invention is characterized in that the power generating unit includes a pair of output terminals, and there are provided a comparison unit for outputting a comparison result signal by comparing a voltage of the output terminals of the power generating unit with a predetermined voltage corresponding to a terminal voltage of the storage unit, and a power-generation detection unit for outputting a power-generation detection signal indicating that a generation current flows when the voltage of the output terminals is found to exceed the terminal voltage of the storage unit based on the comparison result signal.

A sixth aspect of the present invention according to the first aspect of the present invention or the second aspect of the present invention is characterized in that the power-generation magnetic-field detection unit determines via a path different from a charging path to the storage unit whether the magnetic field is generated by the power generation, simultaneously with the charging.

A seventh aspect of the present invention according to the first aspect of the present invention or the second aspect of the present invention is characterized by including a rotation detection unit for detecting the presence or the absence of the rotation of the motor. The correcting-driving-pulse output unit includes a first correcting-driving-pulse output unit for outputting a first correcting driving pulse at a first timing when it is detected by the rotation detection unit that the motor is not being rotated, and a second correcting-driving-pulse output unit for outputting a second correcting driving pulse at a second timing, which is different from the first timing, when it is detected by the power-generation magnetic-field detection unit that the magnetic field is generated and when it is detected by the rotation detection unit that the motor is being rotated.

An eighth aspect of the present invention according to the first aspect of the present invention or the second aspect of the present invention is characterized by including a rotation detection unit for detecting the presence or the absence of the rotation of the motor. The correcting-driving-pulse output unit includes a first correcting-driving-pulse output unit for outputting a first correcting driving pulse having a first effective power when it is detected by the rotation detection unit that the motor is not being rotated, and a second correcting-driving-pulse output unit for outputting a second correcting driving pulse having a second effective power, which is larger than the first effective power, when it is detected by the power-generation magnetic-field detection unit that the magnetic field is generated by the power generation and when it is detected by the rotation detection unit that the motor is being rotated.

A ninth aspect of the present invention according to the eighth aspect of the present invention is characterized in that the output timing of the first correcting driving pulse and the output timing of the second correcting driving pulse is the same output timing.

A tenth aspect of the present invention according to the first aspect of the present invention or the second aspect of the present invention is characterized in that the correcting-driving-pulse output unit outputs a correcting driving-pulse signal having an effective power larger than the normal driving-pulse signal to the motor during a predetermined period from the time when it is detected by the power-generation magnetic-field detection unit that the magnetic field is generated by the power generation.

An eleventh aspect of the present invention according to the first aspect of the present invention or the second aspect of the present invention is characterized by including: a rotation detection unit for detecting the presence or the absence of the rotation of the motor; and a rotation-detection inhibiting unit for inhibiting the operation of the rotation detection unit when it is detected by the power-generation magnetic-field detection unit that the magnetic field is generated by the power generation.

A twelfth aspect of the present invention according to the first aspect of the present invention or the second aspect of the present invention is characterized by including a rotation detection unit for detecting the presence or the absence of the motor. The correcting-driving-pulse output unit outputs the correcting driving-pulse signal to the motor regardless of a determination result of the rotation detection unit when it is detected by the power-generation magnetic-field detection unit that the magnetic field is generated by the power generation.

A thirteenth aspect of the present invention according to the first aspect of the present invention or the second aspect of the present invention is characterized in that the power-generation magnetic-field detection unit detects whether the magnetic field is generated by the power generation during a predetermined period.

A fourteenth aspect of the present invention according to the thirteenth aspect of the present invention is characterized in that the predetermined period is set to be a period from the time when an output of a current normal driving-pulse signal is started by the pulse driving control unit to when an output of the subsequent normal driving-pulse signal is started.

A fifteenth aspect of the present invention according to the thirteenth aspect of the present invention is characterized in that the predetermined period is set to include a period corresponding to a detection delay time of the power-generation magnetic-field detection unit.

A sixteenth aspect of the present invention according to the first aspect of the present invention or the second aspect of the present invention is characterized in that the correcting-driving-pulse output unit outputs the correcting driving-pulse signal to the motor instead of the normal driving-pulse signal.

A seventeenth aspect of the present invention according to the seventh aspect of the present invention is characterized in that the first correcting driving pulse and the second correcting driving pulse are the same.

An eighteenth aspect of the present invention according to the first aspect of the present invention through the twelfth aspect of the present invention is characterized in that the power-generation magnetic-field detection unit detects whether the magnetic field is generated by the power generation during a predetermined period, and also sets the start timing of the predetermined period to the rotation-detection start timing of the rotation detection unit.

A nineteenth aspect of the present invention according to the eighteenth aspect of the present invention is characterized in that the predetermined period is set to include a period corresponding to a detection delay time of the power-generation magnetic-field detection unit.

A twentieth aspect of the present invention according to the first aspect of the present invention or the second aspect of the present invention is characterized by including a high-frequency magnetic-field detection unit for detecting a high-frequency magnetic field around the electronic apparatus. The correcting-driving-pulse output unit outputs the correcting driving-pulse signal to the motor regardless of a determination result of the high-frequency magnetic-field detection unit when it is detected by the power-generation magnetic-field detection unit that the magnetic field is generated by the power generation during the predetermined period.

A twenty-first aspect of the present invention according to the first aspect of the present invention or the second aspect of the present invention is characterized by including an alternating-current magnetic-field detection unit for detecting an alternating-current magnetic field around the electronic apparatus. The correcting-driving-pulse output unit outputs the correcting driving-pulse signal to the motor regardless of a determination result of the alternating-current magnetic-field detection unit when it is detected by the power-generation magnetic-field detection unit that the magnetic field is generated by the power generation during the predetermined period.

A twenty-second aspect of the present invention according to the first aspect of the present invention or the second aspect of the present invention is characterized by including: an external magnetic-field detection unit for detecting a high-frequency magnetic field or an alternating-current magnetic field around the motor; and a magnetic-field detection inhibiting unit for inhibiting the operation of the external magnetic-field detection unit when it is detected by the power-generation magnetic-field detection unit that the magnetic field is generated by the power generation during the predetermined period.

A twenty-third aspect of the present invention according to the first aspect of the present invention or the second aspect of the present invention is characterized by including: a duty-ratio setting unit for progressively lowering a duty ratio so as to reduce the effective power of the normal driving pulse based on the driving state of the motor and for setting a more preferable duty ratio; and a duty-ratio control unit for inhibiting the duty ratio from being changed by the duty-ratio setting unit or for resetting the duty ratio to a predetermined initial duty ratio when it is detected by the power-generation magnetic-field detection unit that the magnetic field is generated by the power generation during the predetermined period.

A twenty-fourth aspect of the present invention according to the first aspect of the present invention or the second aspect of the present invention is characterized in that the electronic apparatus is a portable type.

A twenty-fifth aspect of the present invention according to the first aspect of the present invention or the second aspect of the present invention is characterized in that the electronic apparatus includes a timepiece unit for performing a timing operation.

According to a twenty-sixth aspect of the present invention, in a control method for an electronic apparatus which includes a generator device for generating power, a storage device for storing the generated electric energy, and a motor driven by the electric energy stored in the storage device, the control method is characterized by including: a pulse driving control step of controlling the driving of the motor by outputting a normal driving-pulse signal; a power-generation magnetic-field detection step of detecting whether a magnetic field is generated by the power generation; and a correcting-driving-pulse output step of outputting a correcting driving-pulse signal having an effective power larger than the normal driving-pulse signal to the motor when it is detected in the power-generation magnetic-field detection step that the magnetic field is generated by the power generation. The power-generation magnetic-field detection step includes a charging-state determining step of making a determination by assuming that the magnetic field is generated by the power generation when a charging current flows into the storage device by the power generation of the power generator device.

According to a twenty-seventh aspect of the present invention, in a control method for an electronic apparatus which includes a generator device for generating power, a storage device for storing the generated electric energy, and a motor driven by the electric energy stored in the storage device, the control method is characterized by including: a pulse driving control step of controlling the driving of the motor by outputting a normal driving-pulse signal; a power-generation magnetic-field detection step of detecting whether a magnetic field is generated by the power generation; and a correcting-driving-pulse output step of outputting a correcting driving-pulse signal having an effective power larger than the normal driving-pulse signal to the motor when it is detected in the power-generation magnetic-field detection step that the magnetic field is generated by the power generation. The power-generation magnetic-field detection step includes an overcharging-prevention-current generation determining step of making a determination by assuming that the magnetic field is generated by the power generation according to an overcharging-prevention current flowing into the power generator device when the storage device is in an overcharging-prevention state.

DESCRIPTION OF THE PREFERRED EMBODIMENTS

Preferred embodiments of the present invention are described below with reference to the drawings.

[1] FIRST EMBODIMENT

[1.1] Overall Configuration

Figure 1:
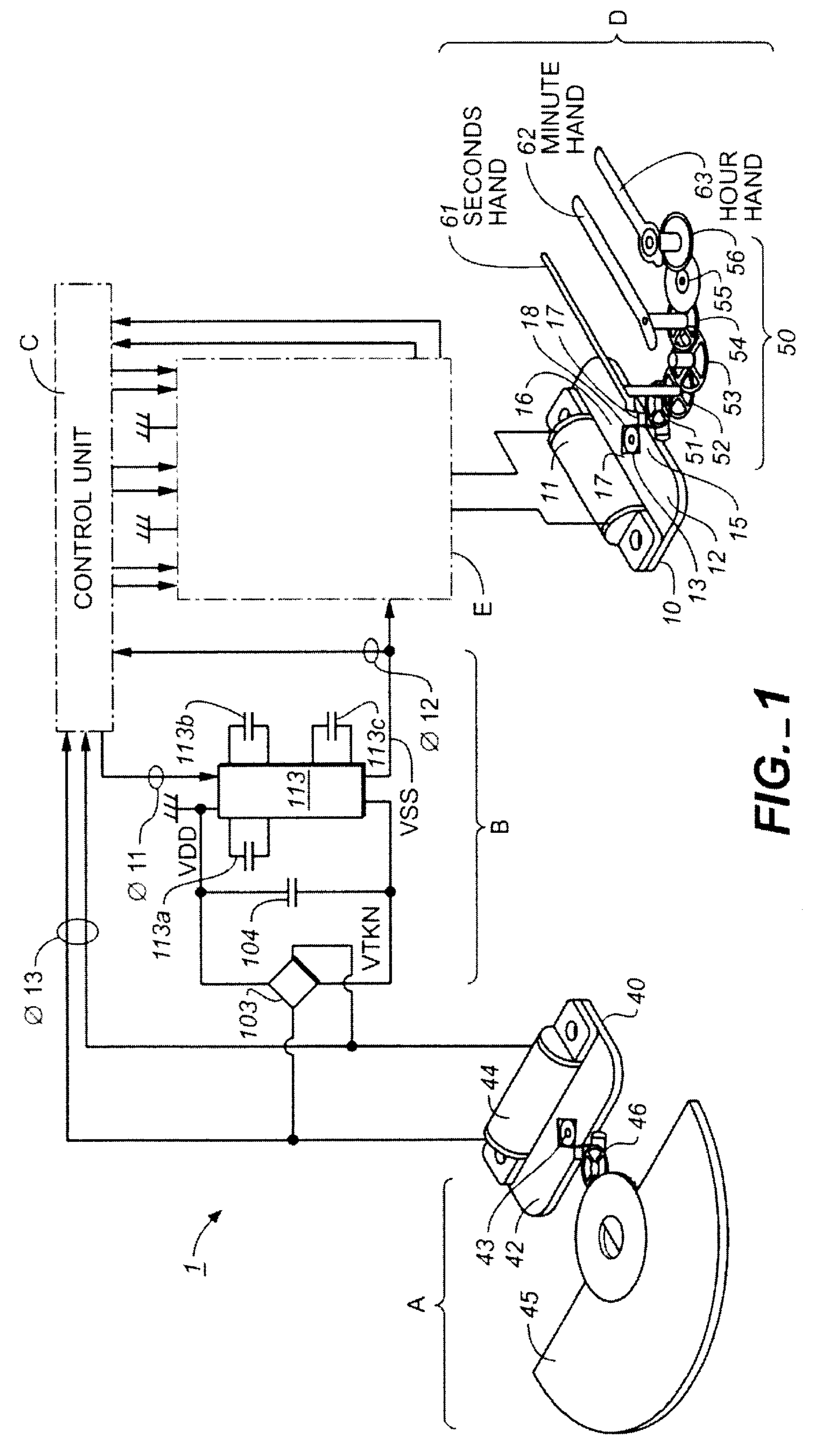
FIG. 1 illustrates the schematic configuration of a timepiece apparatus of an embodiment.

FIG. 1 illustrates a schematic configuration of a timepiece apparatus 1, which is an electronic apparatus of a first embodiment.

The timepiece apparatus 1 is a watch, which is used by a user wearing a strap connected to the main body of the apparatus around the wrist.

The timepiece apparatus 1 is largely formed of a generator unit A for generating AC power, a power supply unit B for rectifying and storing the AC voltage from the generator unit A and for supplying power obtained by increasing or decreasing the stored voltage to the elements of the apparatus, a control unit C for detecting the power generation state of the generator unit A and for controlling the entire apparatus based on a detection result, a hand-moving mechanism D for driving hands, and a driving unit E for driving the hand-moving mechanism D based on a control signal from the control unit C.

In this case, according to the power-generation state of the generator unit A, the control unit C switches between a display mode in which time is indicated by driving the hand-moving mechanism D and a saving mode in which power is saved by interrupting the supply of power to the hand-moving mechanism D. The saving mode is forcefully switched to the display mode by the user shaking the timepiece apparatus 1 by a hand. The individual elements are discussed below. The control unit C is discussed below by using functional blocks.

The generator unit A largely includes a generator device 40, an oscillating weight 45 which oscillates within the device in response to the movement of a user's arm so as to convert kinetic energy to rotational energy, and an accelerating gear 46 for converting (accelerating) the oscillation of the oscillating weight to a required number of oscillations so as to transfer it to the generator device 40.

The oscillations of the oscillating weight 45 are conveyed to a generator rotor 43 via the accelerating gear 46 so as to rotate the generator rotor 43 within a generator stator 42. Accordingly, the generator device 40 serves as an electromagnetic-induction-type AC generator device for outputting power, to the outside, which is induced in a generator coil 44 connected to the generator stator 42.

Thus, the generator unit A generates power by utilizing energy related to user's daily life so as to drive the timepiece apparatus 1 by using the power.

The power supply unit B is formed of a rectifier circuit 103, a storage device (large-capacitance capacitor) 104, and a step-up/down circuit 113.

The step-up/down circuit 113 increases or decreases the voltage in multiple stages by using a plurality of capacitors 113*a*, 113*b*, and 113*c* so as to adjust the voltage to be supplied to the driving unit E by a control signal $\phi$11 from the control unit C. An output voltage of the step-up/down circuit 113 is supplied to the control unit C with a monitor signal $\phi$12, thereby enabling the control unit C to monitor the output voltage and to determine from a small increase or decrease of the output voltage whether the generator unit A is generating power. The power supply unit B sets Vdd (high potential) as a reference potential (GND) and generates VTKN (low potential) as a power supply voltage.

According to the above description, it is detected whether power is generated by monitoring the output voltage of the step-up/down circuit 113 by using the monitor signal $\phi$12. However, in a circuit configuration without a step-up/down circuit, it may be detected whether power is generated by directly monitoring the low-potential power supply voltage VTKN.

The hand-moving mechanism D is as follows. A stepping motor 10 used in the hand-moving mechanism D, which is also referred to as a pulse motor, a stepper motor, a step motor, or a digital motor, is a motor which is often used as an actuator of a digital control unit and is driven by a pulse signal. These days, many smaller and lighter stepping motors are being used as actuators for use in portable-type small electronic apparatuses or information apparatuses.

Typical examples of such electronic apparatuses are timing devices, such as electronic timepieces, time switches, and chronographs.

The stepping motor 10 of this example includes a driving coil 11 for generating a magnetic force by a driving pulse supplied from the driving unit E, a stator 12 excited by this driving coil 11, and a rotor 13 rotated by a magnetic field which is excited within the stator 12. The stepping motor 10 is a PM type (permanent magnet rotation type) in which the rotor 13 is formed of a disc-type bipolar permanent magnet. The stator 12 is provided with a magnetically saturated portion 17 so that different magnetic poles are generated in the corresponding phases (poles) 15 and 16 around the rotor 13 by the magnetic force generated by the driving coil 11. Moreover, in order to define the rotating direction of the rotor 13, an inner notch 18 is provided at a suitable position in the inner circumference of the stator 12, whereby a cogging torque is generated to stop the rotor 13 at a suitable position.

The rotation of the rotor 13 of the stepping motor 10 is conveyed to the individual hands by a wheel train 50, which is formed of a fifth wheel and pinion 51, a fourth wheel and pinion 52, a third wheel and pinion 53, a second wheel and pinion 54, a minute wheel 55, and an hour wheel 56, meshed with the rotor 13 via the pinions. A seconds hand 61 is connected to the shaft of the fourth wheel and pinion 52, a minute hand 62 is connected to the shaft of the second wheel and pinion 54, and an hour hand 63 is connected to the shaft of the hour wheel 56. Time is indicated by these hands, operatively associated with the rotation of the rotor 13. A transfer system (not shown) for displaying the day, month, and year may be connected to the wheel train 50.

Then, the driving unit E supplies various driving pulses to the stepping motor 10 under the control of the control unit C. More specifically, by applying control pulses having different polarities and pulse widths at different times from the control unit C, driving pulses having different polarities, or detection pulses for exciting an induction voltage for detecting the rotation and the magnetic field of the rotor 13, are supplied to the driving coil 11.

[1.2] Functional Configuration of Control System

The functional configuration of the control system is now described.

[1.2.1] Overview of functional configuration of control system

Figure 2:
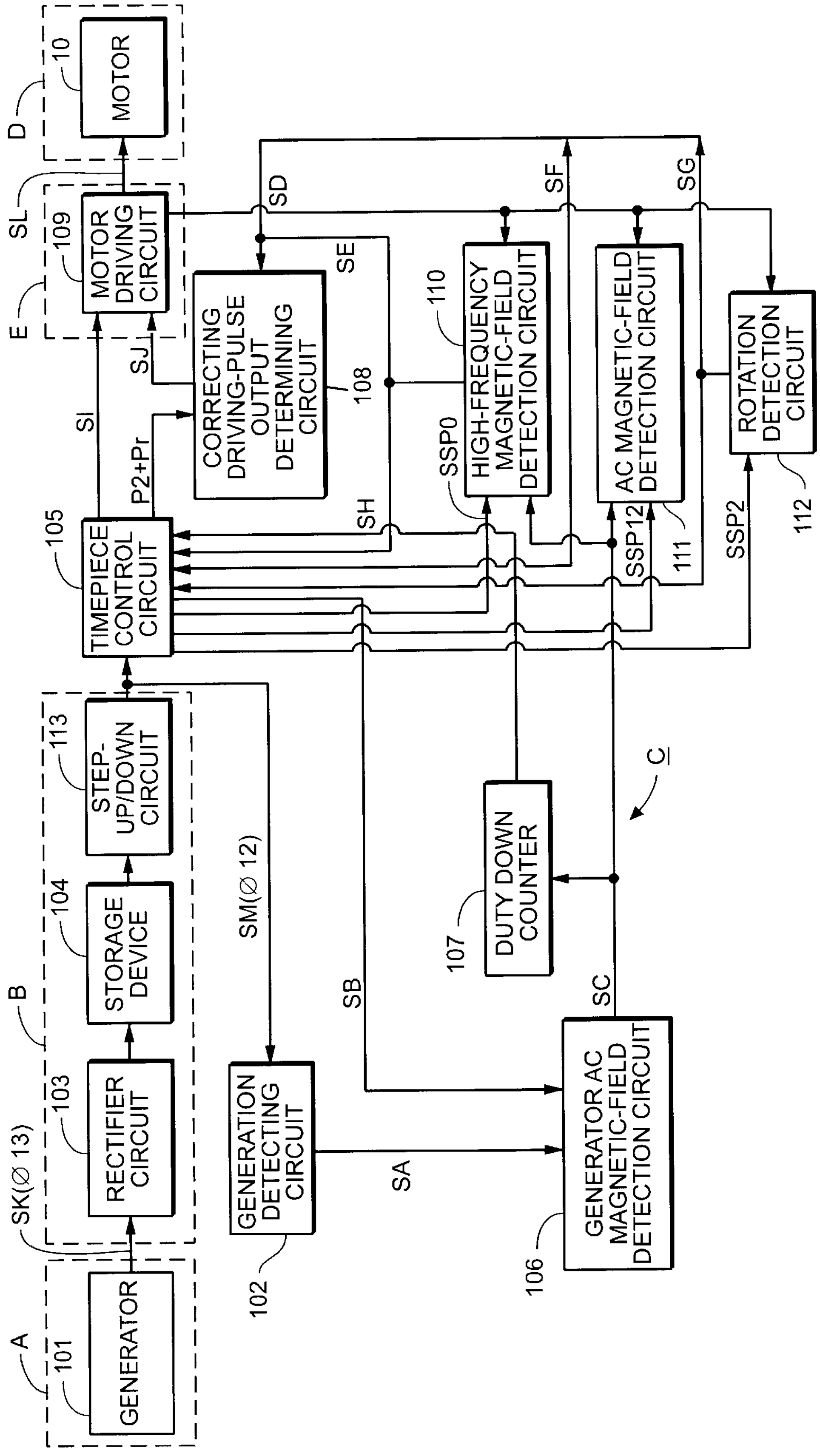
FIG. 2 is a block diagram illustrating the schematic functional configuration of a timepiece apparatus of a first embodiment.

A description is first given, with reference to FIG. 2, of an overview of the functional configuration of the control system used in the first embodiment. In FIG. 2, symbols A through E correspond to the generator unit A, the power supply unit B, the control unit C, the hand-moving mechanism D, and the driving unit E, respectively, shown in FIG. 1.

The timepiece apparatus 1 includes: a generator portion 101 for generating AC power; a generation detecting portion 102 for detecting power generation based on an output voltage monitor signal SM (corresponding to a symbol $\phi$12 in FIG. 1) output from the step-up/down circuit 113, which will be described below, wherein the output voltage monitor signal SM monitors the stored voltage of the storage device 104, which will be described below, and for outputting a generation-detecting result signal SA; the rectifier circuit 103 for rectifying an alternating current output from the generator portion 101 and for converting it to a direct current; the storage device 104 for storing the direct current from the rectifier circuit 103; the step-up/down circuit 113 for increasing or decreasing the stored voltage of the storage device 104 and outputting it, and also for outputting the output voltage monitor signal SM; a timepiece control circuit 105 which is operated by the increased stored voltage or the decreased stored voltage output from the step-up/down circuit 113, and which outputs normal motor-driving pulses SI for performing timepiece control, a generator AC magnetic-field detection timing signal SB for designating the detection timing of the generator AC magnetic field, a high-frequency magnetic-field detection timing signal SSP0 indicating the output timing of a high-frequency magnetic-field detection pulse signal SP0, an AC magnetic-field detection timing signal SSP12 indicating the output timing of AC magnetic-field detection pulse signals SP11 and SP12, and a rotation-detection timing signal SSP2 indicating the output timing of a rotation detection pulse signal SP2; and a generator AC magnetic-field detection circuit 106 for detecting the generator AC magnetic field based on the generation-detecting result signal SA and the generation AC magnetic-field detection timing signal SB, and for outputting a generator AC magnetic-field detection result signal SC.

The timepiece apparatus 1 also includes: a duty down counter 107 for outputting a normal-motor-driving-pulse duty down signal SH for controlling the duty down of the normal motor-driving pulses based on the generator AC magnetic-field detection result signal SC; a correcting-driving-pulse output circuit 108 for determining whether correcting driving pulses SJ are to be output, based on a high-frequency magnetic-field detection result signal SE, an AC magnetic-field detection result signal SF, and a rotation-detection result signal SG, and for outputting correcting driving pulses SJ if necessary; a motor driving circuit 109 for outputting motor driving pulses SL for driving the pulse motor 10, based on the normal motor-driving pulses SI or the correcting driving pulses SJ; a high-frequency magnetic-field detection circuit 110 for detecting a high-frequency magnetic field based on the generator AC magnetic-field detection result signal SC and an induction voltage signal SD output from the motor driving circuit 109, and for outputting the high-frequency magnetic-field detection result signal SE; an AC magnetic-field detection circuit 111 for detecting an AC magnetic field based on the generator AC magnetic-field detection result signal SC and the induction voltage signal SD output from the motor driving circuit 109, and for outputting the AC magnetic-field detection result signal SF; and a rotation detection circuit 112 for detecting whether the motor 10 is rotated based on the induction voltage signal SD output from the motor driving circuit 109, and for outputting the rotation-detection result signal SG.

[1.2.2] Detailed functional configuration of control system

The detailed functional configuration of the control system is discussed below with reference to FIG. 3.

A description is first given of the configuration and the operation of the timepiece control circuit 105.

The timepiece control circuit 105 is formed of: a timepiece controller 105A for controlling the entire timepiece control circuit 105; an AND circuit 105B for receiving normal motor-driving pulses K11 output from the timepiece controller 105A into one input terminal and receiving an inverted signal of the high-frequency magnetic-field detection result signal SE or an inverted signal of the AC magnetic-field detection result signal SF into the other input terminal, and for outputting a logical AND of the two input signals as the normal motor-driving pulses SI; an AND circuit 105C for receiving a rotation-detection timing control signal SCSP2 of the timepiece controller 105A into a first input terminal, receiving an inverted signal of the rotation-detection result signal SG into a second input terminal, and receiving an inverted signal of the high-frequency magnetic-field detection result signal SE or the AC magnetic-field detection result signal SF into a third input terminal, and for outputting a logical AND of all the input signals as the rotation-detection timing signal SSP2; an AND circuit 105D for receiving an AC magnetic-field detection timing control signal SCSP12 into one input terminal and receiving an inverted signal of the high-frequency magnetic-field detection result signal SE or the AC magnetic-field detection result signal SF into the other input terminal; and an AND circuit 105E for receiving a high-frequency magnetic-field detection timing control signal SCSP0 into one input terminal and receiving an inverted signal of the high-frequency magnetic-field detection result signal SE or the AC magnetic-field detection result signal SF into the other input terminal.

An overview of the operation of the timepiece control circuit 105 is as follows.

The timepiece controller 105A outputs the normal motor-driving pulses K11 to the AND circuit 105B at a predetermined timing.

As a result, the AND circuit 105B outputs the normal motor-driving pulses SI (=normal motor-driving pulses K11) to the motor driving circuit 109 when the high-frequency magnetic-field detection result signal SE output from the high-frequency magnetic-field detection circuit 110 is at an "L" level, and when the AC magnetic-field detection result signal SF output form the AC magnetic-field detection circuit 111 is at an "L" level, i.e., when neither a high-frequency magnetic field nor an AC magnetic field is detected.

The timepiece controller 105A also outputs the rotation-detection timing control signal SCSP2, which becomes an "H" level at a predetermined timing, to the AND circuit 105C.

As a result, when the rotation-detection result signal SG is at an "L" level and when the high-frequency magnetic-field detection result signal SE output form the high-frequency magnetic-field detection circuit 110 is at an "L" level, and when the AC magnetic-field detection result signal SF output from the AC magnetic-field detection circuit 111 is at an "L" level, i.e., when neither a high-frequency magnetic field nor an AC magnetic field is detected, and when the "L"-level rotation-detection result signal SG is output, the AND circuit 105C outputs the "H"-level rotation-detection timing signal SSP2 to the rotation detection circuit 112 based on the rotation-detection timing control signal SCSP2 so that the rotation is detected.

Further, the timepiece controller 105A outputs the AC magnetic-field detection timing control signal SCSP12, which becomes an "H" level, to the AND circuit 105D at a predetermined timing.

As a result, when the high-frequency magnetic-field detection result signal SE output from the high-frequency magnetic-field detection circuit 110 is at an "L" level and when the AC magnetic-field detection result signal SF output from the AC magnetic-field detection circuit 111 is at an "L" level, i.e., when neither a high-frequency magnetic field nor an AC magnetic field is detected, the AND circuit 105D outputs the "H"-level magnetic-field detection timing signal SSP12 to the high-frequency magnetic-field detection circuit 110 and the AC magnetic-field detection circuit 111 based on the AC magnetic-field timing control signal SCSP12 so that an AC magnetic field is detected.

The timepiece controller 105A also outputs the high-frequency magnetic-field detection timing control signal SCSP0, which becomes an "H" level at a predetermined timing, to the AND circuit 105E.

As a result, when the high-frequency magnetic-field detection result signal SE output from the high-frequency magnetic-field detection circuit 110 is at an "L" level and when the AC magnetic-field detection result signal SF output from the AC magnetic-field detection circuit 111 is at an "L" level, i.e., when neither a high-frequency magnetic field nor an AC magnetic field is detected, the AND circuit 105E outputs the "H"-level high-frequency magnetic-field detection timing signal SSP0 to the high-frequency magnetic-field detection circuit 110 and the AC magnetic-field detection circuit 111 based on the high-frequency magnetic-field detection timing control signal SCSP0 so that a high-frequency magnetic field is detected.

Subsequently, the configuration and the operation of the generator AC magnetic-field detection circuit 106 is discussed below with reference to FIG. 3.

The generator AC magnetic-field detection circuit 106 is formed of: an AND circuit 106A for receiving the generation-detecting result signal SA into one input terminal and receiving SB into the other input terminal, and for outputting a logical AND of the two input signals; and a latch circuit 106B for receiving an output signal of the AND circuit 106A into a set terminal S and receiving a detection-result reset signal FEGL into a reset terminal R, and for outputting the generator AC magnetic-field detection result signal SC from an output terminal Q.

An overview of the operation of the generator AC magnetic-field detection circuit 106 is as follows.

The timepiece controller 105A outputs the generator AC magnetic-field detection timing signal SB, which becomes an "H" level at a predetermined timing, to the AND circuit 106A.

As a result, when the generation-detecting result signal SA becomes an "H" level by detecting power generation while a generator AC magnetic-field is to be detected, the AND circuit 106A determines that an AC magnetic field is generating from the generator and outputs an "H"-level output signal to the latch circuit 106B.

The latch circuit 106B then outputs the "H"-level generator AC magnetic-field detection result signal SC, indicating that an AC magnetic field generated by the generator has been detected, to the duty down counter 107, the high-frequency magnetic-field detection circuit 110, and the AC magnetic-field detection circuit 111 until the detection-result reset signal FEGL becomes an "H" level to reset the detection result.

Figure 3:
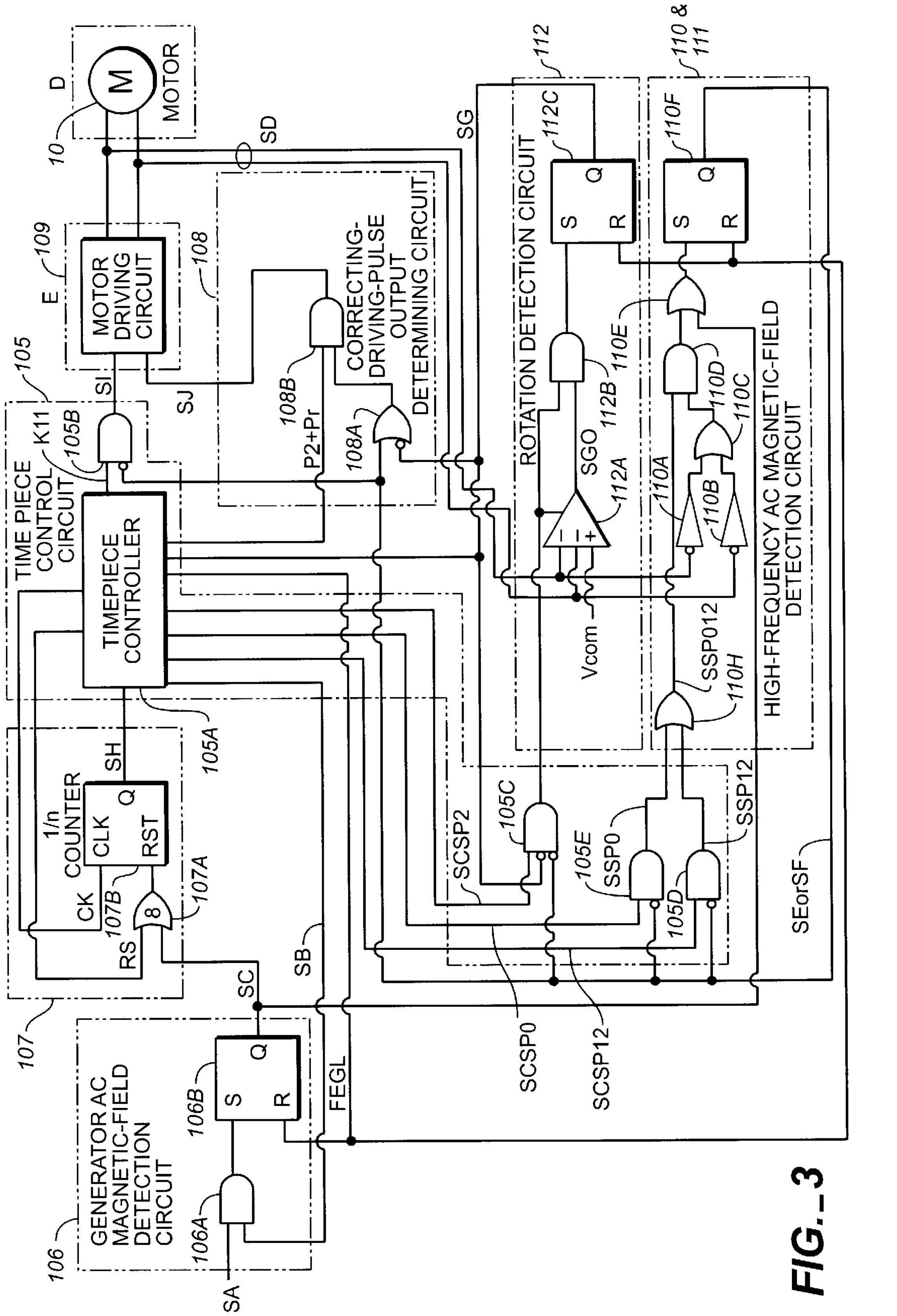
FIG. 3 is a block diagram illustrating the detailed functional configuration of the timepiece apparatus of the first embodiment.

A description is now given of the configuration and the operation of the duty down counter 107 with reference to FIG. 3.

The duty down counter 107 is formed of: an OR circuit 107A for receiving the generator AC magnetic-field detection result signal SC into one input terminal and receiving a reset control signal RS into the other input terminal, and for outputting a logical OR of the two input signals; and a 1/n counter 107B for receiving a clock signal CK from the timepiece control circuit 105 into a clock terminal CLK and for outputting a normal-motor-driving-pulse duty down signal SH from an output terminal Q.

The operation of the duty down counter 107 is discussed below.

The timepiece controller 105A outputs the predetermined clock signal CK to the clock terminal CLK of the 1/n counter 107B.

As a result, the 1/n counter 107B performs counting by dividing the clock signal CK by n, and outputs a counted result to the timepiece controller 105A via the output terminal Q as the normal-motor-driving-pulse duty down signal SH.

Meanwhile, if the "H"-level reset control signal RS is output from the timepiece controller 105A or if the "H"-level generator AC magnetic-field detection result signal SC is output from the generator AC magnetic-field detection circuit 106, the OR circuit 107A outputs an "H"-level output signal so as to reset the counter value of the 1/n counter 107B.

That is, the duty down counter 107 is operated so as not to perform duty down when the reset control signal RS is input from the timepiece controller 105A or when the "H"-level generator AC magnetic-field detection result signal SC is input from the generator AC magnetic-field detection circuit 106.

The configuration and the operation of the rotation detecting circuit 112 is discussed below with reference to FIG. 3. The rotation detection circuit 112 is formed of: a rotation detection comparator 112A which is connected at a first inverting input terminal to one input terminal of the pulse motor 10, and at a second inverting input terminal to the other input terminal of the pulse motor 10, and which receives a comparison reference voltage Vcom into a non-inverting input terminal, and which is operated in response to the rotation-detection timing signal SSP2 output from the timepiece control circuit and outputs a raw rotation-detection result signal SG0; an AND circuit 112B for receiving the rotation-detection timing signal SSP2 into one input terminal and receiving the raw rotation-detection result signal SG0 into the other input terminal, and for outputting a logical AND of the two input signals; and a latch circuit 112C for receiving the raw rotation-detection result signal SG0 from the AND circuit into a set terminal S and receiving the detection-result reset signal FEGL output from the timepiece control circuit 105 into a reset terminal R, and for outputting the rotation-detection result signal SG from an output terminal Q.

The operation of the rotation detection circuit 112 is discussed below.

When neither a high-frequency magnetic field nor an AC magnetic field is detected, and when the "L"-level rotation-detection result signal SG is output, the AND circuit 105C of the timepiece control circuit 105 outputs the "H"-level rotation-detection timing signal SSP2 based on the rotation-detection timing control signal SCSP2 so that rotation is detected. Then, the rotation detection comparator 112A is enabled.

Accordingly, the rotation detection comparator 112A compares the signal voltage level of the first inverting input terminal or the second inverting input terminal with the comparison reference voltage Vcom, and outputs the "H"-level raw rotation-detection result signal SG0 to the AND circuit 112B while the rotation of the pulse motor 10 is being detected.

Consequently, when the rotation-detection timing signal SSP2 becomes an "H" level and when the raw rotation-detection result signal SG0 is an "H" level, namely, when an electromotive force originating from the rotation of the pulse motor 10 is generated while the rotation is being detected, the AND circuit 112B outputs an "H"-level output signal, indicating that the rotation has been detected, to the latch circuit 112C.

As a result, the output terminal Q of the latch circuit 112C outputs the "H"-level rotation-detection result signal SG from the time when the rotation of the pulse motor 10 is detected to when a subsequent detection-result reset signal FEGL becomes an "H" level to reset the detection result.

A description is now given of the configuration and the operation of the high-frequency magnetic-field detection circuit 110 and the AC magnetic-field detection circuit 111 with reference to FIG. 3.

The high-frequency magnetic-field detection circuit 110 and the AC magnetic-field detection circuit 111 are implemented by the same circuit. The high-frequency magnetic-field detection circuit 110 (and the AC magnetic-field detection circuit 111) is formed of: a first magnetic-field detection inverter 110A which is connected at an input terminal to one input terminal of the pulse motor 10 and which inverts the input signal and outputs it; a second magnetic-field detection inverter 110B which is connected at an input terminal to the other input terminal of the pulse motor 10 and which inverts the input signal and outputs it; an OR circuit 110C for receiving the output signal of the first magnetic-field detection inverter into one input terminal and receiving the output signal of the second magnetic-field detection inverter into the other input terminal, and for outputting a logical OR of the two input signals; an AND circuit 110D for receiving a high-frequency/AC magnetic-field detection timing signal SSP012, which will be discussed below, into one input terminal and receiving the output signal of the OR circuit 110C into the other input terminal, and for outputting a logical AND of the two input signals; an OR circuit 110E for receiving the generator AC magnetic-field detection result signal SC into one input terminal and receiving the output signal of the AND circuit 110D into the other input terminal, and for outputting a logical OR of the two input signals; a latch circuit 110F for receiving the output signal of the OR circuit 110E into a set terminal S and receiving the detection-result reset signal FEGL output from the timepiece control circuit 105 into a reset terminal R, and for outputting the high-frequency magnetic-field detection result signal SE (or AC magnetic-field detection result signal SF); and an OR circuit 110H for receiving the high-frequency magnetic-field detection timing signal SSP0 into one input terminal and receiving the AC magnetic-field detection timing signal SSP12 into the other input terminal, and for outputting a logical OR of the two input signals as the high-frequency/AC magnetic-field detection timing signal SSP012.

The operation of the above-described circuit is discussed below by taking the high-frequency magnetic-field detection circuit 110 as an example, and the operation of the AC magnetic-field detection circuit 111 is similar to that of the high-frequency magnetic-field detection circuit 110, except for the detection timing and the detection object.

When the voltage level of one input terminal of the pulse motor 10 becomes an "L" level, the first magnetic-field detection inverter 110A outputs an "H"-level output signal to the OR circuit 110C.

Similarly, when the voltage level of the other input terminal of the pulse motor 10 becomes an "L" level, the second magnetic-field detection inverter 110B outputs an "H"-level output signal to the OR circuit 110C.

As a result, the OR circuit 110C outputs the "H"-level output signal to the AND circuit 110D when the voltage level of one of the input terminals of the pulse motor 10 becomes an "L" level.

When detecting a high-frequency magnetic field, the "H"-level high-frequency magnetic-field detection timing signal SSP0 is input into the OR circuit 110H. When detecting an AC magnetic field, the "H"-level AC magnetic-field detection timing signal SSP12 is input into the OR circuit 110H. Accordingly, the OR circuit 110H outputs the "H"-level high-frequency/AC magnetic-field detection timing signal SSP012 to the AND circuit 110D when detecting a high-frequency magnetic field or an AC magnetic field.

When the high-frequency/AC magnetic-field detection timing signal SSP012 becomes an "H" level, and when an output signal of the OR circuit 110C is at an "H" level, namely, when a high-frequency magnetic field (or AC magnetic field) is generated around the pulse motor 10 when detecting a high-frequency magnetic field (or an AC magnetic field), the AND circuit 110D outputs an "H"-level output signal, indicating that a high-frequency magnetic field (or AC magnetic field) has been detected, to the OR circuit 110E.

Upon receiving the "H"-level output signal, indicating that a high-frequency magnetic field (or AC magnetic field) has been detected, from the AND circuit 110D, or upon receiving an "H"-level generator AC magnetic-field detection result signal SC, indicating that an AC magnetic field generated by the generator has been detected, the OR circuit 110E outputs an output signal, indicating that a high-frequency magnetic field (or AC magnetic field) has been detected, to the latch circuit 110F.

As a result, the output terminal Q of the latch circuit 110F outputs the "H"-level high-frequency magnetic-field detection result signal SE (or AC magnetic-field detection result signal SF) from the time when a high-frequency magnetic field (or AC magnetic field) around the pulse motor 10 is detected to when a subsequent detection-result reset signal FEGL becomes an "H" level to reset the detection result.

The configuration and the operation of the correcting-driving-pulse output determining circuit 108 is described below with reference to FIG. 3.

The correcting-driving-pulse output determining circuit 108 is formed of: an OR circuit 108A for receiving the high-frequency magnetic-field detection result signal SE and the AC magnetic-field detection result signal SF into one input terminal and receiving an inverted signal of the rotation-detection result signal SG into the other input terminal; and an AND circuit 108B for receiving correcting driving pulses P2+Pr into one input terminal and receiving an output signal of the OR circuit 108A into the other input terminal, and for outputting a logical AND of the two input signals to the motor driving circuit 109 as the correcting driving pulses SJ.

The operation of the correcting-driving-pulse output determining circuit 108 is discussed below.

When the "H"-level high-frequency magnetic-field detection result signal SE is input when a high-frequency magnetic field is detected, or when the "H"-level AC magnetic-field detection result signal SF is input when an AC magnetic field is detected, and when the "L"-level rotation-detection result signal SG is input when the rotation of the pulse motor 10 is not detected, the OR circuit 108A outputs an "H"-level output signal to the AND circuit 108B.

When the correcting driving pulses P2+Pr are input, and when the "H"-level output signal is input from the OR circuit 108A, the AND circuit 108B outputs the correcting driving pulses P2+Pr to the motor driving circuit 109 as the correcting driving pulses SJ.

That is, when a high-frequency magnetic field or an AC magnetic field is detected, and when the rotation of the pulse motor 10 is not detected, the correcting-driving-pulse output determining circuit 108 outputs the correcting driving pulses P2+Pr as the correcting driving pulses SJ.

[1.3]

A description is given below of the operation of the timepiece apparatus 1 with reference to the flow chart of FIG. 4.

It is first determined whether one second has elapsed after the timepiece apparatus 1 was reset or the previous driving pulse was output (step S1).

If it is determined in step S1 that one second has not elapsed, it is not the time to output a driving pulse, and thus, the timepiece apparatus 1 enters the waiting state.

If it is determined in step S1 that one second has elapsed, it is determined by the generation detecting circuit 102 whether power generation for charging the storage device 104 has been detected while the high-frequency magnetic-field detection pulse signal SP0 is being output (step S2).

More specifically, the generation detecting circuit 102 detects for power generation, based on the output voltage monitor signal SM (corresponding to the symbol $\phi$12 in FIG. 1) from the step-up/down circuit 113 or based on a change in the stored voltage of the storage device 104, whether the generator portion 101 is generating sufficient power for charging the storage device 104. The generation detecting circuit 102 then outputs the generation-detecting result signal SA to the generator AC magnetic-field detection circuit 106.

[1.3.1] Processing to be performed when power generation for charging the storage device 104 is detected by the generation detecting circuit 102 while the high-frequency magnetic-field detection pulses SP0 are being output is described as follows.

If it is determined in step S2 that power generation for charging the storage device 104 is detected by the generation detecting circuit 102 while the high-frequency magnetic-field detection pulse signal SP0 is being output (step S2; Yes), the duty down counter for lowering the duty ratio so as to reduce the effective power of the normal motor-driving pulses K11 is reset (set to a predetermined initial duty-down-counter value), or counting down of the duty down counter is discontinued (step S7).

In this case, counting by the duty down counter means driving with normal motor-driving pulses K11 of a lower duty ratio when the pulse motor is subsequently driven. However, because of an AC magnetic field from the generator portion 101 for charging the storage device 104, the pulse motor cannot be driven by the normal motor-driving pulses K11, and thus, the output of correcting driving pulses is encouraged.

Accordingly, the duty down counter is reset, or counting down of the duty down counter is discontinued, thereby preventing a reduction in the duty ratio of the normal motor-driving pulses K11 used for subsequently driving the pulse motor.

Then, the output of the high-frequency magnetic-field detection pulses SP0 is discontinued (step S8).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S9). This processing is provided for the case in which a determination at step S3, which will be described below, is Yes, and since the processing has already been executed in step S7, it is not performed in step S9 in practice.

Then, the output of the AC magnetic-field detection pulses SP11 and the AC magnetic-field detection pulses SP12 is discontinued (step S10).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S11). This processing is provided for the case in which a determination at step S4, which will be described below, is Yes, and since the processing has already been executed in step S7, it is not performed in step S11 in practice.

Then, the output of the normal driving motor pulses K11 is discontinued (or suspended) (step S12).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S7, it is not performed in step S13 in practice.

Then, the output of the rotation detection pulses SP2 is discontinued (step S14).

The correcting driving pulses P2+Pr are then output (step S15). In this case, in actuality, the correcting driving pulses P2 drive the pulse motor 10, and the correcting driving pulses Pr are used for speedily shifting the pulse motor to a steady state by inhibiting vibrations after the rotor is rotated after driving the pulse motor.

Then, in order to cancel a residual magnetic flux accompanied by an application of the correcting driving pulses P2+Pr, demagnetizing pulses PE of the opposite polarity to the correcting driving pulses P2+Pr are output (step S16).

The role of the demagnetizing pulses PE is discussed below.

Intrinsically, an induction voltage must be generated in the motor driving coil by a leakage flux of the generator.

However, when the AC magnetic-field detection voltage based on the AC magnetic-field detection pulses exceeds a threshold, by an application of the correcting driving pulses P2+Pr having a large effective power, an induction voltage is not generated in the motor driving coil because of a residual magnetic flux.

Moreover, normally, the detection voltage based on the rotation detection pulses SP2 when the pulse motor is not rotated does not exceed a threshold. However, because of an influence of a residual magnetic flux after applying the correcting driving pulses P2+Pr, a leakage flux of the generator is superimposed on the detection voltage, which thus may exceed the threshold and may be erroneously considered as a detection voltage when the pulse motor is rotated.

Thus, in order to eliminate such an adverse influence, the residual magnetic flux is canceled by the demagnetizing pulses PE having the opposite polarity to the correcting driving pulses P2+Pr.

In this case, it is more effective to output the demagnetizing pulses PE immediately before an external magnetic field is detected.

The pulse width of the demagnetizing pulses PE is narrow (short) enough so as not to rotate the rotor, and a plurality of intermittent pulses may desirably be provided in order to further enhance the demagnetizing effect.

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[1.3.2] Processing to be performed when power generation for charging the storage device 104 is detected by the generation detecting circuit 102 while the AC magnetic-field detection pulses SP11 or the AC magnetic-field detection pulses SP12 are being output If it is determined in step S2 that power generation for charging the storage device 104 has not been detected by the generation detecting circuit 102 while the high-frequency magnetic-field detection pulses SP0 are being output (step S2; No), it is determined whether power generation for charging the storage device 104 has been detected by the generation detecting circuit 102 while the AC magnetic-field detection pulses SP11 or the AC magnetic-field detection pulses SP12 are being output (step S3).

If it is determined in step S3 that power generation for charging the storage device 104 has been detected by the generation detecting circuit 102 while the AC magnetic-field detection pulses SP11 or the AC magnetic-field detection pulses SP12 are being output (step S3; Yes), the duty down counter for lowering the duty ratio so as to reduce the effective power of the normal motor driving pulses K11 is reset (set to a predetermined initial duty-down-counter value), or counting down of the duty down counter is discontinued (step S9).

Then, the output of the AC magnetic-field detection pulses SP11 and the AC magnetic-field detection pulses SP12 is discontinued (step S10).

Subsequently, the duty down counter for lowering the duty ratio so as to reduce the effective power of the normal motor driving pulses K11 is reset (set to a predetermined initial duty-down-counter value), or counting down of the duty down counter is discontinued (step S11). This processing is provided for the case in which a determination at step S4, which will be described below, is Yes, and since the processing has already been executed in step S9, it is not performed in step S11 in practice.

Then, the output of the normal driving motor pulses K11 is discontinued (or suspended) (step S12).

Subsequently, the duty down counter for lowering the duty ratio so as to reduce the effective power of the normal motor driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S9, it is not performed in step S13 in practice.

The output of the rotation detection pulses SP2 is then discontinued (step S14).

Then, the correcting driving pulses P2+Pr are output (step S15). In this case, in actuality, the correcting driving pulses P2 drive the pulse motor 10, and the correcting driving pulses Pr are used for speedily shifting the pulse motor to a steady state by inhibiting vibrations after the rotor is rotated after driving the pulse motor.

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[1.3.3] Processing to be performed when power generation for charging the storage device 104 is detected by the generation detecting circuit 102 while the normal driving pulses K11 are being output If it is determined in step S3 that power generation for charging the storage device 104 by the generation detecting circuit 102 has not been detected while the AC magnetic-field detection pulses SP11 or the AC magnetic-field detection pulses SP12 are being output (step S3; No), it is determined whether power generation for charging the storage device 104 has been detected by the charging detection circuit 102 while the normal driving pulses K11 are being output (step S4).

If it is determined in step S4 that power generation for charging the storage device 104 has been detected by the generation detecting circuit 102 while the normal driving pulses K11 are being output (step S4; yes), the duty down counter for lowering the duty ratio so as to reduce the effective power of the normal motor-driving pulses K11 is reset (set to a predetermined initial duty-down-counter value), or counting down of the duty down counter is discontinued (step S11).

Then, the output of the normal driving pulses K11 is discontinued (or suspended) (step S12).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S11, it is not performed in step S13 in practice.

The output of the rotation detection pulses SP2 is discontinued (step S14).

Then, the correcting driving pulses P2+Pr are output (step S15).

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[1.3.4] Processing to be performed when power generation for charging the storage device 104 has been detected by the generation detecting circuit 102 while the rotation detection pulses SP2 are being output If it is determined in step S4 that power generation for charging the storage device 104 has not been detected by the generation detecting circuit 102 while the normal driving pulses K11 are being output (step S4; No), it is determined whether power generation for charging the storage device 104 has been detected by the generation detecting circuit 102 while the rotation detection pulses SP2 are being output (step S5).

If it is determined in step S5 that power generation for charging the storage device 104 has been detected by the generation detecting circuit 102 while the rotation detection pulses SP2 are being output (step S5; Yes), the duty down counter for lowering the duty ratio so as to reduce the effective power of the normal motor-driving pulses K11 is reset (set to a predetermined initial duty-down-counter value), or counting down of the duty down counter is discontinued (step S13).

The output of the rotation detection pulses SP2 is discontinued (or suspended) (step S14).

The, the correcting driving pulses P2+Pr are output (step S15).

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[1.3.5] Processing to be performed when power generation for charging the storage device 104 has not been detected It is now assumed that power generation for charging the storage device 104 has not been detected while the high-frequency magnetic-field detection pulse signal SP0 is being output (step S2; No), power generation for charging the storage device 104 has not been detected while the AC magnetic-field detection pulses SP11 or the AC magnetic-field detection pulses SP12 are being output (step S3; No), power generation for charging the storage device 104 has not been detected while the normal driving pulses K11 are being output (step S4; No), and power generation for charging the storage device 104 has not been detected while the rotation detection pulses SP2 are being output (step S5; No). In this case, the duty ratio of the subsequent normal driving pulses K11 is reduced from that of the current normal driving pulses K11 if the conditions for reducing the duty ratio are met. On the other hand, if the duty ratio cannot be reduced further, i.e., if the duty ratio is the preset lowest duty ratio, the pulse width is controlled so that the current duty ratio is maintained (step S6).

[1.4] Example of Specific Operation

Figure 5:
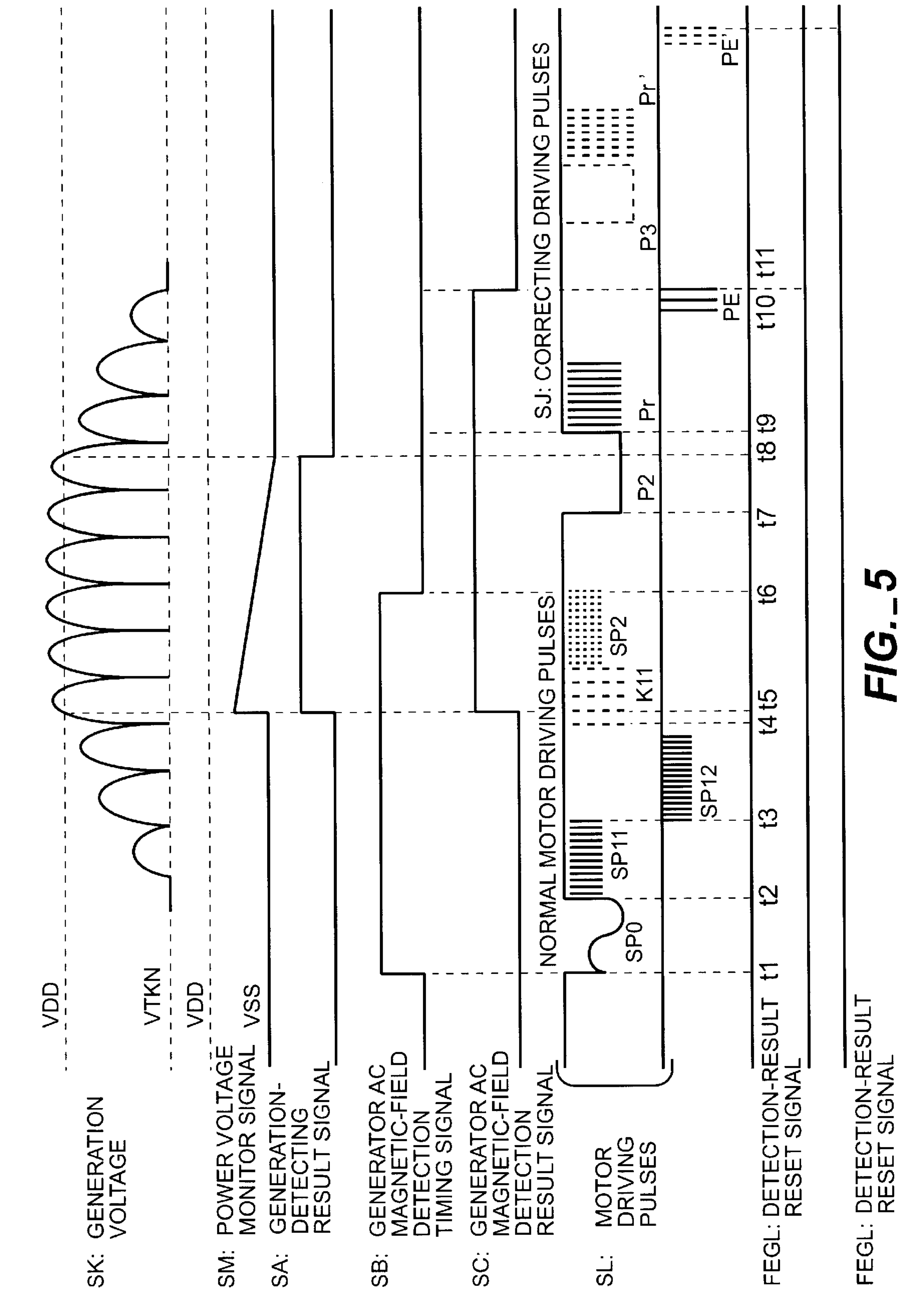
FIG. 5 is a timing chart of the first embodiment.

An example of the specific operation of the first embodiment is described below with reference to the timing chart of FIG. 5.

At time t1, when the generator AC magnetic-field detection timing signal SB becomes an "H" level, the high-frequency magnetic-field detection pulses SP0 are output from the motor driving circuit to the pulse motor 10.

Then, at time t2, the AC magnetic-field detection pulses SP11 having a first polarity are output from the motor driving circuit to the pulse motor 10.

Thereafter, at time t3, the AC magnetic-field detection pulses SP12 having a second polarity opposite to the first polarity are output, and at time t4, the output of the normal motor-driving pulses K11 is started.

At time t5, however, when the generation voltage of the generator portion 101 exceeds the high potential voltage VDD, the output voltage monitor signal SM (VSS) output from the step-up/down circuit 113 enters a non-steady state (or the absolute value thereof increases). Then, the generation-detecting result signal SA becomes an "H" level and the generator AC magnetic-field detection result signal SC becomes an "H" level, and the output of the normal motor-driving pulses K11 is thus discontinued (suspended). The output of the rotation detection pulses SP2 of the pulse motor 10 is also inhibited (discontinued).

Thereafter, at time t6, the generator AC magnetic-field detection timing signal SB becomes an "L" level, and at time 7, a predetermined time has elapsed after the output of the normal driving pulses K11 (corresponding to time t4) started. Then, the correcting driving pulses P2 having an effective power greater than that of the normal driving pulses K11 are output, thereby reliably driving the pulse motor 10.

Then, at time t8, when the generation voltage of the generator portion becomes below the high potential voltage VDD again, the output voltage monitor signal SM (VSS) output from the step-up/down circuit 113 enters a steady state (or the absolute value thereof decreases), and the generation-detecting result signal SA becomes an "L" level again.

At time t9, the correcting driving pulses Pr are output for speedily shifting the pulse motor to a steady state by inhibiting vibrations after the rotor is rotated after driving the pulse motor.

At time t10, in order to cancel a residual magnetic flux accompanied by an application of the correcting driving pulses P2+Pr, the demagnetizing pulses PE of the opposite polarity to the correcting driving pulses P2+Pr are output.

Time t10 is set to be immediately before a subsequent external magnetic field is detected (when the subsequent high-frequency magnetic-field detection pulses SP0 are output).

The pulse width of the demagnetizing pulses PE to be output is narrow (short) enough so as not to rotate the rotor, and a plurality of intermittent pulses (three pulses in FIG. 5) may desirably be provided to further enhance the demagnetizing effect.

At time t11, the output of the demagnetizing pulses PE is completed. Simultaneously, the detection-result reset signal FEGL becomes an "H" level so as to reset the detection results of the generator AC magnetic-field detection circuit 106, the high-frequency magnetic-field detection circuit 110, the AC magnetic-field detection circuit 111, and the rotation detection circuit 112, whereby the generator AC magnetic-field detection result signal SC becomes an "L" level.

As discussed above, unwanted power consumption can be prevented while reliably driving the pulse motor 10.

[1.5] Advantages of First Embodiment

As described above, according to the first embodiment, when conditions for reliably outputting the correcting driving pulses are met, that is, when power generation for charging the storage device 104 is detected by the generation detecting circuit 102 while the high-frequency magnetic-field detection pulses SP0, the AC magnetic-field detection pulses SP11 and SP12, the normal driving pulses K11, or the rotation detection pulses SP2 are being output, the output of the pulses is discontinued, and the output of the subsequent pulses is also inhibited. Thus, the rotation of the motor coil is reliably ensured by the correcting driving pulses. Accordingly, the need for outputting the various pulses SP0, SP11, SP12, K11, and SP2 is eliminated since the reliable rotation of the motor is ensured by the correcting driving pulses, and power required for outputting these pulses can thus be reduced.

Additionally, the generation detecting circuit 102 detects the presence or the absence of power generation for charging the storage device 104 via a path different from the charging path to the secondary cell. It is thus possible to simultaneously perform power generation detection and actual charging processing, and the charging efficiency is not lowered, which may otherwise be incurred upon detecting power generation.

[1.6] Examples of Modifications to First Embodiment

In the foregoing description, the correcting driving pulses to be output when a high-frequency magnetic field or an AC magnetic field is detected and when the rotation is not detected are the same as the correcting driving pulses to be output when power generation for charging the storage device 104 is detected by the generation detecting circuit 102 while the high-frequency magnetic-field detection pulses, the AC magnetic-field detection pulses, the normal driving pulses, or the rotation detection pulses are being output. However, the output of the first correcting driving pulses may be differentiated from that of the second correcting driving pulses, such as a correcting driving pulse signal P3+Pr', indicated by the broken lines in FIG. 5. Alternatively, the effective power of the second correcting driving pulses may be set to be greater than that of the first correcting driving pulses. If the output timing of the correcting driving pulses are differentiated, demagnetizing pulses PE' are then output, as indicated by the broken lines in FIG. 5. In order to increase the effective power, the effective power (pulse peak, number of pulses, pulse width, etc.) of the demagnetizing pulses PE' should be adjusted.

In this case, instead of the detection-result reset signal FEGL, a detection-result reset signal FEGL' (see FIG. 5) should be set to an "H" level in synchronization with the output of the demagnetizing pulses PE', so as to reset the detection result of the generator AC magnetic-field detection circuit 106, the high-frequency magnetic-field detection circuit 110, the AC magnetic-field detection circuit 111, and the rotation detection circuit 112.

[2] SECOND EMBODIMENT

In the foregoing first embodiment, a detection delay of the generation detecting circuit 102 is not considered. In a second embodiment, a detection delay is taken into consideration so as to prevent a detection leakage based on the detection delay.

[2.1] Functional Configuration of Control System

The functional configuration of the control system of the second embodiment is discussed below with reference to FIG. 6.

Figure 6:
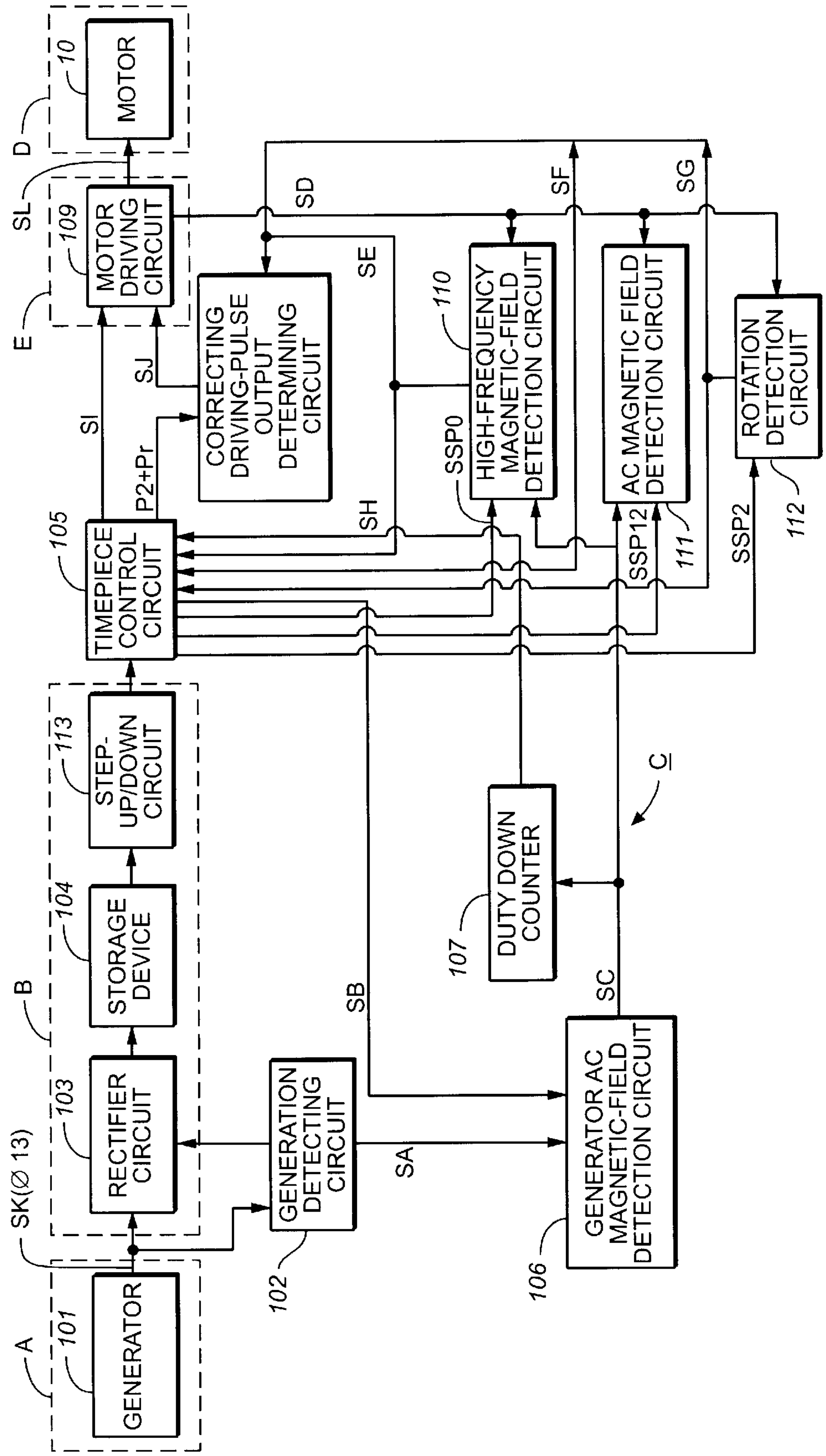
FIG. 6 is a block diagram illustrating the schematic functional configuration of a timepiece apparatus of the second embodiment.

Symbols A through E in FIG. 6 correspond to the generator unit A, the power supply unit B, the control unit C, the hand-moving mechanism D, and the driving unit E, respectively, shown in FIG. 1.

A timepiece apparatus 1 is formed of: a generator portion 101 for generating AC power; a generation detecting circuit 102A for detecting power generation based on a generation voltage SK of the generator portion 101, and for outputting the generation-detecting result signal SA; a rectifier circuit 103 for rectifying an alternating current output from the generator portion 101 and for converting it to a direct current; a storage device 104 for storing the direct current output from the rectifier circuit 103; a step-up/down circuit 113 for increasing or decreasing the stored voltage of the storage device 104 and outputting the voltage; a timepiece control circuit 105 which is operated by the increased stored voltage or the decreased stored voltage output from the step-up/down circuit 113, and which outputs the normal motor-driving pulses SI for performing timepiece control, the generator AC magnetic-field detection timing signal SB for designating the detection timing of a generator AC magnetic field, the high-frequency magnetic-field detection timing signal SSP0 indicating the output timing of the high-frequency magnetic-field detection pulse signal SP0, the AC magnetic-field detection timing signal SSP12 indicating the output timing of the AC magnetic-field detection pulse signals SP11 and SP12, and the rotation-detection timing signal SSP2 indicating the output timing of the rotation detection pulse signal SP2; a generator AC magnetic-field detection circuit 106 for detecting a generator AC magnetic field based on the generation-detecting result signal SA and the generator AC magnetic-field detection timing signal SB, and for outputting the generator AC magnetic-field detection result signal SC; a duty down counter 107 for outputting the normal-motor-driving-pulse duty down signal SH for controlling the duty down of the normal motor-driving pulses based on the generator AC magnetic-field detection result signal SC; a correcting-driving-pulse output circuit 108 for determining whether the correcting driving pulses SJ are to be output, based on the high-frequency magnetic-field detection result signal SE, the AC magnetic-field detection result signal SF, and the rotation-detection result signal SG, and for outputting the correcting driving pulses SJ if necessary; a motor driving circuit 109 for outputting the motor driving pulses SL for driving the pulse motor 10, based on the normal motor driving pulses SI or the correcting driving pulses SJ; a high-frequency magnetic-field detection circuit 110 for detecting a high-frequency magnetic field based on the generator AC magnetic-field detection result signal SC and the induction voltage signal SD output from the motor driving circuit 109, and for outputting the high-frequency magnetic-field detection result signal SE; an AC magnetic-field detection circuit 111 for detecting an AC magnetic field based on the generator AC magnetic-field detection result signal SC and the induction voltage signal SD output from the motor driving circuit 109, and for outputting the AC magnetic-field detection result signal SF; and a rotation detection circuit 112 for detecting whether the motor 10 is rotated based on the induction voltage signal SD output from the motor driving circuit 109, and for outputting the rotation-detection result signal SG.

Figure 7:
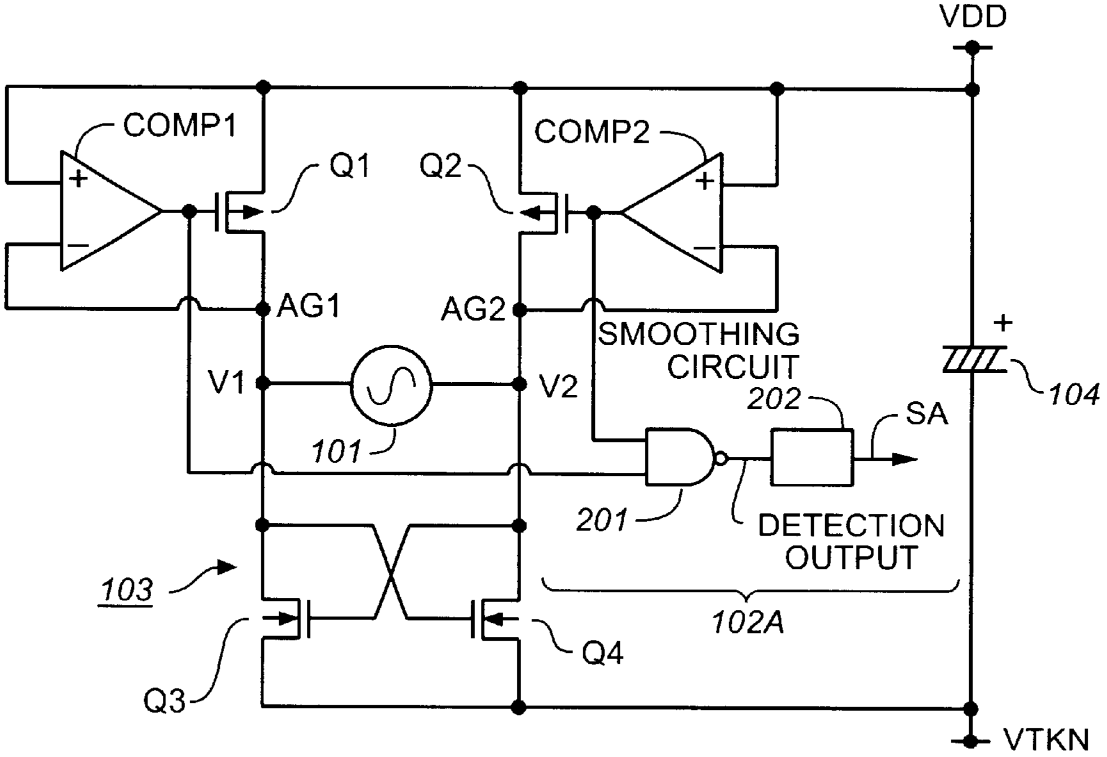
FIG. 7 illustrates the circuit configuration near a generation detecting circuit of the second embodiment.

[2.2] Configuration of Circuits Located Close to Generation Detecting Circuit An example of the configuration of the circuits located close to the generation detecting circuit which causes a detection delay is shown in FIG. 7.

FIG. 7 illustrates the generation detecting circuit 102A, and the peripheral circuits located near the generation detecting circuit 102A, that is, the generator portion 101 for generating AC power, the rectifier circuit 103 for rectifying the alternating current output from the generator portion 101 and for converting it into a direct current, and the storage device 104 for storing the direct current output from the rectifier circuit 103.

The generation detecting circuit 102A is formed of a NAND circuit 201 for outputting the NAND of outputs of a first comparator COMP1 and a second comparator COMP2, which will be discussed below, and a smoothing circuit 202 for smoothing the output of the NAND circuit 201 by using an R-C integrating circuit and for outputting the smoothed output as the generation-detecting result signal SA.

In this case, the generation detecting circuit 102A detects power generation by directly comparing the voltage of an output terminal AG1 (or AG2) of the generator portion 101 with a terminal voltage of the storage device (storage means). However, the voltage of the output terminal AG1 (or AG2) may be compared with a predetermined voltage corresponding to the terminal voltage. For example, a voltage obtained by adding (or subtracting) a predetermined offset to (from) the terminal voltage of the storage device, or a voltage corresponding to the terminal voltage of the storage device, such as an amplified terminal voltage, may be suitably used. Conversely, instead of the voltage of the output terminal AG1 (or AG2), a voltage corresponding to the voltage of the output terminal AG1 (or AG2) may be used.

The rectifier circuit 103 is formed of: the first comparator COMP1 for performing on/off control of a first transistor Q1 by comparing the voltage of one output terminal AG1 of the generator portion 101 with the reference voltage Vdd so as to allow the first transistor Q1 to perform active rectification; the second comparator COMP2 for turning on/off a second transistor Q2 alternately with the transistor Q1 by comparing the other output terminal AG2 of the generator portion 101 with the reference voltage Vdd so as to allow the second transistor Q2 to perform active rectification; a third transistor Q3 which is turned on when the terminal voltage V2 of the terminal AG2 of the generator portion 101 exceeds a predetermined threshold voltage; and a fourth transistor Q4 which is turned on when the terminal voltage V1 of the terminal AG1 of the generator portion 101 exceeds a predetermined threshold voltage.

First, the charging operation is described below.

When the generator portion 101 starts generating power, the generation voltage is supplied to both the output terminals AG1 and AG2. In this case, the phase of the terminal voltage V1 of the output terminal AG1 and the phase of the terminal voltage V2 of the output terminal AG2 are inverted with respect to each other.

When the terminal voltage V1 of the output terminal AG1 exceeds the threshold voltage, the fourth transistor Q4 is turned on. Thereafter, when the terminal voltage V1 increases and exceeds the voltage of the power supply VDD, the output of the first comparator COMP1 becomes an "L" level so as to turn on the first transistor Q1.

On the other hand, since the terminal voltage V2 of the output terminal AG2 is below the threshold voltage, the third transistor Q3 is in the off state, and the terminal voltage V2 is lower than the voltage of the power supply VDD. Thus, the output of the second comparator COMP2 is at an "H" level, and the second transistor Q2 is in the off state.

Accordingly, while the first transistor Q1 is in the on state, the generation current flows in a path "terminal AG1→first transistor→power supply VDD→storage device 104→power supply VTKN→fourth transistor Q4", and the storage device 104 is charged.

Then, when the terminal voltage V1 of the output terminal AG1 drops and becomes lower than the voltage of the power supply VDD, the output of the first comparator COMP1 becomes an "H" level, thereby turning off the first transistor Q1. Accordingly, the terminal voltage V1 of the output terminal AG1 becomes below the threshold voltage of the fourth transistor Q4, thereby turning off the fourth transistor Q4.

In contrast, when the terminal voltage V2 of the output terminal AG2 exceeds the threshold voltage, the third transistor Q3 is turned on. Then, when the terminal voltage V2 increases and exceeds the voltage of the power supply VDD, the output of the second comparator becomes an "L" level, and the second transistor Q2 is turned on.

Accordingly, while the second transistor Q2 is in the on state, the generation current flows in a path "terminal AG2→second transistor Q2→power supply VDD→storage device 104→power supply VTKN→third transistor Q3", and the storage device 104 is charged.

As stated above, when the generation current flows, the output of the first comparator COMP1 or the second comparator COMP2 is at an "L" level.

Thus, the NAND circuit 201 of the generation detecting circuit 102A computes a logical NAND of the outputs of the first comparator COMP1 and the second comparator COMP2, thereby outputting an "H"-level signal to the smoothing circuit 202 while the generation current is flowing.

In this case, the output of the NAND circuit 201 contains switching noise, and thus, the smoothing circuit 202 smoothes the output of the NAND circuit 201 by using the R-C integrating circuit and outputs it as the generation-detecting result signal SA.

The detection signal output from such a generation detecting circuit 102A contains a detection delay because of its configuration. Accordingly, without considering this detection delay, the motor is not rotated correctly due to a detection leakage.

Thus, in the second embodiment, the motor is correctly rotated by taking this detection delay into consideration.

[2.2] Example of Specific Operation

Figure 8:
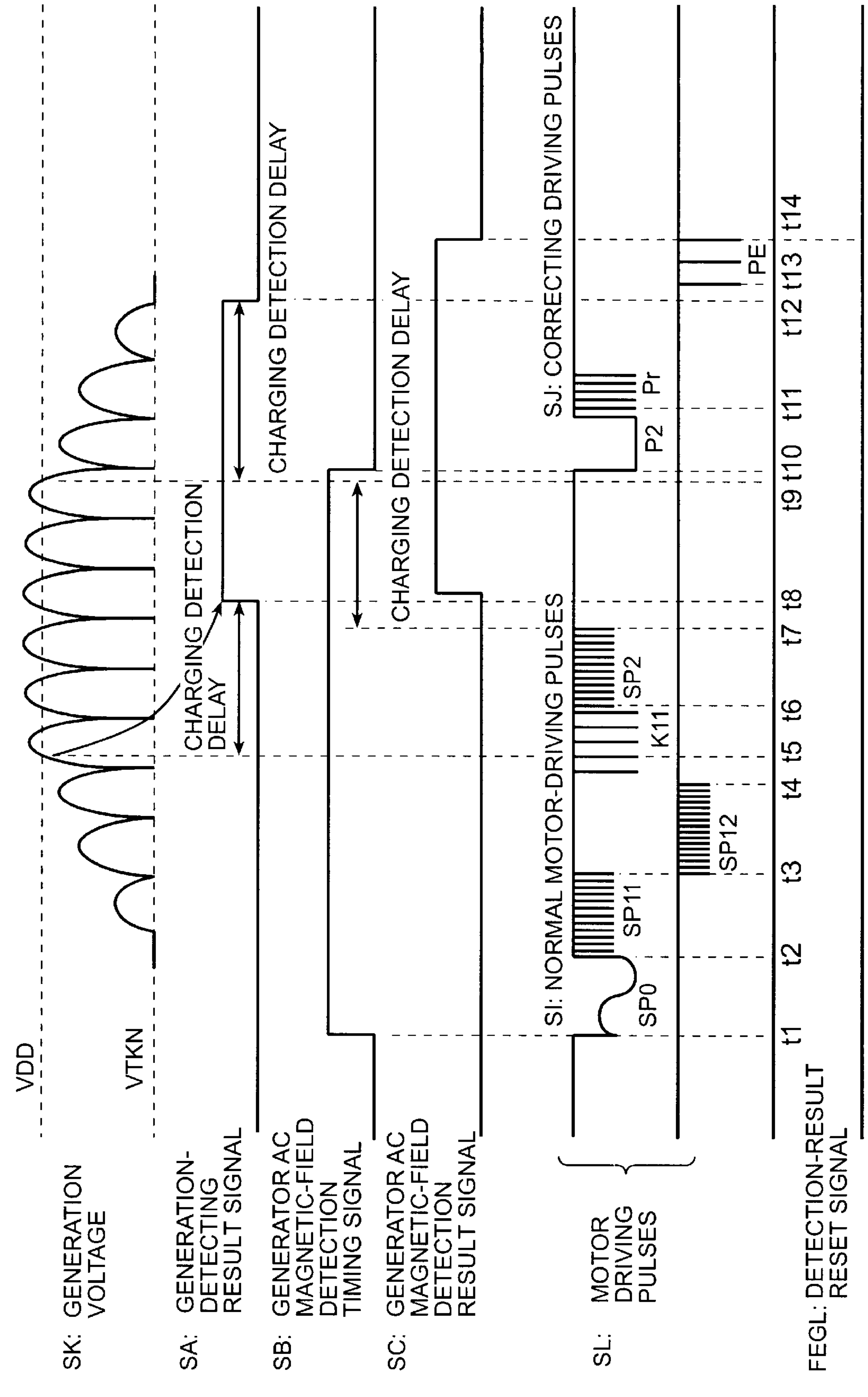
FIG. 8 is a timing chart of the second embodiment.

An example of the specific operation of the second embodiment is described below with reference to the timing chart of FIG. 8.

At time t1, when the generator AC magnetic-field detection timing signal SB becomes an "H" level, the high-frequency magnetic-field detection pulses SP0 are output from the motor driving circuit to the pulse motor 10.

Then, at time t2, the AC magnetic-field detection pulses SP11 having a first polarity are output from the motor driving pulse to the pulse motor 10.

Thereafter, at time t3, the AC magnetic-field detection pulses SP12 having a second polarity opposite to the first polarity are output. At time t4, the output of the normal motor-driving pulses K11 is started.

Then, at time t5, the generation voltage of the generator portion exceeds the high potential voltage VDD. However, the generation-detecting result signal SA is maintained at an "L" level because of a detection delay of the generation detecting circuit 102A.

Thereafter, at time t6, the rotation detection pulses SP2 are output so as to detect whether the pulse motor 10 is rotated, and at time t7, the output of the rotation detection pulses SP2 is discontinued.

At time t8, the generation-detecting result signal SA becomes an "H" level. Although in the first embodiment the generator AC magnetic-field detection timing signal is already at an "L" level at time t7, it is still maintained at an "H" level by taking the detection delay into consideration. Accordingly, the generator magnetic-field detection result signal SC is also at an "H" level.

As a result, at time t9, both of the generation-detecting result signal SA and the generator AC magnetic-field detection result signal SC are maintained at an "H" level even though the generation voltage of the generator portion becomes less than the high potential voltage VDD again. At time t10, the correcting driving pulses P2 having an effective power greater than the normal driving pulses K11 are output, thereby reliably driving the pulse motor 10.

Thereafter, at time t11, the correcting driving pulses Pr for speedily shifting the pulse motor to a steady state by inhibiting vibrations after the rotor is rotated after driving the motor.

At time t12, the generation-detecting result signal SA finally becomes an "L" level after a detection delay from time t9.

Further, at time t13, in order to cancel a residual magnetic flux accompanied by an application of the correcting driving pulses P2+Pr, the demagnetizing pulses PE of the opposite polarity to the correcting driving pulses P2+Pr are output.

Time t13 is set to be immediately before a subsequent external magnetic field is detected (before the subsequent high-frequency magnetic-field detection pulses SP0 are output).

The pulse width of the demagnetizing pulses PE to be output is narrow (short) enough so as not to rotate the rotor, and a plurality of intermittent pulses (three pulses in FIG. 8) may desirably be provided to further enhance the demagnetizing effect.

At time t14, the output of the demagnetizing pulses SE is completed. Simultaneously, the detection-result reset signal FEGL becomes an "H" level so as to reset the detection results of the generator AC magnetic-field detection circuit 106, the high-frequency magnetic-field detection circuit 110, the AC magnetic-field detection circuit 111, and the rotation detection circuit 112, whereby the generator AC magnetic-field detection result signal SC becomes an "L" level.

As discussed above, even with the occurrence of a detection delay in the generation detecting circuit 102A, unwanted power consumption can be prevented while reliably driving the pulse motor 10.

[2.3] Advantages of Second Embodiment

As discussed above, according to the second embodiment, even with the occurrence of a detection delay in the generation detecting circuit 102A, when conditions for reliably outputting the correcting driving pulses are met, that is, when power generation for charging the storage device 104 is detected by the generation detecting circuit 102A while the high-frequency magnetic-field detection pulses SP0, the AC magnetic-field detection pulses SP11 and SP12, the normal driving pulses K11, or the rotation detection pulses SP2 are being output, the output of the pulses is discontinued, and the output of the subsequent pulses is also inhibited. Thus, the rotation of the motor coil is reliably ensured by the correcting driving pulses. Accordingly, the need for outputting the various pulses SP0, SP11, SP12, K11, and SP2 is eliminated since the reliable rotation of the motor is ensured by the correcting driving pulses, and power required for outputting these pulses can thus be reduced.

Additionally, the generation detecting circuit 102A detects the presence or the absence of power generation for charging the storage device 104 via a path different from the charging path to the secondary cell. It is thus possible to simultaneously perform power generation detection and actual charging processing, and the charging efficiency is not lowered, which may otherwise be incurred upon detecting power generation.

[2.4] Examples of Modifications to Second Embodiment

In the foregoing description, the correcting driving pulses to be output when a high-frequency magnetic field or an AC magnetic field is detected and when the rotation is not detected are the same as the correcting driving pulses to be output when power generation for charging the storage device 104 is detected by the generation detecting circuit 102A while the high-frequency magnetic-field detection pulses, the AC magnetic-field detection pulses, the normal driving pulses, or the rotation detection pulses are being output. However, the output of the first correcting driving pulses may be differentiated from that of the second correcting driving pulses, or the effective power of the second correcting driving pulses may be set greater than that of the first correcting driving pulses.

[3] THIRD EMBODIMENT

A detection result of the rotation of the pulse motor, indicating that the pulse motor is rotating, obtained while the generation detecting circuit 102 is detecting power generation for charging the storage device 104, may be wrong because of an influence of charging. In a third embodiment, by considering this point, the correcting driving pulses are output based on the fail-safe concept.

[3.1] Functional Configuration of Control System

[3.1.1] Overview of functional configuration of control system

An overview of the functional configuration of the control system of the third embodiment is described below with reference to FIG. 9.

Figure 9:
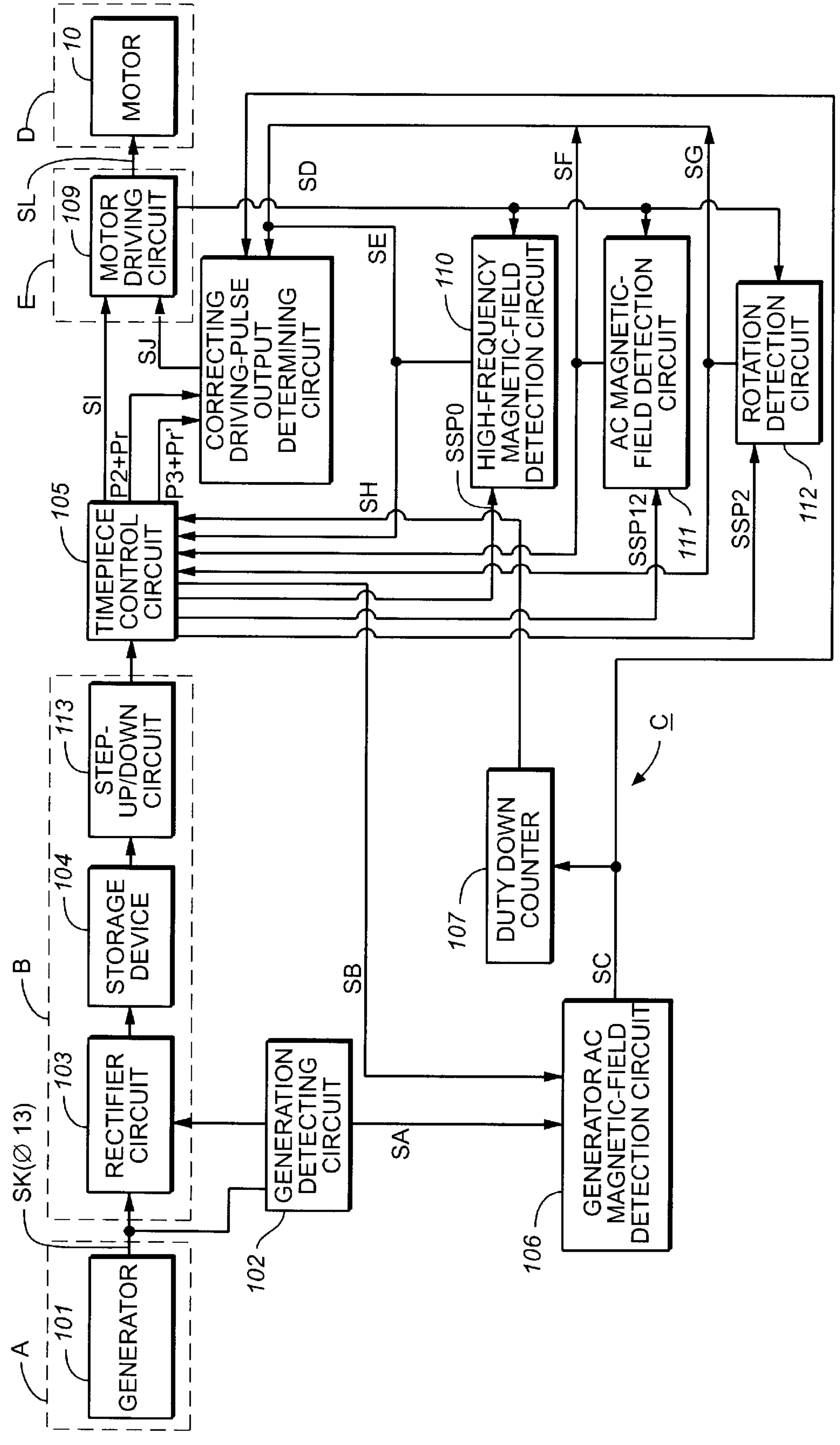
FIG. 9 is a block diagram illustrating the schematic functional configuration of a timepiece apparatus of a third embodiment.

In FIG. 9, symbols A through E correspond to the generator unit A, the power supply unit B, the control unit C, the hand-moving mechanism D, and the driving unit E, respectively, in FIG. 1.

A timepiece apparatus 1 is formed of: a generator portion 101 for generating AC power; a generation detecting circuit 102A for detecting power generation based on a generation voltage SK of the generator portion 101, and for outputting the generation-detecting result signal SA; a rectifier circuit 103 for rectifying an alternating current output from the generator portion 101 and for converting it to a direct current; a storage device 104 for storing the direct current output from the rectifier circuit 103; a step-up/down circuit 113 for increasing or decreasing the stored voltage of the storage device 104 and outputting the voltage; a timepiece control circuit 105 which is operated by the increased stored voltage or the decreased stored voltage output from the step-up/down circuit 113, and which outputs the normal motor-driving pulses SI for performing timepiece control, the generator AC magnetic-field detection timing signal SB for designating the detection timing of a generator AC magnetic field, the high-frequency magnetic-field detection timing signal SSP0 indicating the output timing of the high-frequency magnetic-field detection pulse signal SP0, the AC magnetic-field detection timing signal SSP12 indicating the output timing of the AC magnetic-field detection pulse signals SP11 and SP12, and the rotation-detection timing signal SSP2 indicating the output timing of the rotation detection pulse signal SP2; a generator AC magnetic-field detection circuit 106 for detecting a generator AC magnetic field based on the generation-detecting result signal SA and the generator AC magnetic-field detection timing signal SB, and for outputting the generator AC magnetic-field detection result signal SC; a duty down counter 107 for outputting the normal-motor-driving-pulse duty down signal SH for controlling the duty down of the normal motor-driving pulses based on the generator AC magnetic-field detection result signal SC; a correcting-driving-pulse output circuit 108 for determining whether the correcting driving pulses SJ (=correcting driving pulses P2+Pr or the correcting driving pulses P3+Pr') are to be output, based on the generator AC magnetic-field detection result signal SC, the high-frequency magnetic-field detection result signal SE, the AC magnetic-field detection result signal SF, and the rotation-detection result signal SG, and for outputting the correcting driving pulses SJ if necessary; a motor driving circuit 109 for outputting the motor driving pulses SL for driving the pulse motor 10, based on the normal motor-driving pulses SI or the correcting driving pulses SJ; a high-frequency magnetic-field detection circuit 110 for detecting a high-frequency magnetic field based on the high-frequency magnetic-field detection timing signal SSP0 and the induction voltage signal SD output from the motor driving circuit 109, and for outputting the high-frequency magnetic-field detection result signal SE; an AC magnetic-field detection circuit 111 for detecting an AC magnetic field based on the magnetic-field detection timing signal SSP12 and the induction voltage signal SD output from the motor driving circuit 109, and for outputting the AC magnetic-field detection result signal SF; and a rotation detection circuit 112 for detecting whether the motor 10 is rotated based on the rotation-detection timing signal SSP2 and the induction voltage signal SD output from the motor driving circuit 109, and for outputting the rotation-detection result signal SG.

[3.1.2] Detailed functional configuration of control system

Figure 10:
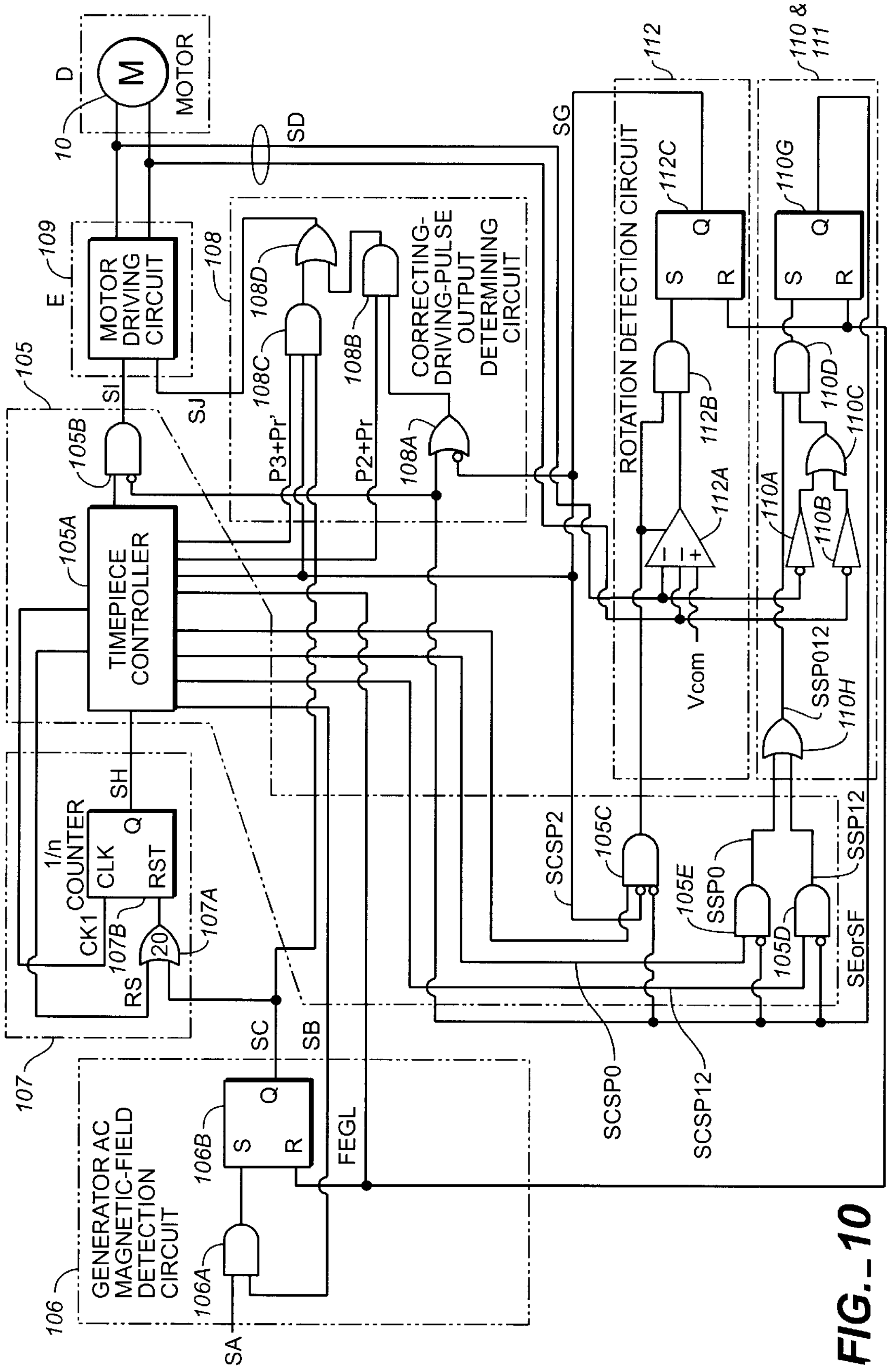
FIG. 10 is a block diagram illustrating the detailed functional configuration of the timepiece apparatus of the third embodiment.

The detailed functional configuration of the control system is discussed below. In FIG. 10, the same elements as those of the first embodiment shown in FIG. 3 are designated with like reference numerals, and an explanation thereof will thus be omitted.

The third embodiment differs from the first embodiment shown in FIG. 3 in the following points. In the correcting-driving-pulse output determining circuit 108, it is determined whether the correcting driving pulse P2+Pr or the correcting driving pulse P3+Pr' is to be output. The generator AC magnetic-field detection result signal SC is not input into the high-frequency magnetic-field detection circuit 110 or the AC magnetic-field detection circuit 111.

Accordingly, in the following description, only the configurations and the operations of the correcting driving pulse output determining circuit, the high-frequency magnetic-field detection circuit 110, and the AC magnetic-field detection circuit 111 will be discussed.

A description is given below of the configuration and the operation of the correcting-driving-pulse output determining circuit 108 with reference to FIG. 10.

The correcting-driving-pulse output determining circuit 108 is formed of: an OR circuit 108A for receiving the high-frequency magnetic-field detection result signal SE and the AC magnetic-field detection result signal SF into one input terminal and for receiving an inverted signal of the rotation-detection result signal SG into the other input terminal; an AND circuit 108B for receiving the correcting driving pulse P2+Pr into one input terminal and receiving the output signal of the OR circuit 108A, and for outputting a logical AND of the two input signals to the motor driving circuit 109 as the correcting driving pulses SJ; an AND circuit 108C for receiving the correcting driving pulses P3+Pr' into a first input terminal, receiving the rotation-detection result signal SG into a second input terminal, and receiving the generator AC magnetic-field detection result signal SC into a third input terminal, and for outputting a logical AND of all the input terminals; and an OR circuit 108D for receiving the output signal of the AND circuit 108C into one input terminal and receiving the output signal of the AND circuit 108B into the other input terminal, and for outputting a logical OR of the two input signals as the correcting driving pulses SJ.

The operation of the correcting-driving-pulse output determining circuit 108 is discussed below.

When the "H"-level high-frequency magnetic-field detection result signal SE is input since a high-frequency magnetic field has been detected, or when the "H"-level AC magnetic-field detection result signal SF is input since an AC magnetic field has been detected, and when the "L"-level rotation-detection result signal SG is input since the rotation of the pulse motor 10 is not detected, the OR circuit 108A outputs the "H"-level output signal to the AND circuit 108B.

When the correcting driving pulses P2+Pr are input, and when the "H"-level output signal is input from the OR circuit 108A, the AND circuit 108B outputs the correcting driving pulses P2+Pr to the OR circuit 108D.

Meanwhile, when the "H"-level generator AC magnetic-field detection result signal SC is input since a generator AC magnetic field has been detected, and when the "H"-level rotation-detection result signal SG indicating that the rotation of the pulse motor 10 has been detected is input, and when the correcting driving pulses P3+Pr' are input, the AND circuit 108C outputs the correcting driving pulses P3+Pr' to the OR circuit 108D.

In this case, only either of the correcting driving pulses P2+Pr and the correcting driving pulses P3+Pr' are output if they are to be output. Accordingly, the OR circuit 108D suitably outputs the correcting driving pulses P2+Pr or the correcting driving pulses P3+Pr' to the motor driving circuit 109.

That is, when a high-frequency magnetic field/AC magnetic field is detected, or the pulse motor 10 is not rotated, the correcting driving pulses P2+Pr is output to the motor driving circuit 109 as the correcting driving pulses SJ. When an AC magnetic field is detected, and when the rotation of the pulse motor 10 is detected, the correcting driving pulses P3+Pr' are output to the motor driving circuit 109 as the correcting driving pulses SJ.

A description is now given of the configurations and the operations of the high-frequency magnetic-field detection circuit 110 and the AC magnetic-field detection circuit 111 with reference to FIG. 10.

The high-frequency magnetic-field detection circuit 110 and the AC magnetic-field detection circuit 111 are implemented by the same circuit, as in the first embodiment. The high-frequency magnetic-field detection circuit 110 (and the AC magnetic-field detection circuit 111) is formed of: a first magnetic-field detection inverter 110A which is connected at an input terminal to one input terminal of the pulse motor 10 and which inverts the input signal and outputs it; a second magnetic-field detection inverter 110B which is connected at an input terminal to the other input terminal of the pulse motor 10 and inverts the input signal and outputs it; an OR circuit 110C for receiving the output signal of the first magnetic-field detection inverter into one input terminal and receiving the output signal of the second magnetic-field detection inverter into the other input terminal, and for outputting a logical OR of the two input signals; an AND circuit 110D for receiving the high-frequency/AC magnetic-field detection timing signal SSP012, which is discussed below, into one input terminal and receiving the output signal of the OR circuit 110C into the other input terminal, and for outputting a logical AND of the two input signals; a latch circuit 110G for receiving the output signal of the AND circuit 110D into a set terminal S and receiving the detection-result reset signal FEGL output from the timepiece control circuit 105 into a reset terminal R, and for outputting the high-frequency magnetic-field detection result signal SE (or the AC magnetic-field detection result signal SF); and an OR circuit 110H for receiving the high-frequency magnetic-field detection timing signal SSP0 into one input terminal and receiving the AC magnetic-field detection timing signal SSP12 into the other input terminal, and for outputting a logical OR of the two input signals as the high-frequency/AC magnetic-field detection timing signal SSP012.

The operation of the above-described circuit is described below by taking the high-frequency magnetic-field detection circuit 110 as an example. The operation of the AC magnetic-field detection circuit 111 is similar to that of the high-frequency magnetic-field detection circuit 110, except for the detection timing and the detection object.

When the voltage level of one input terminal of the pulse motor 10 becomes an "L" level, the first magnetic-field detection inverter 110A outputs the "H"-level output signal to the OR circuit 110C.

Similarly, when the voltage level of the other input terminal of the pulse motor 10 becomes an "L" level, the second magnetic-field detection inverter 110B outputs the "H"-level output signal to the OR circuit 10C.

As a result, the OR circuit 110C outputs the "H"-level output signal to the AND circuit 110D when the voltage level of one of the input terminals of the pulse motor becomes an "L" level.

In detecting a high-frequency magnetic field, the "H"-level high-frequency magnetic-field detection timing signal SSP0 is input into the OR circuit 110H. In detecting an AC magnetic field, the "H"-level AC magnetic-field detection timing signal SSP12 is input into the OR circuit 110H. Accordingly, in detecting a high-frequency magnetic field or an AC magnetic field, the OR circuit 110H outputs the "H"-level high-frequency/AC magnetic-field detection timing signal SSP012 to the AND circuit 110D.

When the high-frequency/AC magnetic-field detection timing signal SSP012 becomes an "H" level and when the output signal of the OR circuit 110C becomes an "H" level, that is, when a high-frequency magnetic field (or AC magnetic field) is generated around the pulse motor 10 in detecting a high-frequency magnetic field (or AC magnetic field), the AND circuit 110D outputs the "H"-level output signal, indicating that a high-frequency magnetic field (or AC magnetic field) has been detected, to the set terminal of the latch circuit 110G.

As a result, the output terminal Q of the latch circuit 110G outputs the "H"-level high-frequency magnetic-field detection result signal SE (or AC magnetic-field detection result signal SF) from the time when a high-frequency magnetic field (or AC magnetic field) around the pulse motor 10 is detected to when the subsequent detection-result reset signal FEGL becomes an "H" level to reset the detection result.

[3.3]

Figure 11:
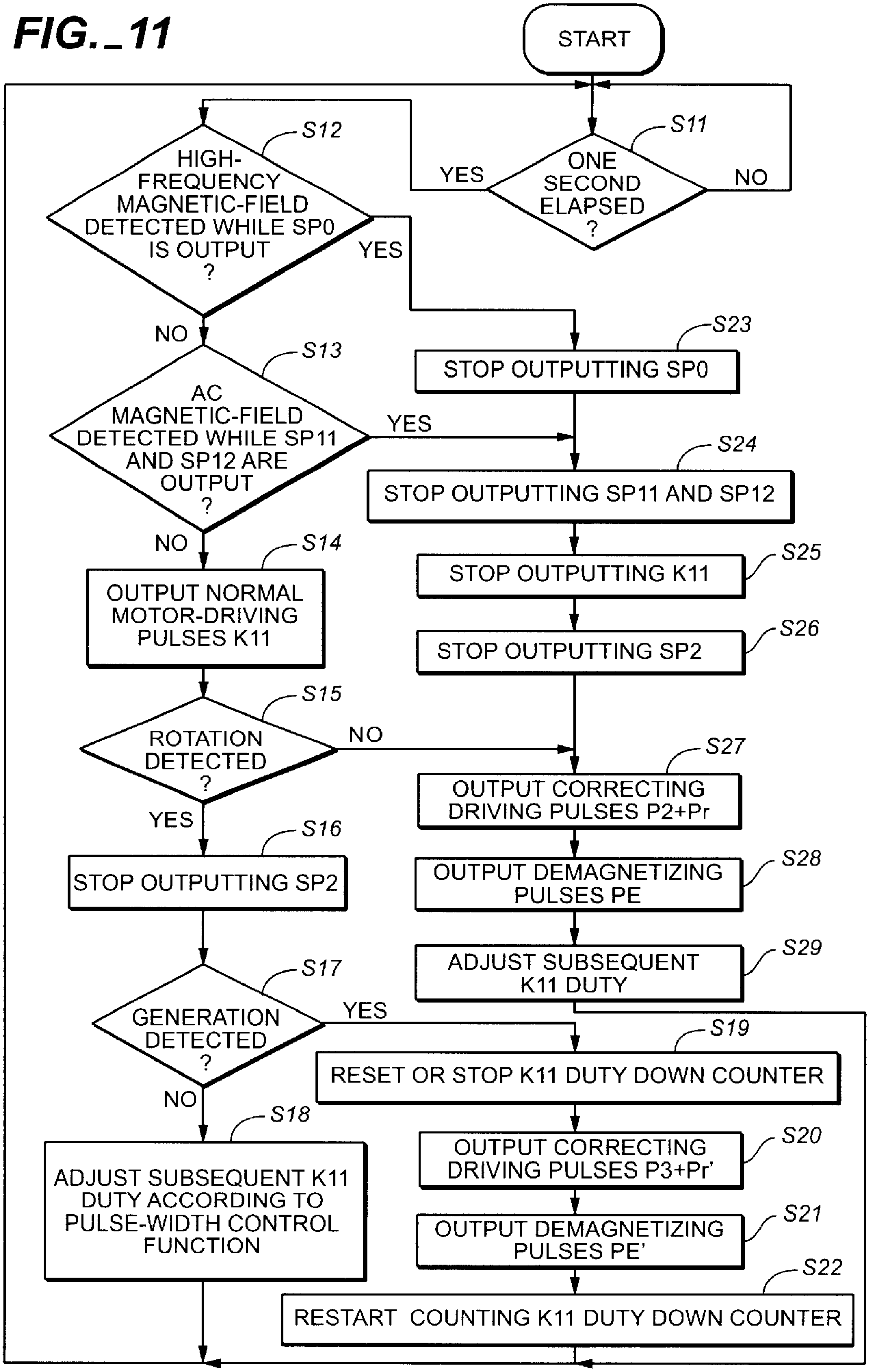
FIG. 11 is a processing flow chart of the third embodiment.

The operation of the timepiece apparatus 1 is described below with reference to the processing flow chart of FIG. 11.

It is first determined whether one second has elapsed after the timepiece apparatus 1 was reset or the previous driving pulse was output (step S11).

If it is determined in step S11 that one second has not elapsed, it is not the time to output a driving pulse, and the timepiece apparatus 1 enters the waiting state.

If it is determined in step S11 that one second has elapsed, it is determined whether a high-frequency magnetic field has detected while the high-frequency magnetic-field detection pulse signal SP0 is being output (step S12).

[3.1.1] Processing to be performed when high-frequency magnetic field is detected while the high-frequency magnetic-field detection pulses SP0 are being output If it is determined in step S12 that a high-frequency magnetic field has been detected while the high-frequency magnetic-field detection pulse signal SP0 is being output (step S12; Yes), the output of the high-frequency magnetic-field detection pulses SP0 is discontinued (step S23).

Subsequently, the output of the AC magnetic-field detection pulses SP11 and the AC magnetic-field detection pulses SP12 is interrupted (step S24), the output of the normal driving-motor pulses K11 is discontinued (step S25), and the output of the rotation detection pulses SP2 is discontinued (step S26).

Then, the correcting driving pulses P2+Pr are output (step S27). In this case, in actuality, the correcting driving pulses P2 drive the pulse motor 10, and the correcting driving pulses Pr are used for speedily shifting the pulse motor to a steady state by inhibiting vibrations after the rotor has been rotated after driving the pulse motor.

Then, in order to cancel a residual magnetic flux accompanied by an application of the correcting driving pulses P2+Pr, the demagnetizing pulses PE of the opposite polarity to the correcting driving pulses P2+Pr are output (step S28).

Subsequently, in the pulse-width control processing, the duty ratio of the normal driving pulses K11 is set so that power consumption can be minimized and the correcting driving pulses P2+Pr are not output (step S29).

The process then returns to step S11, and processing similar to the above-described processing is repeated.

[3.1.2] Processing to be performed when a high-frequency magnetic field is not detected and when an AC magnetic field is detected while AC magnetic-field detection pulses SP11 or AC magnetic-field pulses SP12 are being output If it is determined in step S12 that a high-frequency magnetic field has not been detected while the high-frequency magnetic-field detection pulse signal SP0 is being output (step S12; No), it is determined whether an AC magnetic field has been detected while the AC magnetic-field detection pulses SP11 or the AC magnetic-field detection pulses are being output (step S13).

If it is determined in step S13 that an AC magnetic field has been detected while the AC magnetic-field detection pulses SP11 or the AC magnetic-field detection pulses SP 12 are being output (step S13; Yes), the output of the AC magnetic-field detection pulses SP11 and the AC magnetic-field detection pulses SP12 is discontinued (step S24), the output of the normal driving-motor pulses K11 is discontinued (step S25), and the output of the rotation detection pulses SP2 is discontinued (step S26). The correcting driving pulses P2+Pr are then output (step S27).

Then, in order to cancel a residual magnetic flux accompanied by an application of the correcting driving pulses P2+Pr, the demagnetizing pulses PE of the opposite polarity to the correcting driving pulses P2+Pr are output (step S28).

Subsequently, the duty ratio of the normal driving pulses K11 is set so that power consumption can be minimized and the correcting driving pulses P2+Pr are not output (step S29).

The process then returns to step S11, and processing similar to the above-described processing is repeated.

[3.1.3] Processing to be performed when an AC magnetic field is not detected while the AC magnetic-field detection pulses SP11 or the AC magnetic-field detection pulses SP12 are being output If it is determined in step S13 that an AC magnetic field has not been detected while the AC magnetic-field detection pulses SP11 or the AC magnetic-field detection pulses SP12 are being output (step S13; No), the normal driving pulses K11 are output (step S14).

It is then determined whether the rotation of the pulse motor has been detected (step S15).

[3.1.4] Operation to be performed when the rotation is not detected

If it is determined in step S15 that the rotation of the pulse motor has not been detected, it is verified that the pulse motor is not rotated. Thus, the correcting driving pulses P2+Pr are output (step S27).

Then, in order to cancel a residual magnetic flux accompanied by an application of the correcting driving pulses P2+Pr, the demagnetizing pulses PE of the opposite polarity to the correcting driving pulses P2+Pr are output (step S28).

Subsequently, the duty ratio of the normal driving pulses K11 is set so that power consumption can be minimized and the correcting driving pulses P2+Pr are not output (step S29).

The process then returns to step S11, and processing similar to the above-described processing is repeated.

[3.1.5] Operation to be performed when the rotation is detected

If it is determined in step S15 that the rotation of the pulse motor has been detected, it cannot be determined whether the pulse motor is actually rotated or the detection of the rotation is an erroneous detection caused by charging. Thus, based on the fail-safe concept, it is considered that the pulse motor is not rotated, and the output of the rotation detection pulses SP2 is discontinued (step S16).

Subsequently, it is determined whether power generation for charging the storage device 104 is detected by the generation detecting circuit 102 (step S17).

[3.1.5.1] Operation to be performed when power generation is detected

If it is determined in step S17 that power generation for charging the storage device 104 has been detected by the generation detecting circuit 102 (step S17; Yes), the duty down counter for lowering the duty ratio is reset (set to a predetermined initial duty-down-counter value), or counting down of the duty down counter is discontinued so as to reduce effective power of the normal motor-driving pulses K11 (step S19).

Then, the correcting driving pulses P3+Pr' having an effective power greater than that of the above-described correcting driving pulses P2+Pr are output in a predetermined timing different from the output timing of the correcting driving pulses P2+Pr (step S20).

Then, in order to cancel a residual magnetic flux accompanied by an application of the correcting driving pulses P3+Pr', the demagnetizing pulses PE' of the opposite polarity to the correcting driving pulses P3+Pr' are output (step S21).

Upon completion of outputting the demagnetizing pulses PE', counting of the duty down counter is restarted (step S22), and the duty ratio of the normal driving pulses K11 is set so that power consumption can be minimized and the correcting driving pulses P2+Pr and the correcting driving pulses P3+Pr' are not output.

The process then returns to step S11, and processing similar to the above-described processing is repeated.

[3.1.5.2] Operation to be performed when power generation is not detected

If it is determined in step S17 that power generation for charging the storage device 104 has not been detected by the generation detecting circuit 102 (step S17; No), in the pulse-width control processing, the duty ratio of the normal driving pulses K11 is set so that power consumption can be minimized and the correcting driving pulses P2+Pr are not output (step S18).

The process then returns to step S11, and processing similar to the above-described processing is repeated.

[3.2] Example of Specific Operation

Figure 12:
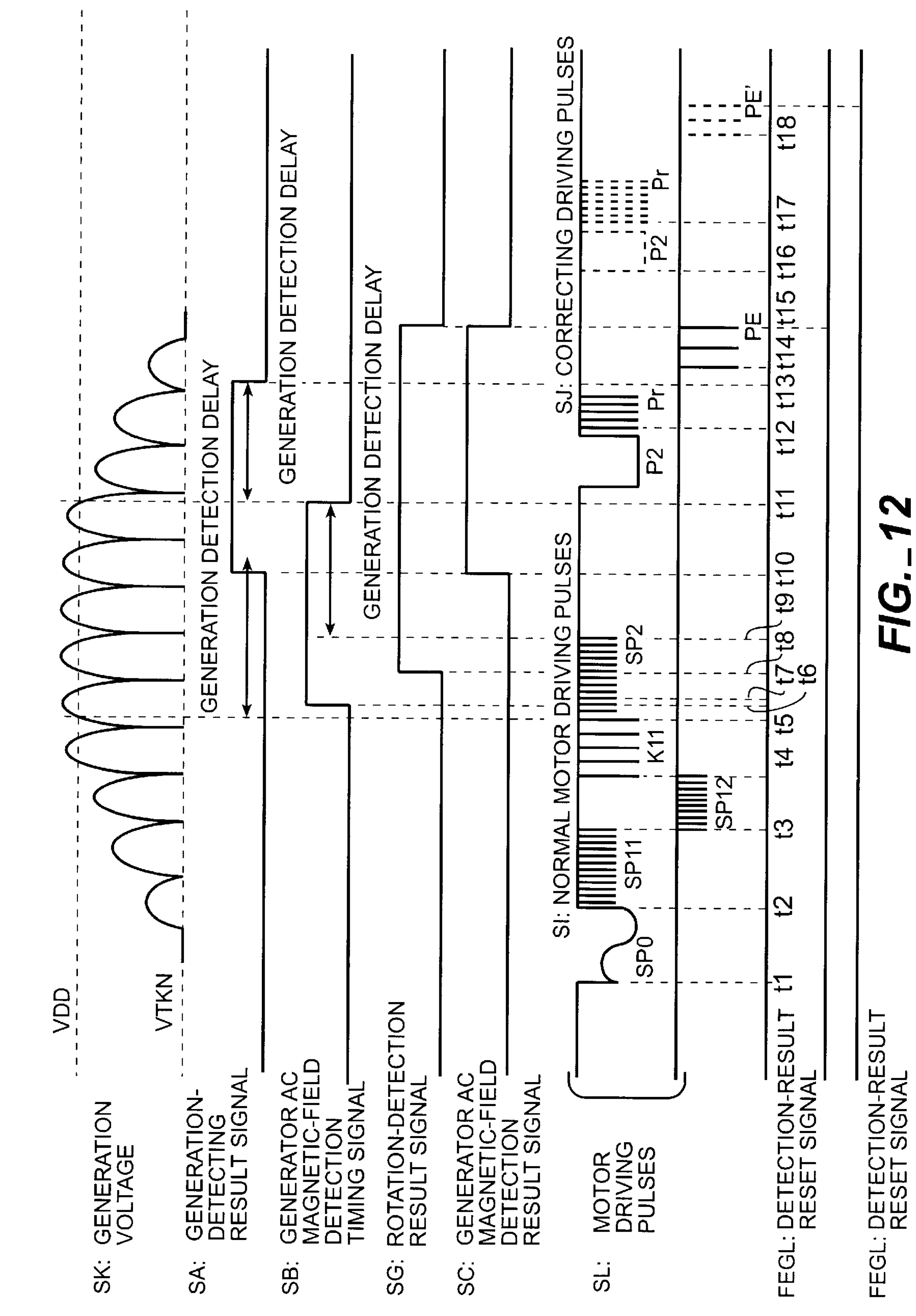
FIG. 12 is a timing chart of the third embodiment.

An example of the specific operation of the third embodiment is discussed below with reference to the timing chart of FIG. 12.

At time t1, the high-frequency magnetic-field detection pulses SP0 are output from the motor driving circuit to the pulse motor 10.

At time t2, the AC magnetic-field detection pulses SP11 having a first polarity are output from the motor driving pulses to the pulse motor 10.

Thereafter, at time t3, the AC magnetic-field detection pulses SP12 having a second polarity opposite to the first polarity are output. At time t4, the output of the normal motor-driving pulses K11 is started.

On the other hand, at time t5, the generation voltage of the generator portion exceeds the high potential voltage VDD. However, the generation-detecting result signal SA is still maintained at an "L" level because of a detection delay of the generation detecting circuit 102 shown in FIG. 7.

At time t6, the generator AC magnetic-field detection timing signal SB becomes an "H" level.

Thereafter, at time t7, the rotation detection pulses SP2 are output. As a result, at time t8, the rotation-detection result signal SG becomes an "H" level since the rotation of the pulse motor has been detected. At this time, however, the generation-detecting result signal SA is still maintained at an "L" level, and thus, the correcting driving pulses SJ are not output.

At time t9, the output of the rotation detection pulses SP2 is completed, and at time t10, the generation-detecting result signal SA becomes an "H" level. At this time, however, the rotation-detection result signal SG is an "H" level. Accordingly, instead of the correcting driving pulses P2 to be output at time t11, the correcting driving pulses Pr to be output at time t12, and the demagnetizing pulses PE to be output time t14, the correcting driving pulses P3 having an effective power greater than that of the correcting driving pulses P2 are output at time t16, the correcting driving pulses Pr' are output at time t17, and the demagnetizing pulses PE' having an effective power greater than that of the demagnetizing pulses PE are output at time t18.

If the correcting driving pulses P2+Pr are output, the detection-result reset signal FEGL is output at time t15. If the correcting driving pulses P3+Pr' are output, the detection-result reset signal FEGL' is output immediately after time t18. Thus, the generator AC magnetic-field detection results, the high-frequency magnetic-field detection results, the AC magnetic-field detection results, and the rotation detection results are reset.

[3.3] Advantages of Third Embodiment

As discussed above, according to the third embodiment, the correcting driving pulses are output only when the motor is erroneously driven. That is, when the generation-detecting circuit 102A detects power generation for charging the stored device 104, and when the rotation detection results of the pulse motor indicate that the pulse motor is actually rotated, the correcting driving pulses are output. Thus, the reliable rotation of the motor coil can be ensured by the correcting driving pulses, and by eliminating unnecessary output of the correcting driving pulses, power consumption can be reduced.

Additionally, the generation detecting circuit 102A detects the presence or the absence of charging via a path different from the charging path to the secondary cell. It is thus possible to simultaneously perform power generation detection and actual charging processing, and the charging efficiency is not lowered, which may otherwise be incurred upon detecting power generation.

[3.4] Examples of Modifications to Third Embodiment

In the foregoing description, while the correcting driving pulses (P2) are output when a high-frequency magnetic field of an AC magnetic field is detected and when the rotation is not detected, the correcting driving pulses (P3) are output when the rotation is detected by the rotation detection pulses and when power generation for charging the storage device 104 is detected by the generation detecting circuit 102A while the rotation detection pulses are being output. Such correcting driving pulses P3 have an effective power greater than that of the correcting driving pulses P2 and are output in a timing different from the output timing of the correcting driving pulses P2. However, the effective power of the correcting driving pulses P3 may be differentiated from that of the correcting driving pulses P2, and the correcting driving pulses P3 and the correcting driving pulses P2 may be simultaneously output. Alternatively, the effective power may be set to be the same between the correcting driving pulses P3 and the correcting driving pulses P2, and the output timing of the correcting driving pulses P3 may be differentiated from that of the correcting driving pulses P2.

[4] FOURTH EMBODIMENT

In the first embodiment, the generation detecting circuit 102 detects power generation based on the generation voltage. In a fourth embodiment, however, the generation detecting circuit 102 detects power generation by detecting the generation current.

Figure 13:
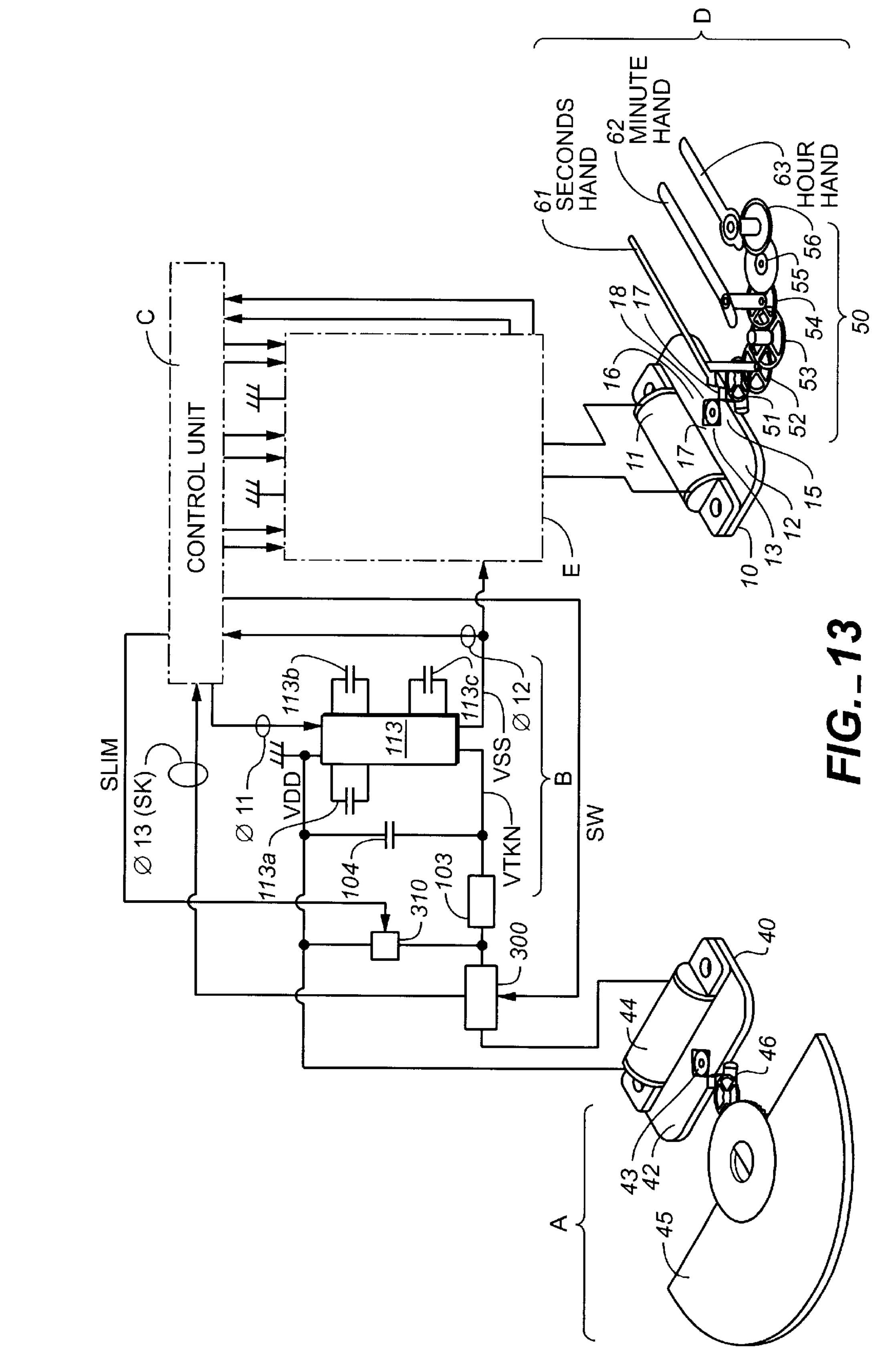
FIG. 13 illustrates the schematic configuration of a timepiece apparatus of a fourth embodiment.

FIG. 13 illustrates an overview of the configuration of the timepiece apparatus 1, which serves as an electronic apparatus of the fourth embodiment. The fourth embodiment differs from the first embodiment in that a current/voltage converter 300 for performing voltage/current conversion of the generation voltage SK of the generator unit A, and a limiter transistor 310 for short-circuiting the generator unit A based on an overcharging-prevention control signal SLIM when the stored voltage of the storage device (large-capacitance capacitor) 104 exceeds a predetermined tolerance voltage and for preventing overcharging are provided.

[4.1] Configuration of Generation Detecting Circuit

Figure 14:
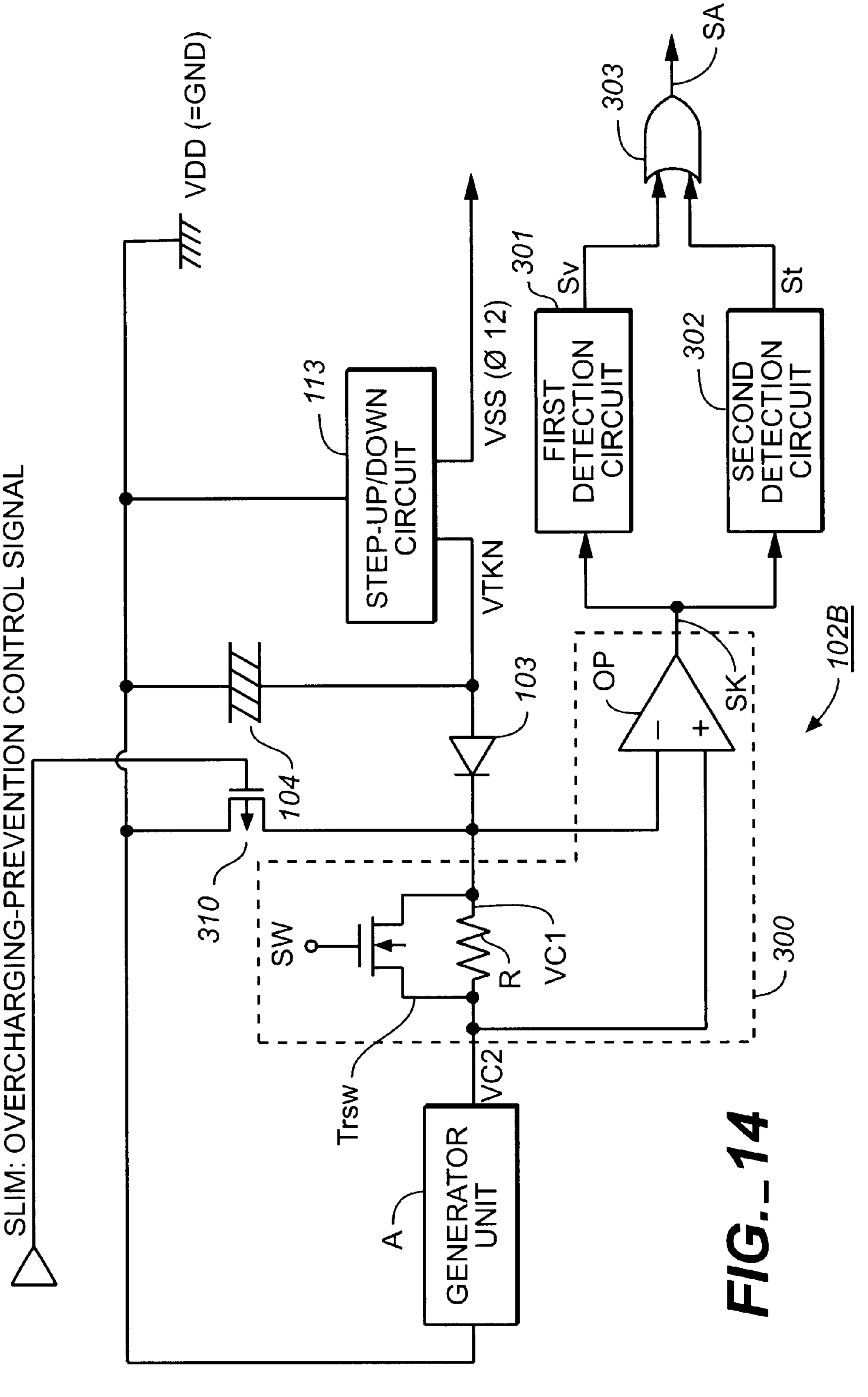
FIG. 14 is a block diagram illustrating a generation detecting circuit of the fourth embodiment.

The configuration of the generation detecting circuit 102B is first discussed below with reference to FIG. 14. In FIG. 14, the same elements as those shown in FIG. 1 are designated with like reference numerals, and an explanation thereof will thus be omitted.

The generation detecting circuit 102B is formed of: the current/voltage converter 300 for performing voltage/current conversion of the generation voltage SK of the generator unit A; a first detection circuit 301 for generating a voltage detection signal Sv which becomes an "H" level when the amplitude of the generation voltage SK exceeds a predetermined voltage and which becomes an "L" level when it is below the predetermined voltage; a second detection circuit 302 for generating a generation-lasting-time detection signal St which becomes an "H" level when the generation lasting time exceeds a predetermined time and which becomes an "L" level when it is below the predetermined time; and an OR circuit 303 for outputting a logical OR of the voltage detection signal Sv and the generation-lasting-time detection signal St as the generation-detecting result signal SA.

In this case, the current/voltage converter 300 is formed of: a current detection resistor R connected in series between the rectifier circuit 103 and the generator unit A; an operational amplifier OP for detecting a potential difference across both terminals of the current detection resistor R and for outputting it as the generation voltage SK; and a MOS transistor TRSW for effectively disconnecting the current detection resistor R according to the detection timing signal SW so as to reduce a charging loss when the current is not detected.

The detailed configuration of the operational amplifier OP is discussed below.

Figure 15:
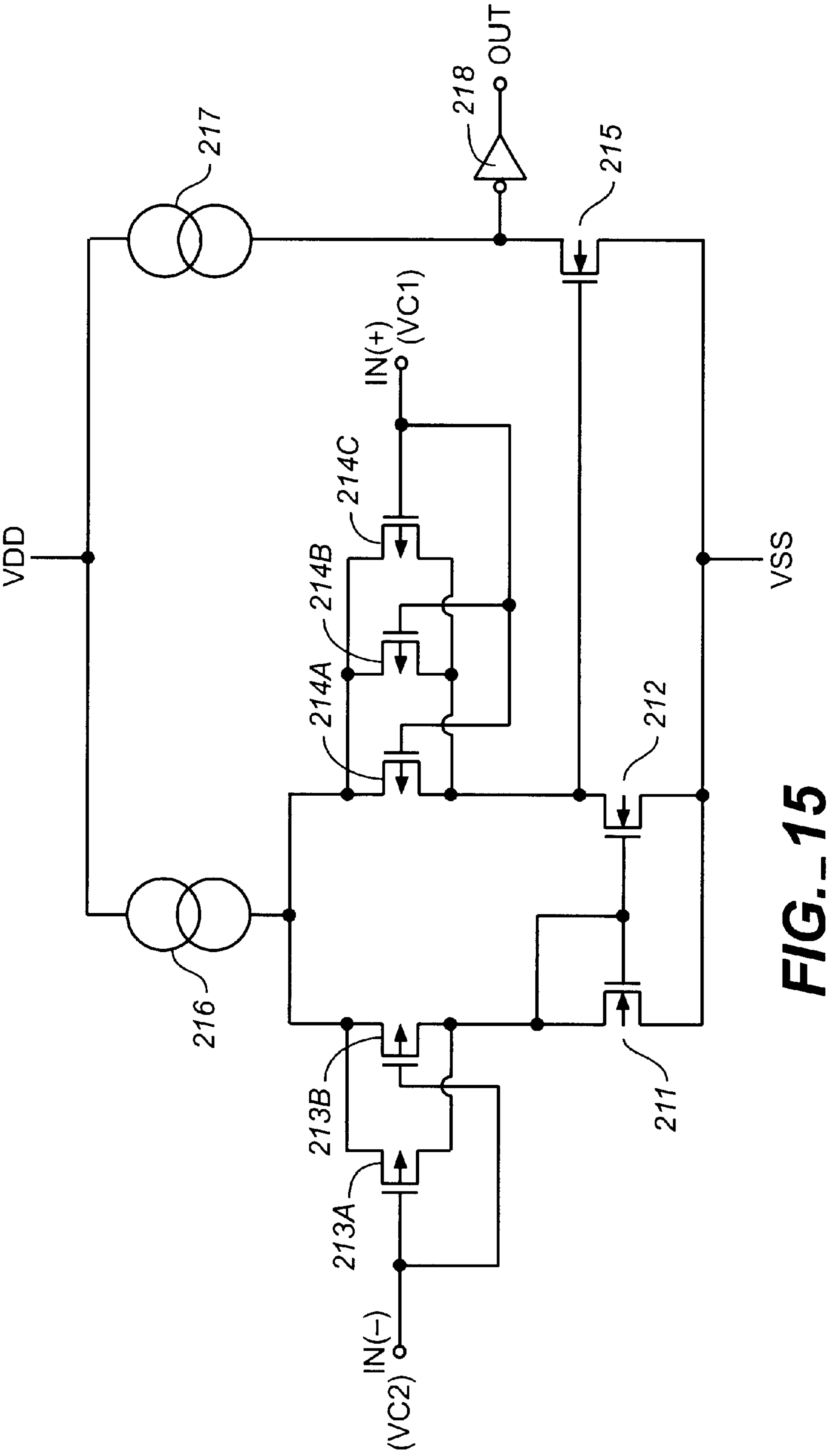
FIG. 15 illustrates an example of the circuit configuration of an operational amplifier of the fourth embodiment.

The operational amplifier OP is formed of, as shown in FIG. 15, a pair of load transistors 211 and 212, a pair of input transistor groups 213 and 214, an output transistor 215, constant-current sources 216 and 217, and an inverter 218. Among the above-mentioned elements, the load transistors 211 and 212 and the output transistor 215 are formed of N-channel field effective transistors, while the input transistor groups 213 and 214 are formed of P-channel field effect transistors.

The gates of the input transistor groups 213 and 214 respectively serve as a negative input terminal (−) and a positive input terminal (+) of the operational amplifier OP. The drain of the output transistor 215 serves as an output terminal OUT via the inverter 218.

In this case, the transistor group 213 is formed by connecting two transistors 213A and 213B having the same size and the same capacity in parallel with each other, while the transistor group 214 is formed of transistors 214A, 214B, and 214C having the same size and the same capacity in parallel with each other.

With this configuration, the capacity of the pair of differential transistors at the positive input terminal (+) becomes higher, and unless the terminal voltage at the negative input terminal (−) is set lower than the voltage of the positive input terminal (+), the transistors 213A and 213B are not turned on. Accordingly, the output of the operational amplifier OP is not inverted.

In the detection operation of the operational amplifier OP, for example, by using the positive input terminal (+) as a reference, and a high potential voltage VC1 is applied to the positive input terminal (+). In this case, only when a voltage VC2, which is equal to VC1−$\alpha$, and is thus lower than the voltage VC1 by the voltage $\alpha$, is applied to the negative input terminal (−), the output of the operational amplifier OP is inverted to output an "H" level.

With this configuration, the load transistors 211 and 212 serve as a current mirror circuit, and thus, the current values flowing into the load transistors 211 and 212 are the same. Accordingly, a voltage difference applied to the gates of the input transistor groups 213 and 214 is amplified, and a current difference corresponding to the voltage difference is generated. Since the transistors 211 and 212, which receive the current difference, accept only the same current value, the current (voltage) difference is gradually amplified and flows into the gate of the transistor 215.

As a result, if the gate current (voltage) of the transistor group 214, which serves as the positive input terminal (+), exceeds the gate current (voltage) of the transistor group 213, which serves as the negative input terminal (−), even in the slightest, the drain voltage of the transistor 215, which serves as the input terminal of the inverter 218, is sharply shifted to the low potential voltage Vss, and otherwise, it is sharply shifted to the high potential voltage Vdd.

According to the above-constructed operational amplifier OP, the transistors 211 and 212 are used as active loads, thereby eliminating the need to use a resistor except for the constant-current sources 216 and 217. It is thus extremely advantageous in integrating the operational amplifier OP.

Additionally, in FIG. 14, there is provided the limiter transistor 310 for short-circuiting the generator unit A based on the overcurrent-prevention control signal SLIM when the stored voltage of the storage device 104 exceeds a predetermined tolerance voltage, so as to prevent overcurrent charging.

In this case, the detection timing signal SW is the same signal as the generator AC magnetic-field detection timing signal SB or synchronizes with it, and is output from the timepiece control circuit 105 shown in FIG. 6 (corresponding to the control unit C shown in FIG. 13). The detection timing signal SW also turns off the MOS transistor TRSW upon detecting a generator AC magnetic field when power generation is detected by the generation detecting circuit 102B. Moreover, the overcharging-prevention control signal SLIM is output from the timepiece control circuit 105 in FIG. 6 (corresponding to the control unit C in FIG. 13), and detects the stored voltage of the storage device 104. If the detected stored voltage exceeds a preset tolerance voltage, the overcharging-prevention control signal SLIM is output so as to turn on the limiter transistor 310.

[4.2] Operation of Generation Detecting Circuit

The operation of the generation detecting circuit 102B is discussed below in combination with the operation of the limiter transistor 310 with reference to FIG. 14.

[4.2.1] In detecting current when the stored voltage of the storage device 104 is lower than a predetermined tolerance voltage In this case, the overcharging-prevention control signal SLIM is an "H" level, and the limiter transistor 310 is in the off state. The detection timing signal SW is an "L" level, and the MOS transistor TRSW is in the off state.

As a result, when power is generating in the generator unit A, a generation current flows into the current detection resistor R via the storage device 104 and the rectifier circuit 103.

Accordingly, a voltage difference corresponding to the amount of the generation current is generated across both terminals of the current detection resistor R, and thus, the operational amplifier OP outputs the generation voltage SK corresponding to the voltage difference to the first detection circuit 301 and the second detection circuit 302.

The first detection circuit 301 generates the voltage detection signal Sv which becomes an "H" level when the amplitude of the generation voltage SK exceeds a predetermined voltage and which becomes an "L" level when it is below the predetermined voltage, and outputs the voltage detection signal Sv to the OR circuit 303.

The second detection circuit 302 generates the generation-lasting-time detection signal St which becomes an "H" level when the generation lasting time exceeds a predetermined time and which becomes an "L" level when it is below the predetermined time, and outputs the generation-lasting-time detection signal St to the OR circuit 303.

The OR circuit 303 then outputs a logical OR of the voltage detection signal Sv and the generation-lasting-time detection signal St as the generation-detecting result signal SA.

That is, if one of the conditions set for the first detection circuit 301 and the second detection circuit 302 is met according to the generation current, the generation detecting circuit 102B outputs the generation state, i.e., the generation-detecting result signal SA indicating that a magnetic field induced by power generation may be generated.

[4.2.2] In detecting current when the stored voltage of the storage device 104 exceeds a predetermined tolerance voltage In this case, the overcharging-prevention control signal SLIM is an "L" level, and the limiter transistor 310 is in the on state. The detection timing signal SW is an "L" level, and the MOS transistor TRSW is in the off state.

As a result, when power is generating in the generator unit A, a generation current flows into the current detection resistor R via the limiter transistor 310.

Accordingly, a voltage difference corresponding to the amount of the generation current is generated across both terminals of the current detection resistor R, and thus, the operational amplifier OP outputs the generation voltage SK corresponding to the voltage difference to the first detection circuit 301 and the second detection circuit 302.

The first detection circuit 301 generates the voltage detection signal Sv which becomes an "H" level when the amplitude of the generation voltage SK exceeds a predetermined voltage and which becomes an "L" level when it is below the predetermined voltage, and outputs the voltage detection signal Sv to the OR circuit 303.

The second detection circuit 302 generates the generation-lasting-time detection signal St which becomes an "H" level when the generation lasting time exceeds a predetermined time and which becomes an "L" level when it is below the predetermined time, and outputs the generation-lasting-time detection signal St to the OR circuit 303.

The OR circuit 303 then outputs a logical OR of the voltage detection signal Sv and the generation-lasting-time detection signal St as the generation-detecting result signal SA.

That is, if one of the conditions set for the first detection circuit 301 and the second detection circuit 302 is met according to the generation current, the generation detecting circuit 102B outputs the generation state, i.e., the generation-detecting result signal SA indicating that a magnetic field induced by power generation may be generated.

Thus, even when the stored voltage of the storage device 104 exceeds a predetermined tolerance voltage, i.e., even when the overcharging-prevention operation is performed, the motor is correctly driven according to the generation state of the generator portion 101 based on the generation-detecting result signal SA, as in the normal operation.

[4.2.3] When current detection is not performed

In this case, the detection timing signal SW is an "H" level, and the MOS transistor TRSW is in the on state.

Accordingly, the current detection resistor R is short-circuited so as to be effectively disconnected from the charging path.

As a result, a potential difference is not generated across both terminals of the current detection resistor R, and the current detection is not performed.

[4.3] Advantages of Fourth Embodiment

As discussed above, according to the fourth embodiment, the charging state of the large-capacitance capacitor (storage device) or the generation state of the generator portion can be detected by the generation current. Thus, it is possible to control the driving of the motor without being influenced by a magnetic field generated due to a current accompanied by power generation of the generator portion.

Moreover, even in the overcharging-prevention state, the driving of the motor can be reliably corrected.

Further, when a generator AC magnetic field is not detected, the current detection resistor R is bypassed, and the charging efficiency of the storage device is not lowered. Even in detecting a generator AC magnetic field, it is possible to charge the storage device via the current detection resistor R. Accordingly, because of this point, too, an unnecessary reduction in the charging efficiency can be prevented. In this case, the charging is performed via the current detection resistor R only for a predetermined period, and thus, the charging efficiency is hardly lowered.

[5] FIFTH EMBODIMENT

In the foregoing fourth embodiment, the overcharging-prevention circuit is separately provided from the rectifier circuit. In a fifth embodiment, the overcharging-prevention circuit and the rectifier circuit are integrated so as to form a rectifier/overcharging-prevention circuit. In the fifth embodiment, the generation detecting circuit is configured similarly to the generation detecting circuit 102A of the second embodiment.

Figure 16:
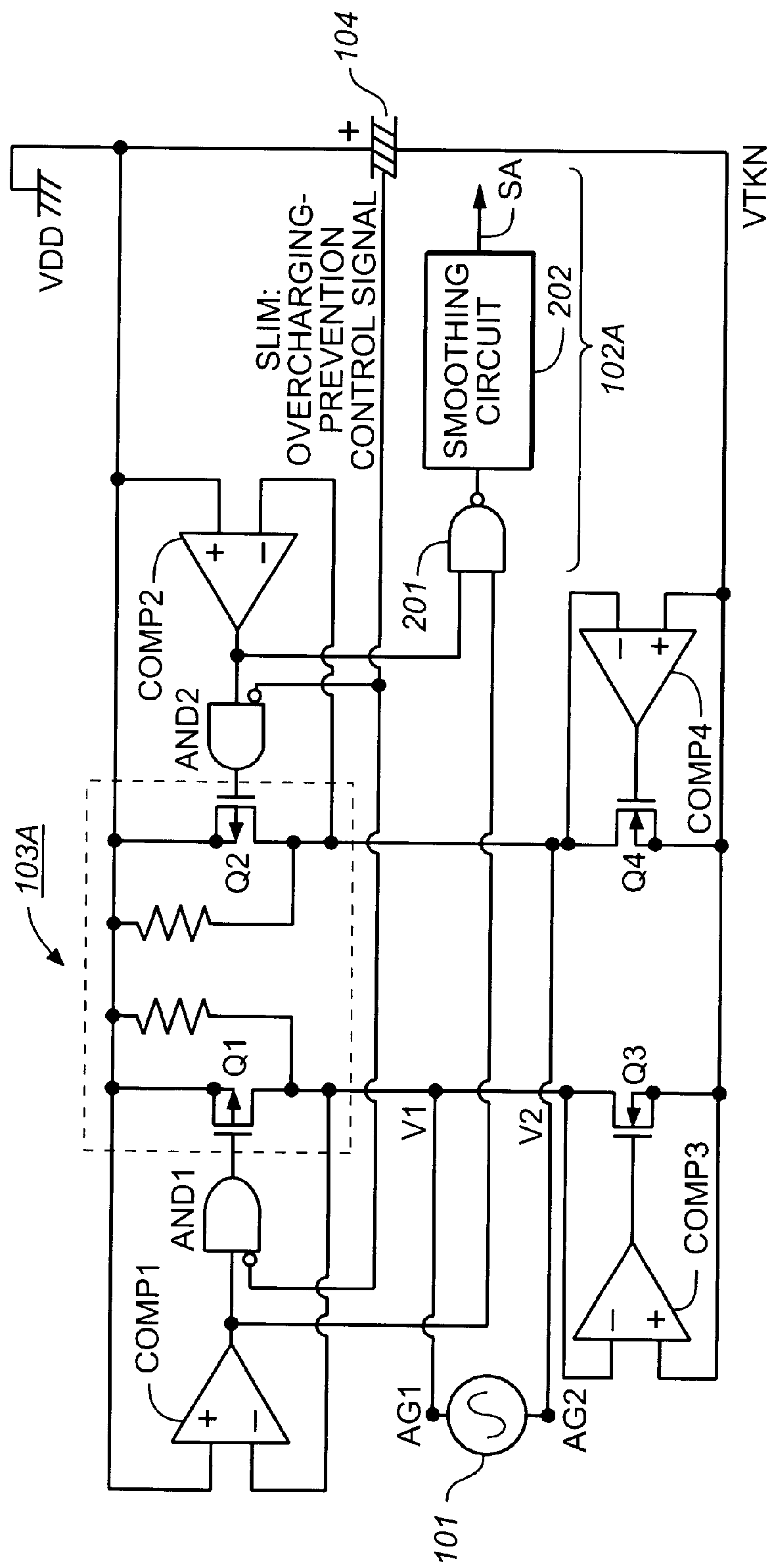
FIG. 16 illustrates the circuit configuration near a rectifier/overcharging-prevention circuit of a fifth embodiment.

[5.1] Configuration of Circuits Near the Rectifier/overcharging-prevention Circuit FIG. 16 illustrates an example of the configuration of the circuits located near the rectifier/overcharging-prevention circuit.

FIG. 16 illustrates a rectifier/overcharging prevention circuit 103A for converting an alternating current output from the generator portion 101 into a direct current and for preventing overcharging, and the peripheral circuits near the rectifier/overcharging-prevention circuit 103A, that is, the generator portion 101 for generating AC power, the generation detecting circuit 102A, and the storage device 104 for storing the direct current output from the rectifier/overcharging prevention circuit 103A. In FIG. 16, the same elements as those shown in FIG. 7 are designated with like reference numerals.

The rectifier/overcharging-prevention circuit 103A is formed of: a first comparator COMP1 for performing on/off control of a first transistor Q1 by comparing the voltage of one output terminal AG1 of the generator portion 101 with the reference voltage Vdd so as to allow the first transistor Q1 to perform active rectification; a second comparator COMP2 for turning on/off a second transistor Q2 alternately with the transistor Q1 by comparing the other output terminal AG2 of the generator portion 101 with the reference voltage Vdd so as to allow the second transistor Q2 to perform active rectification; a third comparator COMP3 for turning on/off a third transistor Q3 in synchronization with the second transistor Q2 by comparing the voltage of the output terminal AG1 of the generator portion 101 with the reference voltage VTKN so as to allow the third transistor Q3 to perform active rectification; a fourth comparator COMP4 for turning on/off a fourth transistor Q4 in synchronization with the first transistor Q1 by comparing the voltage of the output terminal AG2 of the generator portion 101 with the reference voltage VTKN so as to allow the fourth transistor Q4 to perform active rectification; a first AND circuit AND1 for receiving the output of the first comparator COMP1 into one input terminal and for receiving the inverted signal of the overcharging-prevention control signal SLIM into the other input terminal; and a second AND circuit AND2 for receiving the output of the second comparator COMP2 into one input terminal and for receiving the inverted signal of the overcharging-prevention control signal SLIM into the other input terminal.

In this case, when the generator portion 101 is not generating power, the potentials of the output terminals AG1 and AG2 are equivalent to the reference voltage Vdd by an pull-up resistor, and are thus in the steady state.

The generation detecting circuit 102A, as in the second embodiment, is formed of a NAND circuit 201 for outputting a logical NAND of the outputs of the first comparator COMP1 and the second comparator COMP2, and a smoothing circuit 202 for smoothing the output of the NAND circuit 201 by using an R-C integrating circuit, and for outputting it as the generation-detecting result signal SA.

In this case, the overcharging-prevention control signal SLIM is output from the timepiece control circuit 105 in FIG. 6 (corresponding to the control unit C in FIG. 1), and detects the stored voltage of the storage device 104. When the detected stored voltage exceeds a preset tolerance voltage, the "H"-level overcharging-prevention control signal SLIM is output to the first AND circuit AND1 and the second AND circuit AND2.

[5.2] Operation of Fifth Embodiment

The operation is now discussed.

[5.2.1] When normal operation is performed

The operation under normal conditions is described below when the overcharging-prevention control signal SLIM is an "L" level.

When the generator portion 101 starts generating power, the generation voltage is supplied to both the output terminals AG1 and AG2. In this case, the terminal voltage V1 of the output terminal AG1 and the terminal voltage V2 of the output terminal AG2 are inverted with respect to each other.

When the terminal voltage V2 drops and becomes lower than the power supply VTKN, the output of the fourth comparator COMP4 becomes an "H" level so as to turn on the fourth transistor Q4.

Simultaneously, when the terminal voltage V1 increases and exceeds the voltage of the power supply VDD, the output of the first comparator COMP1 becomes an "L" level.

In this case, since the overcharging-prevention control signal SLIM is an "L" level, both the input terminals of the first AND circuit AND1 become an "L" level so as to turn on the first transistor Q1.

Meanwhile, when the terminal voltage V1 increases and exceeds the power supply VTKN, the output of the third comparator COMP3 becomes an "L" level so as to turn off the third transistor Q3.

Simultaneously, since the terminal voltage V2 decreases and becomes lower than the voltage of the power supply VDD, the output of the second comparator COMP2 becomes an "H" level.

In this case, since the overcharging-prevention control signal SLIM is an "L" level, one input terminal of the AND circuit AND2 becomes an "L" level, and the other input terminal becomes an "H" level, thereby turning off the 22nd transistor Q2.

Accordingly, while the first transistor Q1 and the fourth transistor Q4 are turned on, the generation current flows in a path "terminal AG1→first transistor Q1→power supply VDD→storage device 104→power supply VTKN→fourth transistor Q4", and the storage device 104 is thus charged.

Likewise, when the terminal voltage V1 drops and becomes lower than the power supply VTKN, the output of the third comparator COMP3 becomes an "H" level so as to turn on the third transistor Q3.

Simultaneously, when the terminal voltage V2 increases and exceeds the voltage of the power supply VDD, the output of the second comparator COMP2 becomes an "L" level.

In this case, since the overcharging-prevention control signal SLIM is an "L" level, both the input terminals of the second AND circuit AND2 become an "L" level, thereby turning on the second transistor Q2.

Meanwhile, when the terminal voltage V2 increases and exceeds the power supply VTKN, the output of the fourth comparator COMP4 becomes an "L" level so as to turn off the fourth transistor Q4.

Simultaneously, when the terminal voltage V1 decreases and becomes lower than the voltage of the power supply VDD, the output of the first comparator COMP1 becomes an "H" level.

In this case, since the overcharging-prevention control signal SLIM is an "L" level, one input terminal of the first AND circuit AND1 becomes an "L" level, and the other input terminal becomes an "H" level, thereby turning off the first transistor Q1.

Accordingly, while the second transistor Q2 and the third transistor Q3 are turned on, the generation current flows in a path "terminal AG2→second transistor Q2→power supply VDD→storage device 104→power supply VTKN→third transistor Q3", and thus, the storage device 104 is charged.

As stated above, in the fifth embodiment, as well as in the second embodiment, when the generation current flows, the output of the first comparator COMP1 or the second comparator COMP2 is an "L" level.

Then, the NAND circuit 201 of the generation detecting circuit 102A computes a logical NAND of the outputs of the first comparator COMP1 and the second comparator COMP2, and outputs the "H"-level signal to the smoothing circuit 202 while the generation current is flowing.

In this case, the output of the NAND circuit 201 contains switching noise, and thus, the smoothing circuit 202 smoothes the output of the NAND circuit 201 by using the R-C integrating circuit and outputs it as the generation-detecting result signal SA.

The detection signal output from such a generation detecting circuit 102A contains a detection delay because of its configuration. Accordingly, without considering this detection delay, the motor is not rotated correctly due to a detection leakage.

Thus, in the fifth embodiment, too, the motor should be correctly rotated by taking this detection delay into consideration.

The other specific operations are similar to those of the second embodiment.

[5.2.2] When overcharging-prevention operation is performed

A description is now given of the operation when the overcharging-prevention control signal SLIM is an "H" level, that is, when the overcharging-preventing operation is performed.

In this case, one input terminal of each of the first AND circuit AND1 and the second AND circuit AND2 is constantly an "H" level, and the outputs of the first AND circuit AND1 and the second AND circuit AND2 are always an "L" level.

As a result, the transistors Q1 and Q2 are always in the on state, and both the output terminals AG1 and AG2 of the generator portion 101 are pulled up, whereby the storage device 104 is not charged.

In this case, a voltage difference corresponding to the amount of the generation current is generated between the source and the drain of the first transistor Q1 and those of the second transistor Q2, and the output of the first comparator COMP1 or the second comparator COMP2 is an "L" level.

Then, the NAND circuit 201 of the generation detecting circuit 102 computes a logical NAND of the outputs of the first comparator COMP1 and the second comparator COMP2, and outputs the "H"-level signal to the smoothing circuit 202 while the generation current is flowing.

In this case, too, the output of the NAND circuit 201 contains switching noise, and thus, the smoothing circuit 202 smoothes the output of the NAND circuit 201 by using the R-C integrating circuit and outputs it as the generation-detecting result signal SA.

That is, the generation detecting circuit 102A outputs the generation state, i.e., the generation-detecting result signal SA indicating that a magnetic field induced by power generation may be generated, based on the current accompanied by power generation.

Accordingly, even during the overcharging-prevention operation, as well as during the normal operation, the motor can be correctly driven according to the generation state of the generator portion 101 based on the generation-detecting result signal SA.

[5.3] Advantages of Fifth Embodiment

As discussed above, according to the fifth embodiment, the charging state of the large-capacitance capacitor (storage device) or the generation state of the generator portion can be detected by the generation current. Thus, it is possible to control the driving of the motor without being influenced by a magnetic field generated due to a current accompanied by power generation of the generator portion.

Moreover, even in the overcharging-prevention state, the driving of the motor can be reliably corrected.

[5.4] Examples of Modifications to Fifth Embodiment

In the foregoing description, the generation detecting circuit 102A is operated based on the outputs of the comparator COMP1 and the comparator COMP2. In this embodiment, however, the generation detecting circuit 102A may be operated based on at least one of the outputs of the comparators COMP1 through COMP4.

[6] SIXTH EMBODIMENT

A sixth embodiment is now described.

The overall configuration of the sixth embodiment is similar to those of the foregoing first through third embodiments, and thus, the detailed functional configuration of the control system is described below with reference to FIG. 17.

In this case, the same elements as those of the third embodiment shown in FIG. 10 are designated with like reference numerals, and a detailed explanation thereof will thus be omitted.

Figure 17:
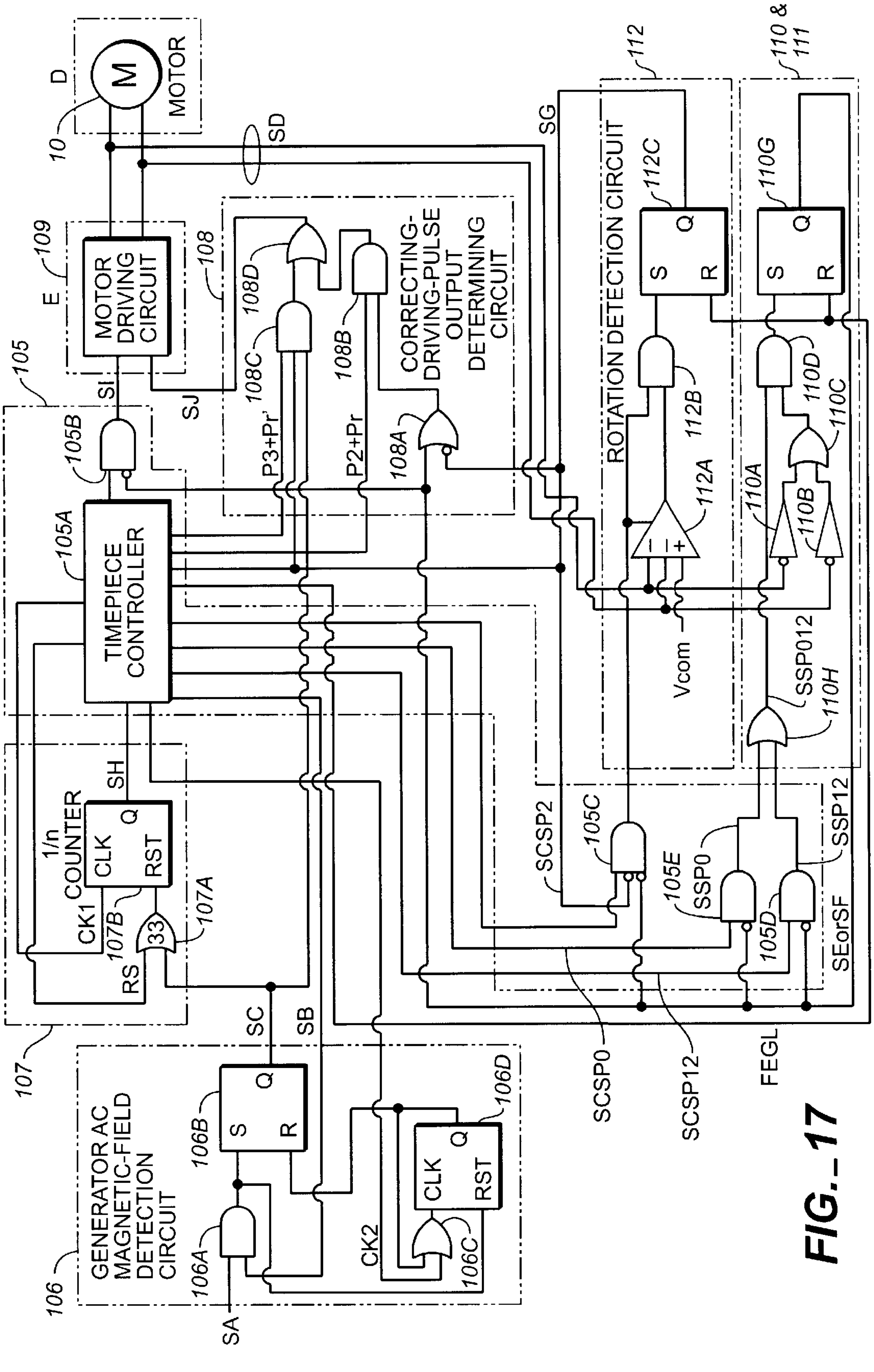
FIG. 17 is a block diagram illustrating the detailed functional configuration of a timepiece apparatus of a sixth embodiment.

The sixth embodiment shown in FIG. 17 differs from the third embodiment in that it is determined whether the correcting driving pulses P2+Pr or the correcting driving pulses P3+Pr' are to be output, based on a detection result of a generator AC magnetic field of the generator AC magnetic-field detection circuit 106.

In the following description, the configurations and the operations of the generator AC magnetic-field detection circuit 106 and the circuits near the generator AC magnetic-field detection circuit 106 will be given.

The generator AC magnetic-field detection circuit 106 is formed of: an AND circuit 106A for receiving the generation-detecting result signal SA into one input terminal and receiving SB into the other input terminal, and for outputting a logical AND of the two input signals; a latch circuit 106B for receiving the output signal of the AND circuit 106A into a set terminal S and receiving the output signal of an output terminal R of a counter 106D, which will be discussed below, into a reset terminal R, and for outputting the generator AC magnetic-field detection result signal SC from an output terminal Q; an OR circuit 106C for receiving the clock signal CK2 from the timepiece control circuit 105 into one input terminal and receiving the output signal of the output terminal Q of the counter 106D, which will be discussed below, into the other input terminal, and for outputting a logical OR of the two input signals; and the counter 106D which receives the output signal of the OR circuit 106C into a clock terminal CLK and receiving the output signal of the AND circuit 106A into a reset terminal RST, and which is connected at its output terminal Q to the reset terminal R of the latch circuit 106B.

An overview of the operation of the generator AC magnetic-field detection circuit 106 is discussed below.

The timepiece controller 105A outputs the generator AC magnetic-field detection timing signal SB, which becomes an "H" level at a predetermined timing, to the AND circuit 106A.

As a result, when the generation-detecting result signal SA becomes an "H" level by detecting power generation while a generator AC magnetic field is being detected, the AND circuit 106A determines that an AC magnetic field is generated by the generator, and outputs the "H"-level output signal to the set terminal S of the latch circuit 106B and the reset terminal of the counter 106D.

As a result, the counter 106D is reset. Thereafter, when the generator AC magnetic-field detection timing signal becomes an "L" level, the counter 106D starts counting based on the clock signal CK2 or the output signal of the output terminal Q of the counter 106D. After the lapse of a predetermined time, the output terminal Q of the counter 106D becomes an "H" level, and the input of the clock signal CK2 is inhibited so as to reset the latch circuit 106B.

That is, the latch circuit 106B outputs the "H"-level generator AC magnetic-field detection result signal SC, indicating that an AC magnetic field generated by the generator has been detected, to the duty down counter 107 and the correcting-driving-pulse output determining circuit 108 until the output signal of the output terminal Q of the counter 106D subsequently becomes an "H" level to reset the detection results.

When the "H"-level high-frequency magnetic-field detection result signal SE is input since a high-frequency magnetic field has been detected, or when the "H"-level AC magnetic-field detection result signal SF is input since an AC magnetic field has been detected, and when the "L"-level rotation-detection result signal SG is input since the rotation of the pulse motor 10 has not been detected, the OR circuit 108A of the correcting-driving-pulse output determining circuit 108 outputs the "H"-level output signal to the AND circuit 108B.

When the correcting driving pulses P2+Pr are input, and when the "H"-level output signal is input from the OR circuit 108A, the AND circuit 108B outputs the correcting driving pulses P2+Pr to the OR circuit 108D.

Meanwhile, when the "H"-level generator AC magnetic-field detection result signal SC is input after detecting a generator AC magnetic field, and when the "H"-level rotation-detection result signal SG, indicating that the rotation of the pulse motor 10 has been detected, is input, and when the correcting driving pulses P3+Pr' are input, the AND circuit 108C outputs the correcting driving pulses P3+Pr' to the OR circuit 108D.

In this case, since only either of the correcting driving pulses P2+Pr and the correcting driving pulses P3+Pr' are output if they are to be output, the OR circuit 108D suitably outputs the correcting driving pulses P2+Pr or the correcting driving pulses P3+Pr' to the motor driving circuit 109.

That is, when a high-frequency magnetic field/AC magnetic field is detected, or the rotation of the pulse motor 10 is not rotated, the correcting driving pulses P2+Pr are output to the motor driving circuit 109 as the correcting driving pulses SJ. When a generator AC magnetic field is detected, and when the rotation of the pulse motor 10 is detected, the correcting driving pulses P3+Pr' are output to the motor driving circuit 109 as the correcting driving pulses SJ.

[7] EXAMPLES OF MODIFICATIONS TO FIRST THROUGH SIXTH EMBODIMENTS

[7.1] First Modification Example

In the foregoing first through sixth embodiments, a single motor is controlled. However, if a plurality of motors are installed within the same environment, for example, if a plurality of motors are integrated in a watch, they may be simultaneously controlled by a single generation detecting circuit (generator AC magnetic-field detection circuit).

[7.2] Second Modification Example

In the foregoing first through sixth embodiments, a generator AC magnetic field of the generator portion is detected based on the generation voltage. However, a magnetic-field detection sensor, such as a Hall device, may be used for directly detecting a generation magnetic field of the generator portion, and when a predetermined amount or more of a magnetic field is detected, the correcting driving pulse control may be performed.

In this case, too, even when the storage device is in the overcharging-prevention state, a magnetic field accompanied by power generation must be generated in the generator portion. In this case, the driving of the motor can be reliably corrected.

[7.3] Third Modification Example

A determination as to whether a magnetic field by power generation (hereinafter referred to as "generation magnetic field) has been generated by the generation magnetic-field detection means (corresponding to the generation detection circuit in the first through sixth embodiment) in the present invention may be made not only during a predetermined period, but also any time while a generation magnetic field can be detected.

[7.4] Fourth Modification Example

In the aforementioned first through sixth embodiments, when a generation magnetic field has been detected, the correcting driving pulses are output instead of the normal driving pulses. Alternatively, the output of the normal driving pulses may not be inhibited, and the normal driving pulses may be output before the output of the correcting driving pulses.

In this case, it is necessary to consider the polarities of both the driving pulses so that the motor is driven to an accurate position without being excessively driven by the correcting driving pulses and the normal driving pulses. More specifically, even when power generation is detected after the motor is rotated by the normal driving pulses, and the correcting driving pulses are output, the following modification may be made. The polarity of the correcting driving pulses may be set to the same polarity of the normal driving pulses. Then, since the current flows in the motor coil in the same direction, the polarity of the correcting driving pulses is opposite to the direction of the current corresponding to the subsequent rotation direction of the motor. As a result, the motor which has been rotated by the normal driving pulses is not rotated any more by the correcting driving pulses.

[7.5] Fifth Modification Example

As generation means of the present invention, any type of generation means may be used as long as a magnetic field is generated by power generation.

[7.6] Sixth Modification Example

Although in the foregoing embodiments the present invention is described by taking a watch-type timepiece as an example, any type of timepiece which is provided with a motor and which generates a magnetic field when power is generated may be used.

[7.7] Seventh Modification Example

Although in the first through sixth embodiments the present invention is described by taking a watch-type timepiece as an example, any type of electronic apparatus which is provided with a motor and which generates a magnetic field when power is generated may be used in the present invention.

For example, electronic apparatuses, such as music players, music recorders, image players, and image recorders (for CDs, MDs, DVDs, magnetic tape, etc.) or portable units of these players, and computer peripheral devices (floppy disk drives, hard disk drives, MO drives, DVD drives, printers, etc.) and portable units of these devices, may be used.

[8] ADVANTAGES OF FIRST THROUGH SIXTH EMBODIMENTS

According to the first through sixth embodiments, when the charging current flows into the storage device by power generation of the generator, and when a generation magnetic field from the generator is detected, the correcting driving pulses are output. Thus, the motor can be driven correctly and reliably without being influenced by a generation magnetic field. Further, when the correcting driving pulses are output, the outputs of the normal driving pulses and the high-frequency magnetic-field detection pulses are discontinued. Thus, wasteful power consumption can be prevented.

According to the fourth and fifth embodiments, even when the storage device is not being charged, the correcting driving pulses are output if power is generated by the generator while the overcharging-prevention current for preventing overcharging flows. As a result, the motor can be driven correctly and reliably without being influenced by a magnetic field (generation magnetic field) originating from the overcharging-prevention current.

Moreover, since the generation detecting circuit detects power generation via a path different from the actual charging path, the charging efficiency is not lowered.

Further, it is not necessary to preset the amount of generation power which causes a malfunction of the motor by measurements. This eliminates the need to set the generation power used as a reference by measurements every time the mechanical structure of the generator or the motor is changed.

[9] OTHER ASPECTS OF FIRST THROUGH SIXTH EMBODIMENTS

[9.1] First Example of Other Aspects

According to a first example of other aspects of the first through sixth embodiments, in a control method for an electronic apparatus which has a generator device for generating power, a charging device for storing the generated electric energy, and a motor driven by the electric energy stored in the storage device, the control method includes: a pulse-driving control step of controlling the driving of the motor by outputting a normal driving pulse signal; a generation magnetic-field detection step of detecting whether a magnetic field is generated by the power generation; and a correcting-driving-pulse output step of outputting a correcting driving pulse signal having an effective power greater than the normal driving pulse signal to the motor when it is detected in the generation magnetic-field detection step that a magnetic field has been generated by power generation. The above-described generation magnetic-field detection step includes a charging-state determining step of making a determination by assuming that a magnetic field has been generated by the above-described power generation when a charging current flows into the storage device by power generation of the generator device.

[9.2] Second Example of Other Aspects

According to a second example of other aspects of the first through sixth embodiments, in a control method for an electronic apparatus which has a generator device for generating power, a charging device for storing the generated electric energy, and a motor driven by the electric energy stored in the storage device, the control method includes: a pulse-driving control step of controlling the driving of the motor by outputting a normal driving pulse signal; a generation magnetic-field detection step of detecting whether a magnetic field is generated by the power generation; and a correcting-driving-pulse output step of outputting a correcting driving pulse signal having an effective power greater than the normal driving pulse signal to the motor when it is detected in the generation magnetic-field detection step that a magnetic field has been generated by power generation. The above-described generation magnetic-field detection step includes an overcharging-prevention current generation determining step of making a determination by assuming that a magnetic field by the above-described power generation has been generated by an overcharging-prevention current flowing into the generator device when the storage device is in the overcharging-prevention state.

[9.4] Third Example of Other Aspects

According to a third example of other aspects of the first through sixth embodiments, in the above-described first or second example of other aspects, the generation magnetic-field detection step detects whether a magnetic field by the above-described power generation has been generated during a predetermined period.

[9.4] Fourth Example of Other Aspects

According to a fourth example of other aspects of the first through sixth embodiments, in the aforementioned third example of other aspects, the above-described predetermined period is from the time when the output of the current normal driving pulse signal in the pulse-driving control step is started to when the output of the subsequent normal driving pulse signal is started.

[9.5] Fifth Example of Other Aspects

According to a fifth example of other aspects of the first through sixth embodiments, in the third example of other aspects, the above-described predetermined period is set so that it includes a period corresponding to a detection delay time in the generation magnetic-field detection step.

[9.6] Sixth Example of Other Aspects

According to a sixth example of other aspects of the first through sixth embodiments, in the first through fifth embodiments of other aspects, the correcting-driving-pulse output step outputs the correcting driving pulse signal to the motor instead of the normal driving pulse signal.

[10] SEVENTH EMBODIMENT

As described in the first through sixth embodiments, in a timepiece having a built-in generator device and provided with a function of temporarily charging power generated by the generator device into, for example, a large-capacitance capacitor, when power is not being generated, time is indicated by the power discharged from the capacitor.

As stated in the first through sixth embodiments, while charging is being performed, the electromagnetic noise level occurring from the generator may adversely influence the motor. Moreover, during the charging, because of the internal resistance of a secondary cell, a power supply voltage may be changed by a charging current.

Accordingly, in order to avoid such problems, in an electronic timepiece integrating the above-described generator, a generation detecting circuit is provided for detecting whether power is being generated in the generator. If power is being generated, processing is performed by assuming that charging is being performed. However, even if power is detected, it does not necessarily contribute to the charging. The secondary cell is charged only by a generation voltage equal to or higher than the terminal voltage of the secondary cell so that a charging current flows. Accordingly, by detecting an absolute value of the generation voltage, power which does not contribute to charging may be disadvantageously detected, and as a result, unnecessary processing may be performed, thereby increasing power consumption.

Thus, it is an object of the seventh embodiment and eighth through twelfth embodiments, which will be discussed below, to reduce power consumption by reliably detecting the generation state and suitably performing various processing for avoiding adverse influences of power generation on the electronic apparatus.

It is another object of the seventh embodiment and the eighth through twelfth embodiments, which will be discussed below, even when a limiter circuit is operated to cause a generation current to flow into a bypassing circuit for bypassing the charging path to the storage device, to reliably detect the state in which the bypassing current flows into the bypassing circuit and to suitably perform various processing for avoiding adverse influences of power generation on the electronic apparatus.

It is needless to say that the configurations of the seventh through twelfth embodiments are applicable to the foregoing first through sixth embodiments within the scope of the objects.

[10.2] Functional Configuration of Control System

Figure 18:
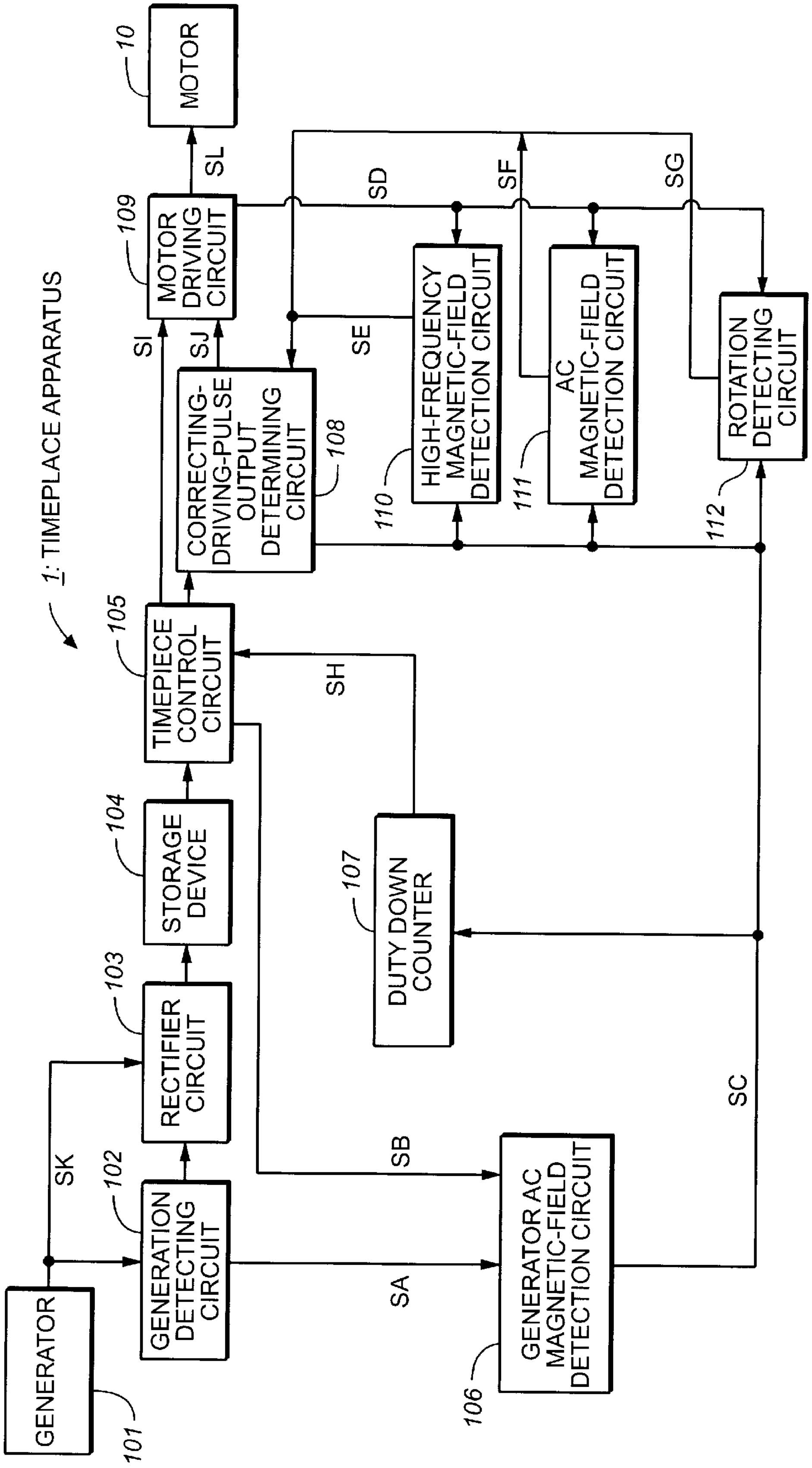
FIG. 18 is a block diagram illustrating the functional configuration of a control unit and circuits near the control circuit according to a seventh embodiment.

The functional configuration of the control system of the seventh embodiment is discussed below with reference to FIG. 18. In FIG. 18, the same elements as those shown in FIG. 2 are designated with like reference numerals.

A timepiece apparatus 1 includes: a generator portion 101 for generating AC power; a generation detecting circuit 102 for detecting power generation based on the generation voltage SK of the generator portion 101 and for outputting the generation-detection result signal SA; a rectifier circuit 103 for rectifying an alternating current output from the generator portion 101 and converting it into a direct current; a storage device 104 for storing the direct current output from the rectifier circuit 103; a timepiece control circuit 105 which is operated by the electric energy stored in the storage device 104 and which outputs the normal motor-driving pulses SI for performing timepiece control and also outputs the generator AC magnetic-field detection timing signal SB for specifying the detection timing of a generator AC magnetic field; and a generator AC magnetic-field detection circuit 106 for detecting a generator AC magnetic field based on the generation-detecting result signal SA and the generator AC magnetic-field detection timing signal SB, and for outputting the generator AC magnetic-field detection result signal SC.

The timepiece apparatus 1 also includes: a duty down counter 107 for outputting the normal-motor-driving-pulse duty down signal SH for controlling the duty down of the normal motor-driving pulses based on the generator AC magnetic-field detection result signal SC; a correcting-driving-pulse output circuit 108 for determining whether the correcting driving pulses SJ are to be output, based on the generator AC magnetic-field detection result signal SC, and for outputting correcting driving pulses SJ if necessary; a motor driving circuit 109 for outputting motor driving pulses SL for driving the pulse motor 10, based on the normal motor-driving pulses SI or the correcting driving pulses SJ; a high-frequency magnetic-field detection circuit 110 for detecting a high-frequency magnetic field based on the generator AC magnetic-field detection result signal SC and the induction voltage signal SD output from the motor driving circuit 109, and for outputting the high-frequency magnetic-field detection result signal SE; an AC magnetic-field detection circuit 111 for detecting an AC magnetic field based on the generator AC magnetic-field detection result signal SC and the induction voltage signal SD output from the motor driving circuit 109, and for outputting the AC magnetic-field detection result signal SF; and a rotation detection circuit 112 for detecting whether the motor 10 is rotated based on the generator AC magnetic-field detection result signal SC and the induction voltage signal SD output from the motor driving circuit 109, and for outputting the rotation-detection result signal SG.

[10.3] Generation Detecting Circuit

[10.3.1] Configuration of generation detecting circuit

Figure 19:
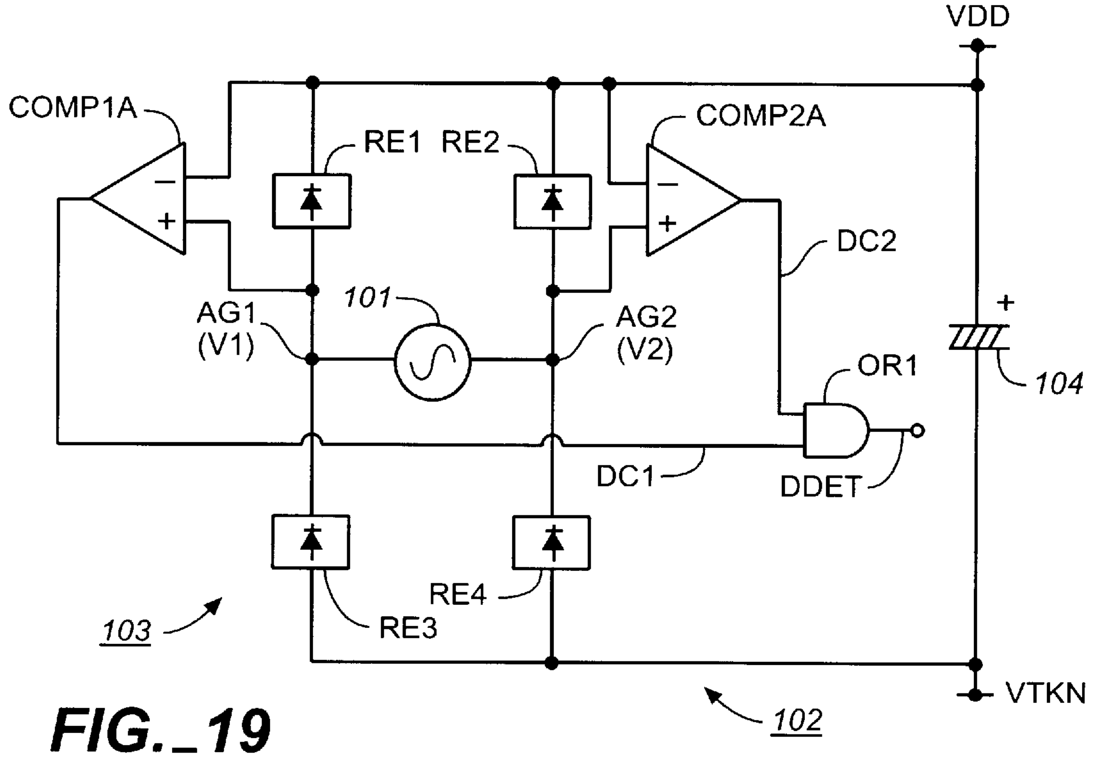
FIG. 19 illustrates the configuration of a generation detecting circuit according to the seventh embodiment.

FIG. 19 illustrates an example of the configuration of the peripheral circuits near the generation detecting circuit when full-wave rectification is performed.

FIG. 19 illustrates the generation detecting circuit 102, and the peripheral circuits located near the generation detecting circuit 102, that is, the generator portion 101 for generating AC power, the rectifier circuit 103 for rectifying an alternating current output from the generator portion 101 and for converting it into a direct current, and the storage device 104 for storing the direct current output from the rectifier circuit 103.

The generation detecting circuit 102 is formed of: a first comparator COMP1A for outputting first comparison result data DC1 by comparing a voltage V1 of a first output terminal AG1 of the generator portion 101 with the high-potential terminal voltage VDD of the storage device 104; a second comparator COMP2A for outputting second comparison result data DC2 by comparing a voltage V2 of a second output terminal AG2 of the generator portion 101 with the high-potential terminal voltage VDD of the storage device 104; and an OR circuit OR1 for outputting a logical OR of the first comparison result data DC1 and the second comparison result data DC2 as generation detected data DDET.

The comparators COMP1A and COMP2A are discussed below.

As stated above, in this embodiment, full-wave rectification is performed. However, the present invention is also applicable to half-wave rectification.

Figure 20:
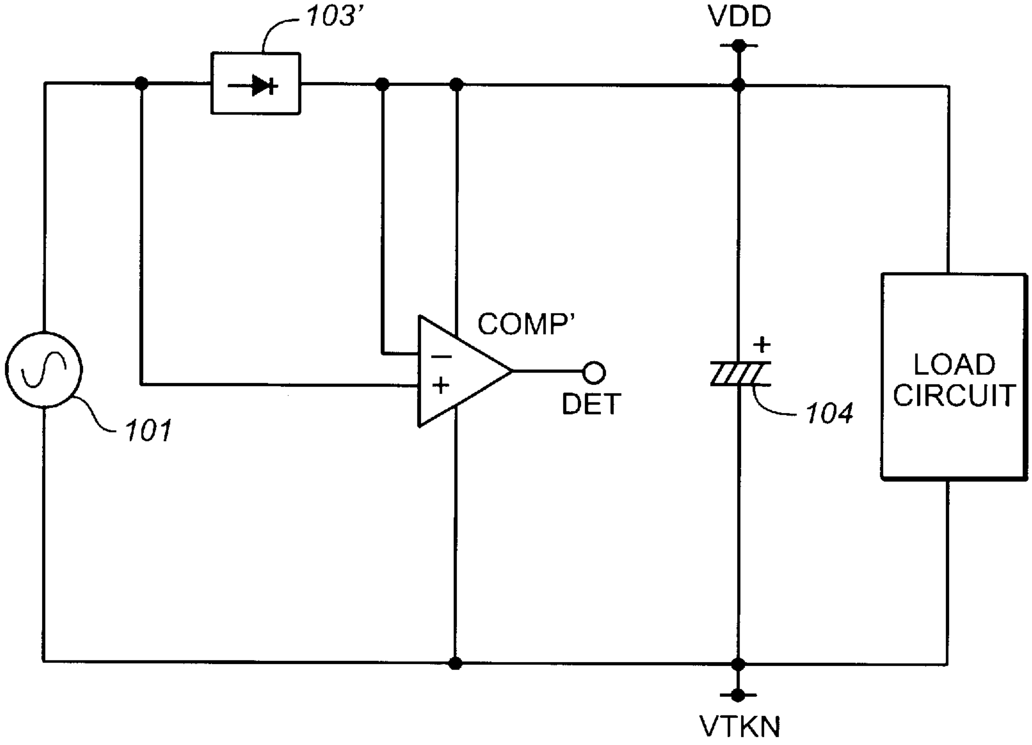
FIG. 20 illustrates an embodiment when half-wave rectification is performed.

That is, the configuration shown in FIG. 20 may be used.

As shown in FIG. 20, however, when half-wave rectification is performed by a half-wave rectifier circuit 103', in the case of a generation phase which does not contribute to charging, a generation voltage having a maximum of few tens of [V] is applied from the generator 101 to the non-inverting input terminal (+) of a comparator COMP'. Thus, as the comparator COMP', a device having a high breakdown voltage is required. In this case, the comparator COMP' is operated by the power supplied from the storage device 104.

In contrast, when full-wave rectification is performed, such as in the seventh embodiment, a maximum voltage of about only (the storage device 104+0.6 [V]) is generated at the output terminals AG1 and AG2 of the generator 101. Accordingly, devices having a low breakdown voltage can be used as the comparators COMP1A and COMP2A.

As a result, the comparators COMP1A and COMP2A can be manufactured according to an IC process, which is typically used for timepieces, thereby making it possible to miniaturize the circuit and reduce the cost.

Thus, if it is desired that the circuit configuration be simplified by eliminating the need to use devices which are resistance to a low breakdown voltage, the configuration for half-wave rectification shown in FIG. 20 may be used.

An example of the comparators COMP1A and COMP2A connected to the high potential voltage Vdd is discussed below with reference to FIG. 21.

Figure 21:
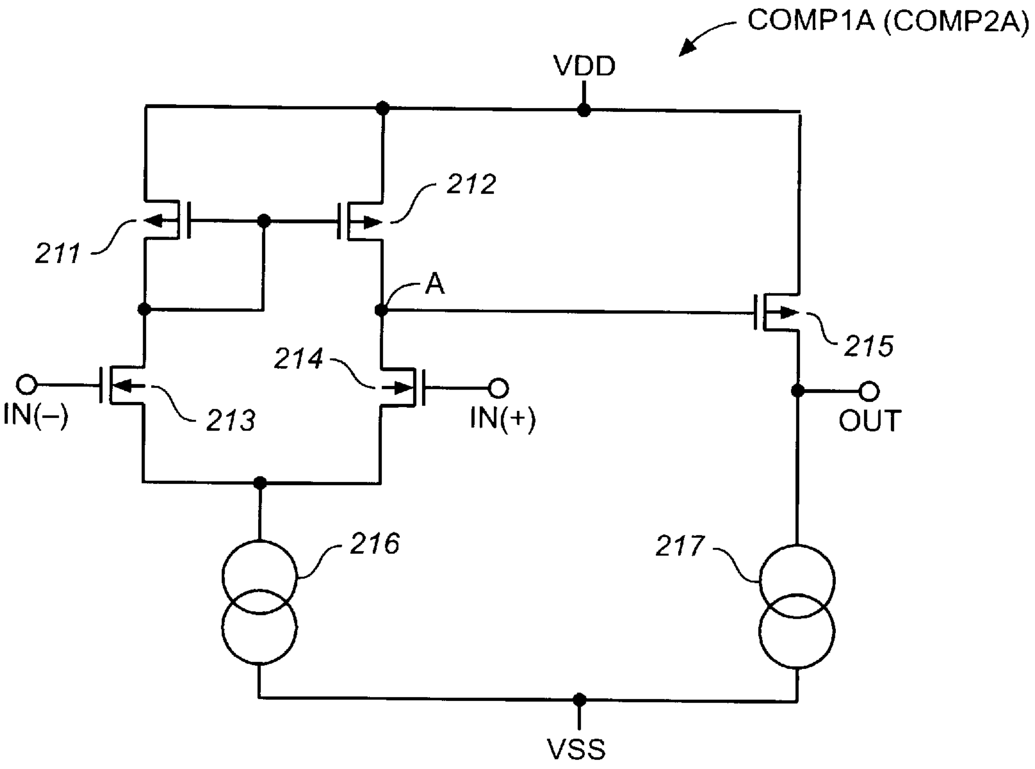
FIG. 21 illustrates the detailed configuration of a comparator according to the seventh embodiment.

The comparator COMP1A or COMP2A is formed of, as shown in FIG. 21, a pair of load transistors 211 and 212, a pair of input transistors 213 and 214, an output transistor 215, and constant-current sources 216 and 217. Among the above elements, the load transistors 211 and 212 and the output transistor 215 are P-channel field effect transistors, while the input transistors 213 and 214 are N-channel field effect transistors. The gates of the input transistors 213 and 214 respectively serve as the negative input terminal (−) and the positive input terminal (+) of the comparator COMP1A (COMP2A), and the drain of the output transistor 215 serves as the output terminal OUT.

With this configuration, the load transistors 211 and 212 serve as a current mirror circuit, and thus, the current values flowing into the load transistors 211 and 212 are the same. Accordingly, a current (voltage) difference flowing into the gates of the input transistors 213 and 214 is amplified, and the current difference is generated at terminal A. Since the transistors 211 and 212, which receive the current difference, accept only the same current value, the current (voltage) difference is gradually amplified and flows into the gate of the transistor 215.

As a result, if the gate current (voltage) of the transistor 214, which serves as the positive input terminal (+), exceeds the gate current (voltage) of the transistor 213, which serves as the negative input terminal (−), even in the slightest, the drain voltage of the transistor 215, which serves as the output terminal OUT of the comparator COMP1A (COMP2A), is sharply shifted to the high potential voltage Vdd, and otherwise, it is sharply shifted to the low potential voltage Vss.

According to the above-constructed comparator COMP1A (COMP2A), the transistors 211 and 212 are used as active loads, thereby eliminating the need to use a resistor except for the constant-current sources 216 and 217. It is thus extremely advantageous in integrating the comparator COMP1A (COMP2A).

Typically, the response delay time of a comparator which is formed of MOS transistors is proportional to "Cg/Iop", where Cg represents the gate capacitance of an output transistor, and Iop indicates the operation current of the comparator. That is, the response delay time is almost inversely proportional to the consumption current. In an electronic timepiece driven by power from a built-in generator, large power cannot be obtained since the size of the generator is limited because of space, that is, the electronic timepiece. Thus, in order to ensure the input/output balance of power, a lower-current-consumption circuit is desired. In the comparators COMP1A and COMP2A, a minimal consumption of current is desired, and the operation current Iop should be reduced to a minimal level. Accordingly, the response delay time of the comparators COMP1A and COMP2A tends to become longer.

The rectifier circuit 103 is formed of a first rectifier element RE1 and a fourth rectifier element RE4, which conduct when the voltage V1 of one output terminal AG1 of the generator portion 101 becomes higher than the high-potential terminal voltage VDD of the storage device 104, and a second rectifier element RE2 and a third rectifier element RE3, which conduct when the voltage V2 of the other output terminal AG2 of the generator portion 101 becomes higher than the high-potential terminal voltage VDD of the storage device 1104.

In this case, the rectifier elements RE1 through RE4 may be passive rectifier elements, such as diodes, or active rectifier elements, such as a combination of transistors and comparators.

The operation of the generation detecting circuit is discussed below.

When the generator portion 101 starts generating power, the generation voltage is supplied to both the output terminals AG1 and AG2. In this case, the phase of the terminal voltage V1 of the output terminal AG1 and the phase of the terminal voltage V2 of the output terminal AG2 are inverted with respect to each other.

When the terminal voltage V1 of the output terminal AG1 becomes higher than the voltage V2 of the output terminal AG2 by a predetermined voltage or higher, and exceeds the high-potential terminal voltage VDD of the storage device 104, the first rectifier element RE1 and the fourth rectifier element RE4 conduct. Thus, the generation current flows in a path "terminal AG1→first rectifier element RE1→power supply VDD→storage device 104→power supply VTKN→fourth rectifier circuit RE4", so as to charge the storage device 104.

Then, the first comparison result data DC1 output from the first comparator COMP1A becomes an "H" level.

As a result, the generation detected data DDET output from the OR circuit OR1 becomes an "H" level, indicating that power generation has been detected.

Similarly, when the terminal voltage V2 of the output terminal AG2 becomes higher than the high-potential terminal voltage VDD of the storage device 104, the second rectifier element RE2 and the third rectifier element RE3 conduct. Accordingly, the generation current flows in a path "terminal AG2→second rectifier element RE2→power supply VDD→storage device 104→power supply VTKN→third rectifier element RE3", so as to charge the storage device 104.

Then, the second comparison result data DC2 output from the second comparator COMP2A becomes an "H" level.

As a result, the generation detected data DDET output from the OR circuit OR1 becomes an "H" level, indicating that power generation has been detected.

In this manner, power generation having a voltage higher than the terminal voltage of the storage device 104 can be detected, thereby making it possible to reliably detect power generation.

[10.3]

Figure 4:
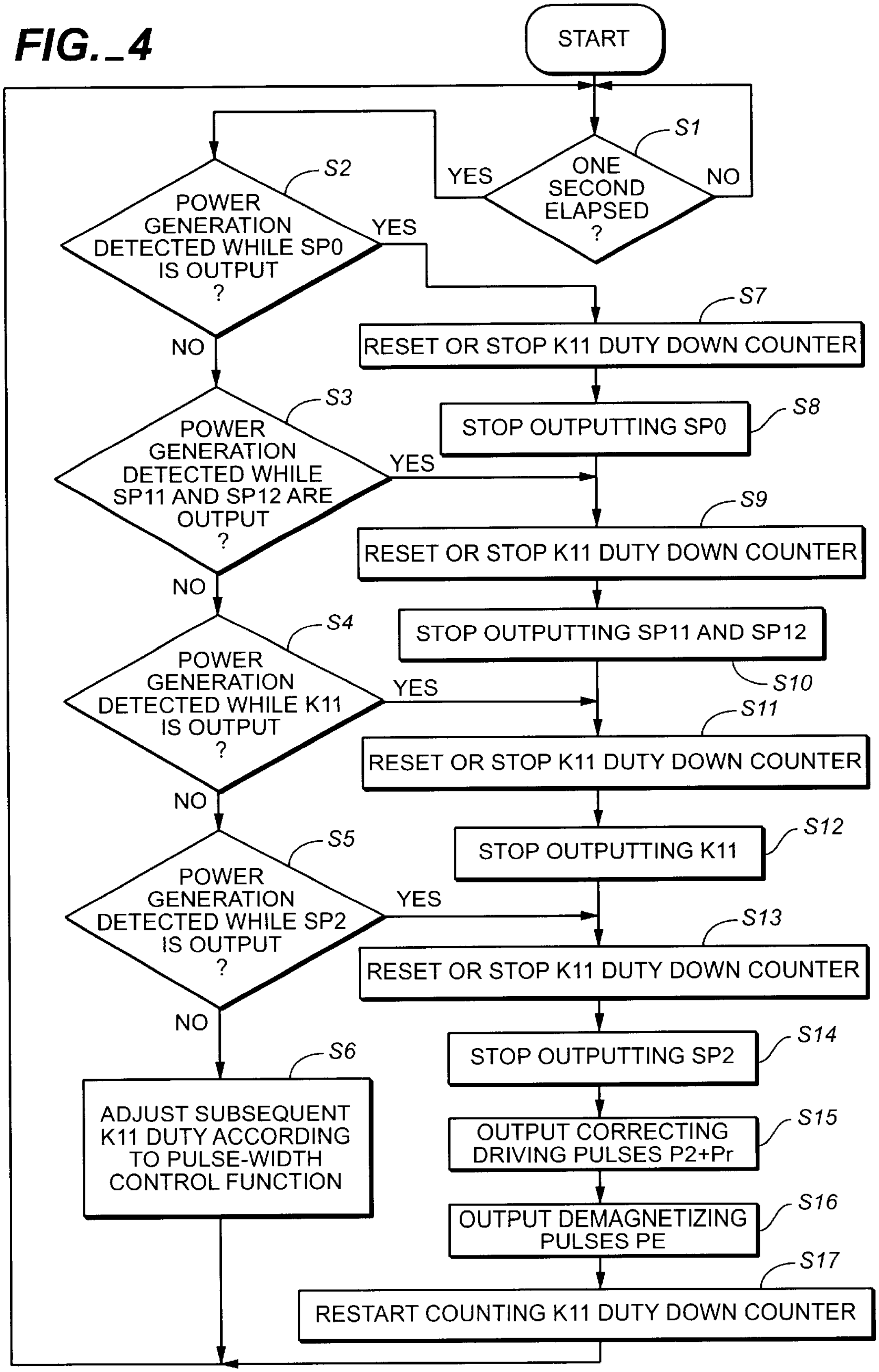
FIG. 4 is a processing flow chart of the first embodiment and a second embodiment.

A description is now given of the operation of the timepiece apparatus 1 with reference to the process flow chart of FIG. 4.

It is first determined whether one second has elapsed after the timepiece apparatus 1 was reset or the previous driving pulse was output (step S1).

If it is determined in step S1 that one second has not elapsed, it is not the time to output a driving pulse, and thus, the timepiece apparatus 1 enters the waiting state.

If it is determined in step S1 that one second has elapsed, it is determined by the generation detecting circuit 102 whether power generation for charging the storage device has been detected while the high-frequency magnetic-field detection pulse signal SP0 is being output (step S2).

[10.3.1] Processing to be performed when power generation for charging the storage device 104 is detected by the generation detecting circuit 102 while the high-frequency magnetic-field detection pulses SP0 are being output If it is determined in step S2 that power generation for charging the storage device 104 is detected by the generation detecting circuit 102 while the high-frequency magnetic-field detection pulse signal SP0 is being output (step S2; Yes), the duty down counter for lowering the duty ratio so as to reduce the effective power of the normal motor-driving pulses K11 is reset (set to a predetermined initial duty-down-counter value), or counting down of the duty down counter is discontinued (step S7).

In this case, counting by the duty down counter means driving with normal motor-driving pulses K11 of a lower duty ratio when the pulse motor is subsequently driven. However, because of an AC magnetic field from the generator portion 101 for charging the storage device 104, the pulse motor cannot be driven by the normal motor-driving pulses K11, and thus, the output of correcting driving pulses is encouraged.

Accordingly, the duty down counter is reset, or counting down of the duty down counter is discontinued, thereby preventing a reduction in the duty ratio of the normal motor-driving pulses K11 used for subsequently driving the pulse motor.

Then, the output of the high-frequency magnetic-field detection pulses SP0 is discontinued (step S8).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S9). This processing is provided for the case in which a determination at step S3, which will be described below, is Yes, and since the processing has already been executed in step S7, it is not performed in step S9 in practice.

Then, the output of the AC magnetic-field detection pulses SP11 and the AC magnetic-field detection pulses P12 is discontinued (step S10).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S11). This processing is provided for the case in which a determination at step S4, which will be described below, is Yes, and since the processing has already been executed in step S7, it is not performed in step S11 in practice.

Then, the output of the normal driving motor pulses K11 is discontinued (or suspended) (step S12).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S7, it is not performed in step S13 in practice.

Then, the output of the rotation detection pulses SP2 is discontinued (step S14).

The correcting driving pulses P2+Pr are then output (step S15). In this case, in actuality, the correcting driving pulses P2 drive the pulse motor 10, and the correcting driving pulses Pr are used for speedily shifting the pulse motor to a steady state by inhibiting vibrations after the rotor is rotated after driving the pulse motor.

Then, in order to cancel a residual magnetic flux accompanied by an application of the correcting driving pulses P2+Pr, demagnetizing pulses PE of the opposite polarity to the correcting driving pulses P2+Pr are output (step S16).

The role of the demagnetizing pulses PE is discussed below.

Intrinsically, an induction voltage must be generated in the motor driving coil by a leakage flux of the generator.

However, when the AC magnetic-field detection voltage based on the AC magnetic-field detection pulses exceeds a threshold, by an application of the correcting driving pulses P2+Pr having a large effective power, an induction voltage is not generated in the motor driving coil because of a residual magnetic flux.

Moreover, normally, the detection voltage based on the rotation detection pulses SP2 when the pulse motor is not rotated does not exceed a threshold. However, because of an influence of a residual magnetic flux after applying the correcting driving pulses P2+Pr, a leakage flux of the generator is superimposed on the detection voltage, which thus may exceed the threshold and may be erroneously considered as a detection voltage when the pulse motor is rotated.

Thus, in order to eliminate such an adverse influence, the residual magnetic flux is canceled by the demagnetizing pulses PE having the opposite polarity to the correcting driving pulses P2+Pr.

In this case, it is more effective to output the demagnetizing pulses PE immediately before an external magnetic field is detected.

The pulse width of the demagnetizing pulses PE is narrow (short) enough so as not to rotate the rotor, and a plurality of intermittent pulses may desirably be provided in order to further enhance the demagnetizing effect.

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[10.3.2] Processing to be performed when power generation for charging the storage device 104 is detected by the generation detecting circuit 102 while the AC magnetic-field detection pulses SP11 or the AC magnetic-field detection pulses SP12 are being output If it is determined in step S2 that power generation for charging the storage device 104 has not been detected by the generation detecting circuit 102 while the high-frequency magnetic-field detection pulses SP0 are being output (step S2; No), it is determined whether power generation for charging the storage device 104 has been detected by the generation detecting circuit 102 while the AC magnetic-field detection pulses SP11 or the AC magnetic-field detection pulses SP12 are being output (step S3).

If it is determined in step S3 that power generation for charging the storage device 104 has been detected by the generation detecting circuit 102 while the AC magnetic-field detection pulses SP11 or the AC magnetic-field detection pulses SP12 are being output (step S3; Yes), the duty down counter for lowering the duty ratio so as to reduce the effective power of the normal motor driving pulses K11 is reset (set to a predetermined initial duty-down-counter value), or counting down of the duty down counter is discontinued (step S9).

Then, the output of the AC magnetic-field detection pulses SP11 and the AC magnetic-field detection pulses SP12 is discontinued (step S10).

Subsequently, the duty down counter for lowering the duty ratio so as to reduce the effective power of the normal motor driving pulses K11 is reset (set to a predetermined initial duty-down-counter value), or counting down of the duty down counter is discontinued (step S11). This processing is provided for the case in which a determination at step S4, which will be described below, is Yes, and since the processing has already been executed in step S9, it is not performed in step S11 in practice.

Then, the output of the normal driving motor pulses K11 is discontinued (or suspended) (step S12).

Subsequently, the duty down counter for lowering the duty ratio so as to reduce the effective power of the normal motor driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S9, it is not performed in step S13 in practice.

The output of the rotation detection pulses SP2 is then discontinued (step S14).

Then, the correcting driving pulses P2+Pr are output (step S15). In this case, in actuality, the correcting driving pulses P2 drive the pulse motor 10, and the correcting driving pulses Pr are used for speedily shifting the pulse motor to a steady state by inhibiting vibrations after the rotor is rotated after driving the pulse motor.

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[10.3.3] Processing to be performed when power generation for charging the storage device 104 is detected by the generation detecting circuit 102 while the normal driving pulses K11 are being output If it is determined in step S3 that power generation for charging the storage device 104 by the generation detecting circuit 102 has not been detected while the AC magnetic-field detection pulses SP11 or the AC magnetic-field detection pulses SP12 are being output (step S3; No), it is determined whether power generation for charging the storage device 104 has been detected by the charging detection circuit 102 while the normal driving pulses K11 are being output (step S4).

If it is determined in step S4 that power generation for charging the storage device 1104 has been detected by the generation detecting circuit 102 while the normal driving pulses K11 are being output (step S4; yes), the duty down counter for lowering the duty ratio so as to reduce the effective power of the normal motor-driving pulses K11 is reset (set to a predetermined initial duty-down-counter value), or counting down of the duty down counter is discontinued (step S11).

Then, the output of the normal driving pulses K11 is discontinued (or suspended) (step S12).

Subsequently, the duty down counter for lowering the duty ratio so as to reduce the effective power of the normal motor-driving pulses K11 is reset (set to a predetermined initial duty-down-counter value), or counting down of the duty down counter is discontinued (step S13). This processing is provided for the case in which a determination at step S5, which will be described below, is Yes, and since the processing has already been executed in step S11, it is not performed in step S13 in practice.

The output of the rotation detection pulses SP2 is discontinued (step S14).

Then, the correcting driving pulses P2+Pr are output (step S15).

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[10.3.4] Processing to be performed when power generation for charging the storage device 1104 has been detected by the generation detecting circuit 102 while the rotation detection pulses SP2 are being output If it is determined in step S4 that power generation for charging the storage device 104 has not been detected by the generation detecting circuit 102 while the normal driving pulses K11 are being output (step S4; No), it is determined whether power generation for charging the storage device 104 has been detected by the generation detecting circuit 102 while the rotation detection pulses SP2 are being output (step S5).

If it is determined in step S5 that power generation for charging the storage device 104 has been detected by the generation detecting circuit 102 while the rotation detection pulses SP2 are being output (step S5; Yes), the duty down counter for lowering the duty ratio so as to reduce the effective power of the normal motor-driving pulses K11 is reset (set to a predetermined initial duty-down-counter value), or counting down of the duty down counter is discontinued (step S13).

The output of the rotation detection pulses SP2 is discontinued (or suspended) (step S14).

The, the correcting driving pulses P2+Pr are output (step S15).

Thereafter, in order to cancel a residual magnetic flux accompanied by an application of the correcting driving pulses P2+Pr, the demagnetizing pulses PE of the opposite polarity to the correcting driving pulses P2+Pr are output (step S16).

Upon completion of outputting the demagnetizing pulses PE, counting of the duty down counter is restarted (step S17), and the duty ratio of the normal driving pulses K11 is set so that power consumption can be minimized and the correcting driving pulses P2+Pr are not output.

The process then returns to step S1, and processing similar to the above-described processing is repeated.

[10.3.5] Processing to be performed when power generation for charging the storage device 104 has not been detected It is now assumed that power generation for charging the storage device 104 has not been detected while the high-frequency magnetic-field detection pulse signal SP0 is being output (step S2; No), power generation for charging the storage device 104 has not been detected while the AC magnetic-field detection pulses SP11 or the AC magnetic-field detection pulses SP12 are being output (step S3; No), power generation for charging the storage device 104 has not been detected while the normal driving pulses K11 are being output (step S4; No), and power generation for charging the storage device 104 has not been detected while the rotation detection pulses SP2 are being output (step S5; No). In this case, the duty ratio of the subsequent normal driving pulses K11 is reduced from that of the current normal driving pulses K11 if the conditions for reducing the duty ratio are met. On the other hand, if the duty ratio cannot be reduced further, i.e., if the duty ratio is the preset lowest duty ratio, the pulse width is controlled so that the current duty ratio is maintained (step S6).

[10.4] Advantages of Seventh Embodiment

As described above, according to the seventh embodiment, the power generation for reliably charging the storage device is detected. Thus, measures are reliably taken to prevent adverse influences of the power generation, and also, unnecessary measures can be prevented, thereby making it possible to reduce power consumption.

The seventh embodiment is configured to detect the generation voltage, which can be achieved without influencing the generation current and the charging performance. This is different from a generation detecting method in which a resistor is inserted in the charging path. It is thus possible to perform the generation detecting operation at any time since the generation detecting operation does not lower the charging performance.

[11] EIGHTH EMBODIMENT

In the seventh embodiment, the generation detecting circuit 102 simply compares the generation voltage of the generator portion 101 with the high-potential terminal voltage of the storage device 104. In an eighth embodiment, however, instead of the high-potential terminal voltage of the storage device 104, a predetermined offset voltage is added to the high-potential terminal voltage of the storage device 104, thereby detecting the charging state more reliably.

[11.1] Generation Detecting Circuit

[11.1.1] Configuration of generation detecting circuit

Figure 22:
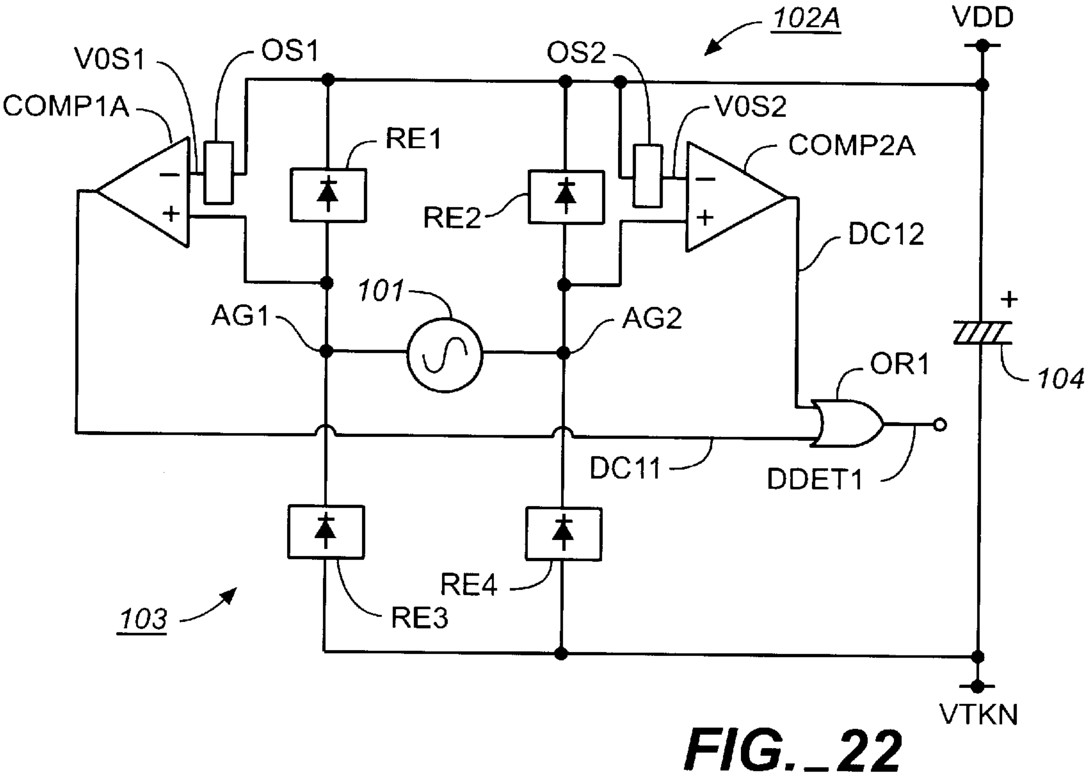
FIG. 22 illustrates the configuration of a generation detecting circuit of an eighth embodiment.

FIG. 22 illustrates an example of the configuration of the circuits located near the generation detecting circuit. In FIG. 22, the same elements as those shown in FIG. 19 are designated with like reference numerals.

FIG. 22 illustrates a generation detecting circuit 102A and circuits located near the generation detecting circuit 102A, that is, the generator portion 101 for generating AC power, the rectifier circuit 103 for rectifying an alternating current output from the generator portion 101 and for converting it into a direct current, and the storage device 104 for storing the direct current output from the rectifier circuit 103.

The generation detecting circuit 102A is formed of: a first offset-voltage addition circuit OS1 for adding a predetermined offset voltage to the high-potential terminal voltage VDD of the storage device 104 and for outputting a first offset terminal voltage VOS1; a second offset-voltage addition circuit OS2 for adding a predetermined offset voltage to the high-potential terminal voltage VDD of the storage device 104 and for outputting a second offset terminal voltage VOS2; a first comparator COMP1A for outputting first comparison result data DC11 by comparing the voltage V1 of the first output terminal AG1 of the generator portion 101 with the first offset terminal voltage VOS1; a second comparator COMP2A for outputting second comparison result data DC12 by comparing the voltage V2 of the second output terminal AG2 of the generator portion 101 with the second offset terminal voltage VOS2; and an OR circuit OR1 for outputting a logical OR of the first comparison result data DC11 and the second comparison result data DC12 as generation detected data DDET1.

The comparators COMP1A and COMP2A are discussed below.

The comparators COMP1A and COMP2A receive the voltage levels shifted by the offset-voltage addition circuits OS1 and OS2, respectively. This configuration may be implemented by changing the threshold voltages Vth of the input transistors 213 and 214 shown in FIG. 21.

More specifically, the threshold voltage Vth of the transistor 213 at the negative input terminal (−) is set to be greater than that of the transistor 214 at the positive input terminal (+), thereby obtaining advantages comparable to those obtained by the offset-voltage addition circuits OS1 and OS2 shown in FIG. 22.

In this case, the threshold voltages Vth of the input transistors 213 and 214 may be varied by changing the transistor size. More specifically, the gate width of the input transistor 213 is set to be narrower than that of the input transistor 214, thereby increasing the threshold voltage Vth of the input transistor 213. Alternatively, the threshold voltages Vth of the input transistors 213 and 214 may be changed by a process method, such as impurity implantation.

Figure 23:
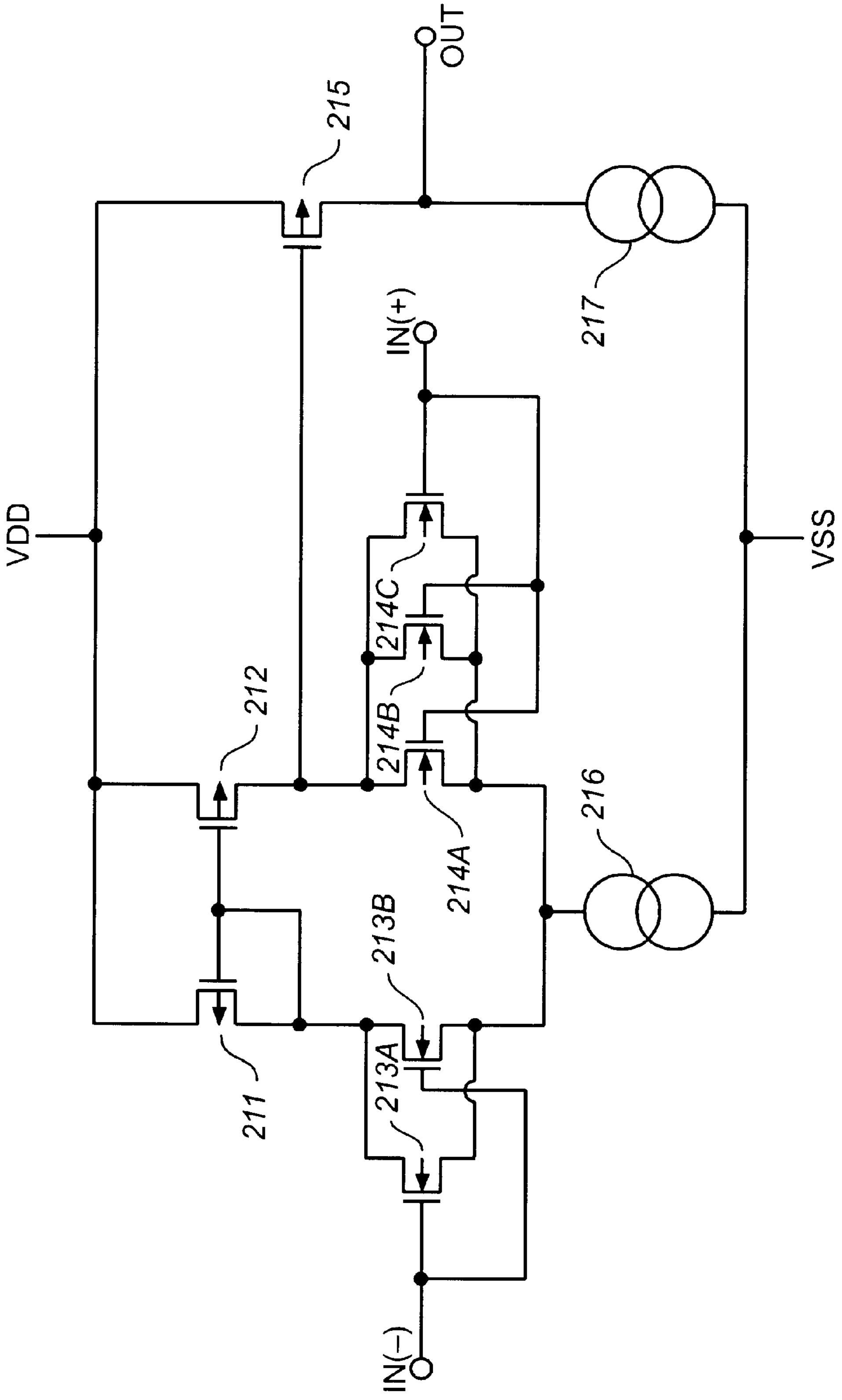
FIG. 23 illustrates the detailed configuration of a comparator according to the eighth embodiment.

Alternatively, by connecting transistors having the same size and the same capacity in parallel with each other, as shown in FIG. 23, a circuit equivalent to the transistor 213 or 214 can be implemented. That is, instead of the transistor 213, two transistors 213A and 213B having the same size and the same capacity are connected in parallel with each other. Or, instead of the transistor 214, transistors 214A, 214B, and 214C having the same size and the same capacity are connected in parallel with each other.

With this configuration, the capacity of the pair of differential transistors at the positive input terminal (+) becomes higher, and unless the terminal voltage at the negative input terminal (−) is set lower than the voltage of the positive input terminal (+), the transistors 214A, 214B, and 214C are not turned on. Accordingly, the output of the comparator is not inverted.

In the detection operation of the comparator, for example, by using the positive input terminal (+) as a reference, and a high potential voltage Vdd is applied to the positive input terminal (+). In this case, only when a voltage, which is equal to Vdd+$\alpha$, and is thus higher than the voltage Vdd by the voltage $\alpha$, is applied to the negative input terminal (−), the comparator is inverted to output an "L" level.

The operation of the generation detecting circuit is discussed below.

When the generator portion 101 starts generating power, the generation voltage is supplied to both the output terminals AG1 and AG2. In this case, the phase of the terminal voltage V1 of the output terminal AG1 and the phase of the terminal voltage V2 of the output terminal AG2 are inverted with respect to each other. The offset voltages VOS1 and VOS2 are set based on the forward direction voltage VF of the rectifier elements RE1 and RE2. That is, if rectification is performed by diodes having a comparatively large forward direction voltage VF, the offset voltage is set on the order of few hundreds of [mV]. If active rectification is performed by diodes having a relatively small forward direction voltage, the offset voltage is set on the order of few tens of [mV].

When the terminal voltage V1 of the output terminal AG1 becomes higher than the voltage V2 of the output terminal AG2 by a predetermined voltage or higher, and further exceeds the first offset voltage VOS1 (=the high-potential terminal voltage VDD of the storage device 104+offset voltage), the first rectifier element RE1 and the fourth rectifier element RE4 conduct.

In this case, since the voltage of the output terminal AG1 is higher than the high-potential terminal voltage VDD of the storage device 104, the generation current flows in a path "terminal AG1→first rectifier element RE1→power supply VDD→storage device 104→power supply VTKN→fourth rectifier element RE4", so as to charge the storage device 104.

Then, the first comparison result data DC11 output from the first comparator COMP1A becomes an "H" level.

As a result, the generation detected data DDET1 output from the OR circuit OR1 becomes an "H" level, indicating that charging has been detected.

Likewise, when the terminal voltage V2 of the output terminal AG2 becomes higher than the high-potential terminal voltage VDD of the storage device 104, the second rectifier element RE2 and the third rectifier element RE3 conduct.

In this case, when the voltage of the output terminal AG2 becomes higher than the high-potential terminal voltage VDD of the storage device 104, and further exceeds the second offset voltage VOS2 (=the high-potential terminal voltage VDD of the storage device 104+offset voltage), the generation current flows in a path "terminal AG2→second rectifier element RE2→power supply VDD→storage device 104→power supply VTKN→third rectifier element RE3", so as to charge the storage device 104.

Then, the second comparison result data DC2 output from the second comparator COMP2A becomes an "H" level.

As a result, the generation detected data DDET2 output from the OR circuit OR1 becomes an "H" level, indicating that charging has been detected.

Alternative methods for providing offset voltages, which obtain advantages similar to those discussed above, are below. An offset voltage may be subtracted from the output terminal voltage of the generator portion, and the resulting voltage may be input into the comparator and may be compared with the voltage of the high-potential power supply VDD of the storage device. Alternatively, in the comparator, one of the input voltages may be offset by an offset voltage. Or, the comparison level of the two input terminals may be offset by an offset voltage.

[11.2] Advantages of Eighth Embodiment

As described above, according to the eighth embodiment, a generation current of a certain level or higher is detected. Thus, the generation state can be detected more reliably, and measures are reliably taken to prevent adverse influences in the charging state, and also, unnecessary measures can be prevented, thereby making it possible to reduce power consumption.

The eighth embodiment is configured to detect the generation voltage, which can be achieved without influencing the generation current and the charging performance. This is different from a generation detecting method in which a resistor is inserted in the charging path. It is thus possible to perform the generation detecting operation at any time since the generation detecting operation does not lower the charging performance.

[12] NINTH EMBODIMENT

Figure 24:
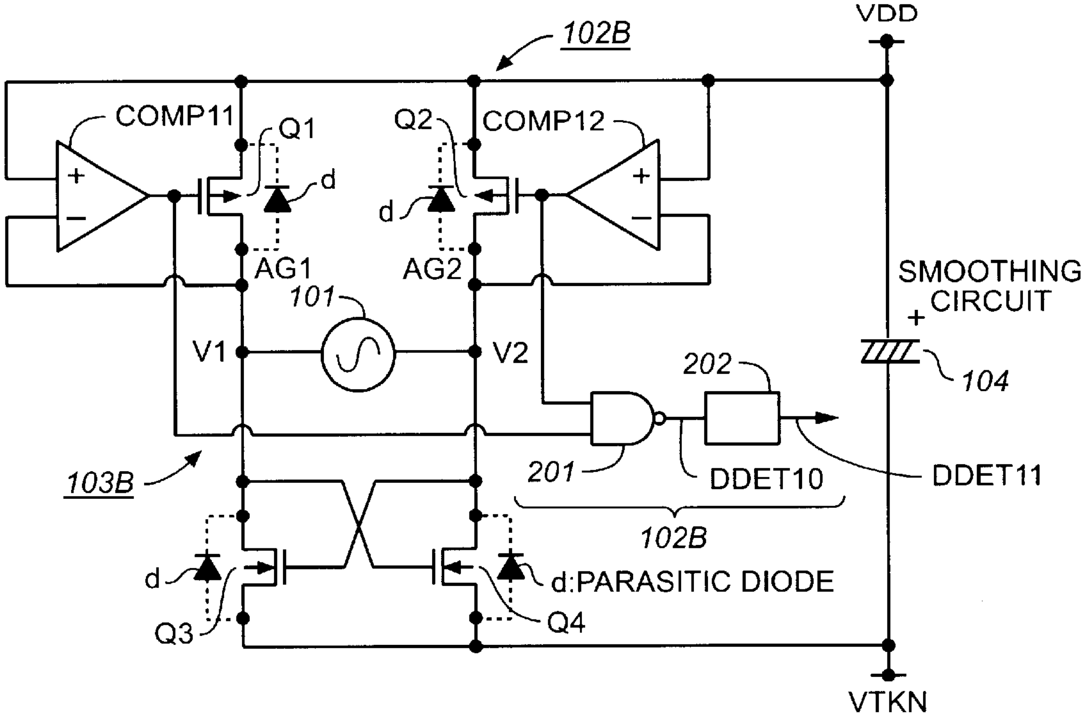
FIG. 24 illustrates the configuration of a generation detecting circuit of a ninth embodiment.
Figure 25:
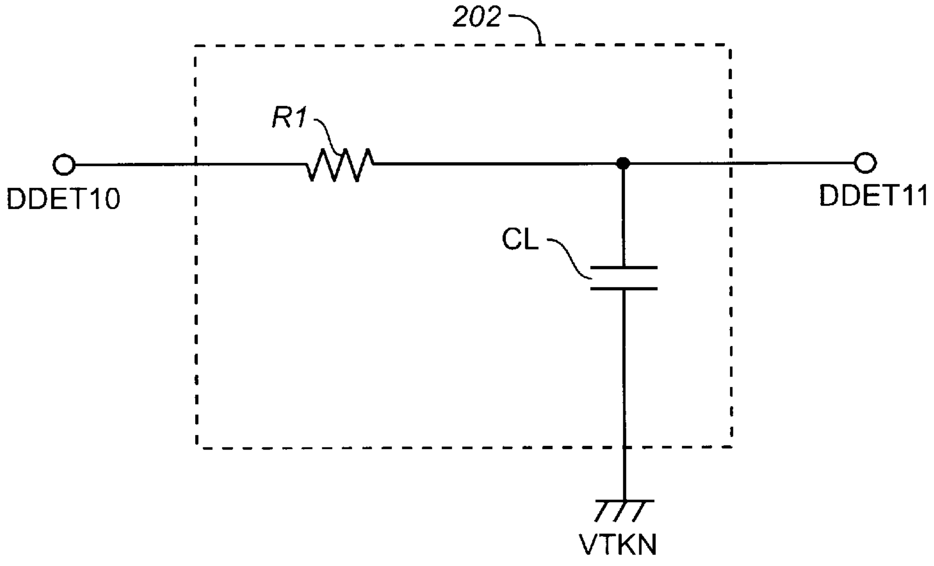
FIG. 25 illustrates an example of a smoothing circuit.
Figure 26:
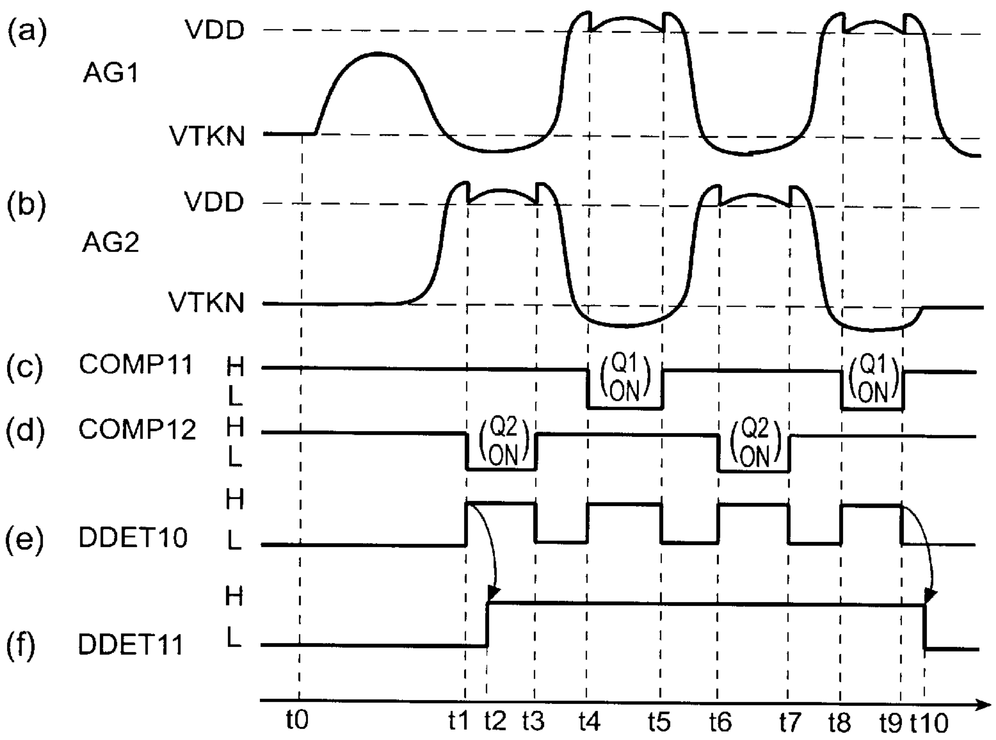
FIG. 26 is a timing chart illustrating the operation of the ninth embodiment.

A description is now given of a ninth embodiment indicating a more specific generation detecting circuit with reference to FIGS. 24 through 26.

[12.1] Configuration of Circuits Near Generation Detecting Circuit

FIG. 24 illustrates an example of the configuration of the circuits located near the generating detecting circuit according to the ninth embodiment.

FIG. 24 illustrates a generation detecting circuit 102B, and circuits located near the generating detecting circuit 102B, that is, a generator portion 101 for generating AC power, a rectifier circuit 103B for rectifying an alternating current output from the generator portion 101 and converting it into a direct current, and a storage device 104 for storing the direct current output from the rectifier circuit 103B.

The generation detecting circuit 102B is formed of: a NAND circuit 201 for computing a logical NAND of outputs of a first comparator COMP11 and a second comparator COMP12, which will be discussed below, and for outputting it as raw generation-detected data DDET10; and a smoothing circuit 202 for smoothing the output of the raw generation-detected data DDET10 by using an R-C integrating circuit and for outputting it as generation detected data DDET11.

The smoothing circuit 202 is formed of, as shown in FIG. 25, a resistor R1, and a capacitor C1 which is connected between the output terminal of the resistor R1 and the low-potential power supply VTKN.

The rectifier circuit 103B is formed of: the first comparator COMP11 for performing on/off control of a first transistor Q1 by comparing the voltage of one output terminal AG1 of the generator portion 101 with the reference voltage Vdd so as to allow the first transistor Q1 to perform active rectification; the second comparator COMP12 for turning on/off a second transistor Q2 alternately with the first transistor Q1 by comparing the voltage of the other output terminal AG2 of the generator portion 101 with the reference voltage Vdd so as to allow the second transistor Q2 to perform active rectification; a third transistor Q3 which is turned on when the terminal voltage V2 of the terminal AG2 of the generator portion 101 exceeds a predetermined threshold voltage; and a fourth transistor Q4 which is turned on when the terminal voltage V1 of the terminal AG1 of the generator portion 101 exceeds a predetermined threshold voltage.

Diodes d, which are connected in parallel with the first through fourth transistors used for rectification, are used for performing rectification when there is no power voltage sufficient for controlling the on/off state of the rectifying transistors Q1 through Q4. Schottky diodes may be externally connected, or parasitic diodes may be used to enable the integration of all the circuits.

[12.2] Charging Operation

The charging operation is first discussed.

When the generator portion 101 starts generating power, the generation voltage is supplied to both the output terminals AG1 and AG2. In this case, the phase of the terminal voltage V1 of the output terminal AG1 and the phase of the terminal voltage V2 of the output terminal AG2 are inverted with respect to each other.

When the terminal voltage V1 of the output terminal AG1 exceeds the threshold voltage, the fourth transistor Q4 is turned on. Thereafter, when the terminal voltage V1 increases and exceeds the voltage of the power supply VDD, the output of the first comparator COMP11 becomes an "L" level so as to turn on the first transistor Q1.

Meanwhile, since the terminal voltage V2 of the output terminal AG2 is lower than the threshold voltage, the third transistor Q3 is in the off state, and the terminal voltage V2 is lower than the power supply VDD. Thus, the output of the second comparator COMP12 is an "H" level, and the second transistor Q2 is in the off state.

Accordingly, while the first transistor Q1 is in the on state, the generation current flows in a path "terminal AG1→first transistor→power supply VDD→storage device 104→power supply VTKN→fourth transistor Q4", and the storage device 104 is charged.

Then, when the terminal voltage V1 of the output terminal AG1 drops and becomes lower than the voltage of the power supply VDD, the output of the first comparator COMP11 becomes an "H" level, thereby turning off the first transistor Q1. Accordingly, the terminal voltage V1 of the output terminal AG1 becomes below the threshold voltage of the fourth transistor Q4, and the fourth transistor Q4 is also turned off.

In contrast, when the terminal voltage V2 of the output terminal AG2 exceeds the threshold voltage, the third transistor Q3 is turned on. Then, when the terminal voltage V2 increases and exceeds the voltage of the power supply VDD, the output of the second comparator becomes an "L" level, thereby turning on the second transistor Q2.

Accordingly, while the second transistor Q2 is in the on state, the generation current flows in a path "terminal AG2→second transistor Q2→power supply VDD→storage device 104→power supply VTKN→third transistor Q3", and the storage device 104 is charged.

As stated above, when the generation current flows, the output of the first comparator COMP11 or the second comparator COMP12 is at an "L" level.

Thus, the NAND circuit 201 of the generation detecting circuit 102B computes a logical NAND of the outputs of the first comparator COMP11 and the second comparator COMP12, thereby outputting the "H"-level raw generation-detected data DDET10 to the smoothing circuit 202 while the generation current is flowing.

In this case, the output of the NAND circuit 201 contains switching noise, and thus, the smoothing circuit 202 smoothes the output of the NAND circuit 201 by using the R-C integrating circuit and outputs it as the generation detected data DDET11.

[12.2] Example of Specific Operation of Generating Detecting Circuit

The operation of the generating detecting circuit of the ninth embodiment is described below with reference to the timing chart of FIG. 26.

The generator portion 101 starts generating power at time t0, and when the voltage of the output terminal AG2 exceeds the voltage of the high-potential power supply VDD, the output of the second comparator COMP12 becomes an "L", thereby turning on the second transistor Q2.

Accordingly, as discussed above, the generation current flows in a path "terminal AG2→second transistor Q2→power supply VDD→storage device 104→power supply VTKN→third transistor Q3", and the storage device 104 is charged.

Meanwhile, at time t1, the voltage of the output terminal AG1 is still lower than the voltage of the low-potential power supply VTKN. Accordingly, the output of the first comparator COMP11 remains an "H".

As a result, one input terminal of the NAND circuit 201 is "L", while the other input terminal is an "H" level, whereby the raw generation-detected data DDET10 becomes an "H" level.

The "H"-level raw generation-detected data DDET10 input into the smoothing circuit 202 is smoothed, and at time t2, the generation detected data DDET11 is set to an "H" level, notifying that the storage device is in the charging state.

Thereafter, at time t3, the voltage of the output terminal AG2 becomes lower than the voltage of the high-potential power supply VDD. Then, the output of the second comparator COMP12 is again switched to an "H" level, and both the input terminals of the NAND circuit 201 become an "H" level.

As a result, the raw generation-detected data DDET10 becomes an "L" level. However, the generation detected data DDET11 is maintained at an "H" level because of the operation of the smoothing circuit 202.

At time t4, when the voltage of the output terminal AG1 exceeds the voltage of the high-potential power supply VDD, the output of the first comparator COMP1 becomes an "L" level so as to turn on the first transistor Q1.

Accordingly, as discussed above, the generation current flows in a path "terminal AG1→first transistor Q1→power supply VDD→storage device 104→power supply VTKN→fourth transistor Q4", and the storage device 104 is charged.

On the other hand, at time t4, since the voltage of the output terminal AG2 is lower than the voltage of the low-potential power supply VTKN, the output of the second comparator COMP12 still remains an "H".

As a result, one input terminal of the NAND circuit 201 is an "L", while the other input terminal is an "H", whereby the raw generation-detected data becomes an "H" level.

The "H"-level raw generation-detected data DDET10 input into the smoothing circuit 202 is smoothed, and the generation detected data DDET11 is maintained at an "H" level.

Thereafter, at time t5, the voltage of the output terminal AG1 becomes lower than the voltage of the high-potential power supply VDD. Then, the output of the first comparator COMP11 is again switched to an "H" level, and both the input terminals of the NAND circuit 201 become an "H" level.

As a result, the raw generation-detected data DDET10 becomes an "L" level. However, the generation detected data DDET11 is still maintained at an "H" level because of the operation of the smoothing circuit 202.

Subsequently, at time t6 through time t9, an operation similar to that performed at time t1 through time t5 is conducted.

In this case, the generation detected data DDET11 is maintained at an "H" level because of the operation of the smoothing circuit 202.

However, the generator portion 101 then discontinues generating power, and at time t10, the generation detected data DDET11 becomes an "L" level, notifying that charging has been discontinued.

[12.3] Advantages of Ninth Embodiment

As discussed above, according to the ninth embodiment, even in performing active rectification on the generated AC current, the charging state can be reliably detected.

Comparators used for active rectification can be also used as part of the generation detecting circuit, thereby enhancing the efficiency of the circuit.

[13] TENTH EMBODIMENT

According to a tenth embodiment, the generation detecting circuit of the present invention is applied to a voltage-doubler rectifier circuit.

[13.1] Configuration of Circuits Near Generation Detecting Circuit

Figure 27:
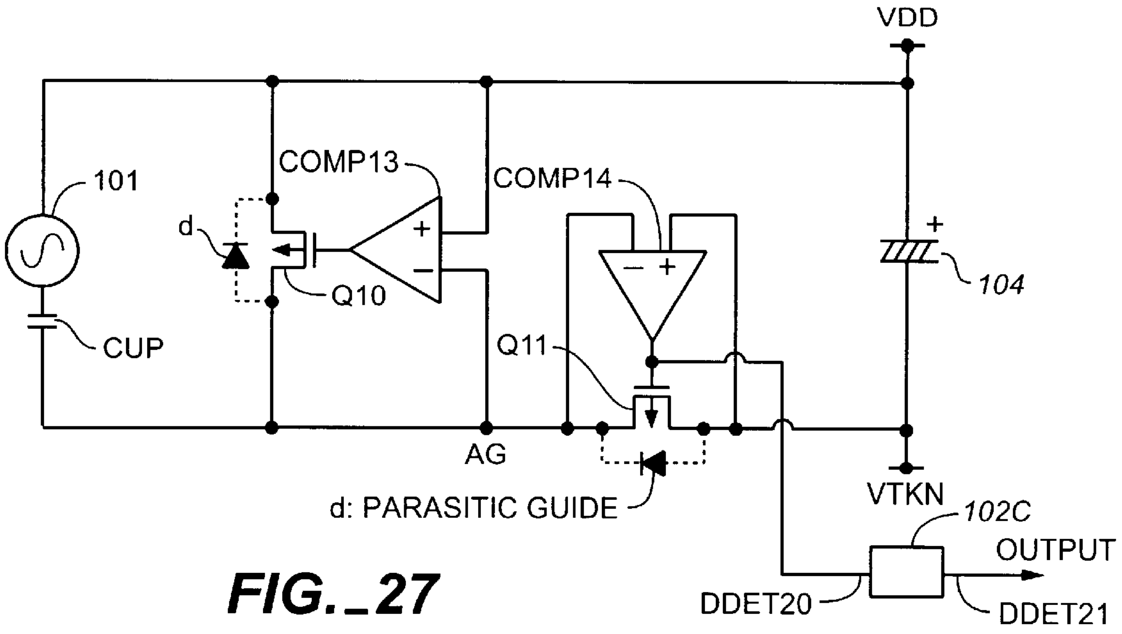
FIG. 27 illustrates the configuration of a generation detecting circuit of a tenth embodiment.

FIG. 27 illustrates an example of the configuration of the circuits located near the generating detecting circuit of the tenth embodiment.

FIG. 27 illustrates a generation detecting circuit 102C, and the peripheral circuits located near the generation detecting circuit 102, that is, a generator portion 101 for generating AC power, a step-up capacitor CUP for storing the alternating current output from the generator portion 101, a first transistor Q10 which is turned on so as to charge the step-up capacitor CUP, a comparator COMP13 for outputting an "L"-level output signal to turn on the transistor Q10 when the voltage of the output terminal AG of the step-up capacitor CUP exceeds the voltage of the high-potential power supply VDD of the storage device 104, a rectifier transistor Q11 which is turned on so as to charge the storage device 104, and a comparator COMP14 for outputting an "H"-level raw generation-detected signal DDET20 to turn on the rectifier transistor Q11 when the voltage of the output terminal AG of the step-up capacitor CUP becomes below the voltage of the low-potential power supply VTKN.

The generation detecting circuit 102C is configured similarly to the smoothing circuit 202 of the ninth embodiment, except for the time constant.

The configuration of the comparator COMP14 is discussed below with reference to FIG. 28.

Figure 28:
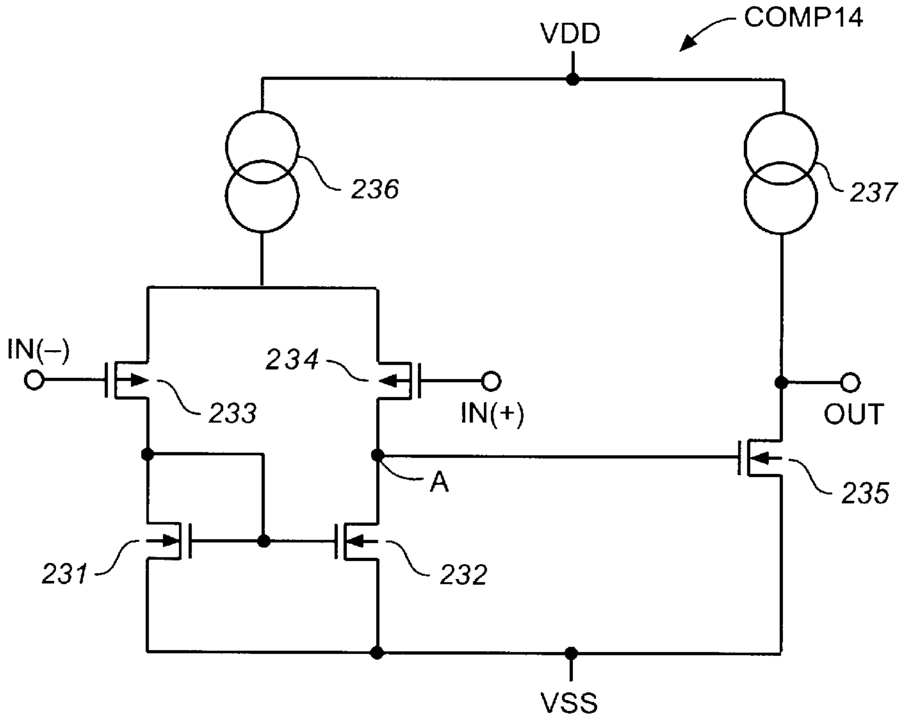
FIG. 28 illustrates the detailed configuration of a comparator according to the tenth embodiment.

The comparator COMP14 is formed of, as shown in FIG. 28, a pair of load transistors 231 and 232, a pair of input transistors 233 and 234, an output transistor 235, and constant-current sources 236 and 237. Among the above-mentioned elements, the load transistors 231 and 232 and the output transistor 235 are N-channel field effect transistors, while the input transistors 233 and 234 are P-channel field effect transistors. The gates of the input transistors 233 and 234 respectively serve as the negative input terminal (−) and the positive input terminal (+) of the comparator COMP14. The drain of the output transistor 235 serves as the output terminal OUT.

In this manner, the comparator COMP14 is totally opposite in polarity to the comparator COMP1 (COMP2A) (see FIG. 21) connected to the high-potential voltage Vdd. In this comparator COMP14, as well as in the comparator COMP1A (COMP2A), the threshold voltages Vth of the input transistors 233 and 234 may be varied so as to integrate offset-voltage addition circuits therein.

More specifically, the absolute value of the threshold voltage Vth of the transistor 233 at the negative input terminal (−) is set to be greater than that of the transistor 234 at the positive input terminal (+), thereby achieving advantages comparable to those obtained by the offset-voltage addition circuits OS1 and OS2 shown in FIG. 22. Methods for varying the threshold voltages Vth of the input transistors 233 and 234 are similar to those employed for the comparator COMP1A (COMP2A).

In this embodiment, as well as in the embodiment shown in FIG. 19, in performing full-wave rectification, a maximum voltage of about only (the voltage of the storage device 104+0.6 [V]) is generated at the output terminals AG1 and AG2 of the generator portion 101. Accordingly, devices having low breakdown voltages can be used as the comparator COMP14. Thus, the comparator COMP14 can be manufactured by an IC process, which is typically used for timepieces, thereby making it possible to miniaturize the circuit and reduce the cost.

[13.2] Charging Operation

Figure 29:
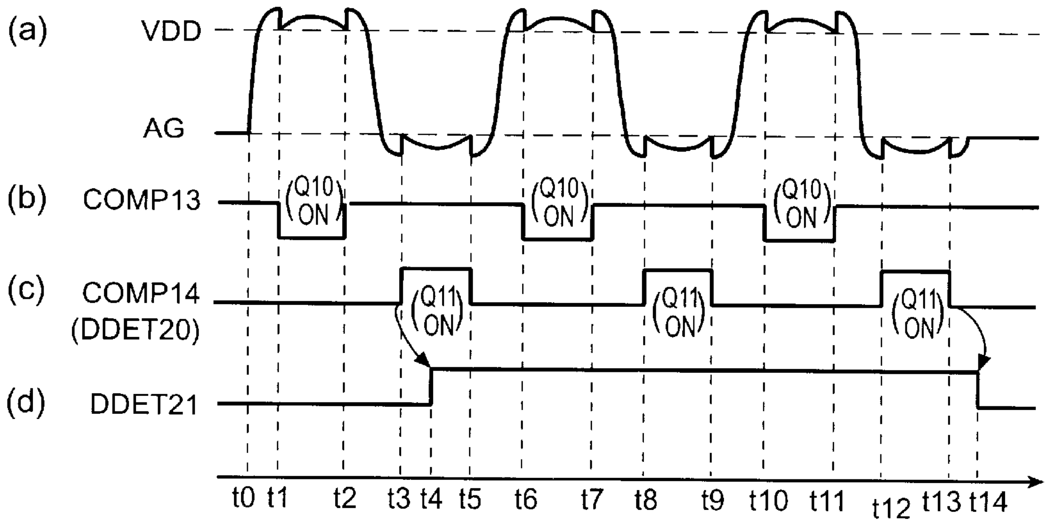
FIG. 29 is a timing chart illustrating the operation of the tenth embodiment.

The charging operation is first described with reference to the operation timing chart of FIG. 29.

The charging operation of the voltage-doubler rectifier circuit is largely formed of the charging operation of the step-up capacitor CUP and the charging operation of the storage device 104, which are sequentially described below.

In the initial state, it is determined that the voltage of the output terminal AG of the step-up capacitor CUP is lower than the voltage of the high-potential power supply VDD of the storage device 104 and is equal to or higher than the low-potential power supply VTKN of the storage device 104.

At time t0, the generator portion 101 starts generating. In the initial state, the voltage of the output terminal AG of the step-up capacitor CUP is lower than the voltage of the high-potential power supply VDD of the storage device 104 and is equal to or higher than the voltage of the low-potential power supply VTKN of the storage device 104. Thus, the comparator COMP13 outputs an "H"-level output signal, while the comparator COMP14 outputs the "L"-level raw generation-detected data DDET20.

Accordingly, at this point, the transistor Q10 is off, and the rectifier transistor Q11 is off.

At time t1, when the voltage of the output terminal AG exceeds the voltage of the high-potential power supply VDD of the storage device 104, the comparator COMP13 outputs an "L"-level output signal so as to turn on the transistor Q10.

As a result, the step-up capacitor CUP is charged.

At time t2, the voltage of the output terminal AG again becomes lower than the voltage of the high-potential power supply VDD of the storage device 104, the comparator COMP13 outputs an "H"-level output signal so as to turn off the transistor Q10. Thus, the charging operation of the step-up capacitor CUP is discontinued.

At time t3, when the voltage of the output terminal AG becomes lower than the voltage of the low-potential power supply VTKN, the comparator COMP14 outputs the "H"-level raw generation-detected data DDET20.

As a result, the rectifier circuit Q11 is turned on, and the generation current flows in a path "generator portion 101→storage device 104→rectifier transistor Q11→step-up capacitor CUP→generator portion 101". Thus, the storage device 104 is charged by a voltage double the generation voltage of the generator portion 101.

Since the "H"-level output signal is output by the comparator COMP14, at time t4, the generation detected data DDET21 is set to an "H" level.

Thereafter, at time t5, when the voltage of the output terminal AG exceeds the voltage of the low-potential power supply VTKN of the storage device 104, the raw generation-detected data DDET20 of the comparator COMP14 becomes an "L" level.

However, because of the smoothing operation of the generation detecting circuit 102C, the generation detected data DDET21 is still maintained at an "H" level.

Subsequently, at time t6 through time t9, an operation similar to that performed at time t1 through time t5 is performed.

In this case, because of the smoothing operation of the generation detecting circuit 102C, the generation detected data DDET21 is still maintained at an "H" level.

At time t10, when the voltage of the output terminal AG again exceeds the voltage of the high-potential power supply VDD of the storage device 104, the comparator COMP13 outputs the "L"-level output signal so as to turn on the transistor Q10. Thus, the step-up capacitor CUP is charged.

Then, at time t11, when the voltage of the output terminal AG again becomes lower than the voltage of the high-potential power supply VDD, the comparator COMP13 outputs the "H"-level output signal so as to turn off the transistor Q10. Thus, the charging operation of the step-up capacitor CUP is discontinued.

At time t12, when the voltage of the output terminal AG becomes lower than the voltage of the low-potential power supply VTKN of the storage device 104, the comparator COMP14 outputs the "H"-level raw generation-detected data DDET20.

As a result, the rectifier transistor Q11 is turned on, and the generation current flows in a path "generator portion 101→storage device 104→rectifier transistor Q11→step-up capacitor CUP→generator portion 101". Thus, the storage device 104 is charged by a voltage double the generation voltage of the generator portion 101.

Thereafter, at time t13, when the voltage of the output terminal AG exceeds the voltage of the low-potential power supply VTKN of the storage device 104, the raw generation-detected data DDET20 of the comparator COMP14 becomes an "L" level.

Then, however, the generator portion 101 discontinues generating power, and at time t14, the generation detected data DDET 21 becomes an "L" level, notifying that charging has been discontinued.

[13.3.] Advantages of Tenth Embodiment

As discussed above, according to the tenth embodiment, even in rectifying the generated AC current by a doubled voltage, the charging state can be reliably detected.

[14] ELEVENTH EMBODIMENT

An eleventh embodiment differs from the seventh through tenth embodiments in the following point. Power generation is detected by detecting a limiter current accompanied by the power generation during the operation of a limiter circuit, instead of detecting a generation current accompanied by the power generation.

Figure 30:
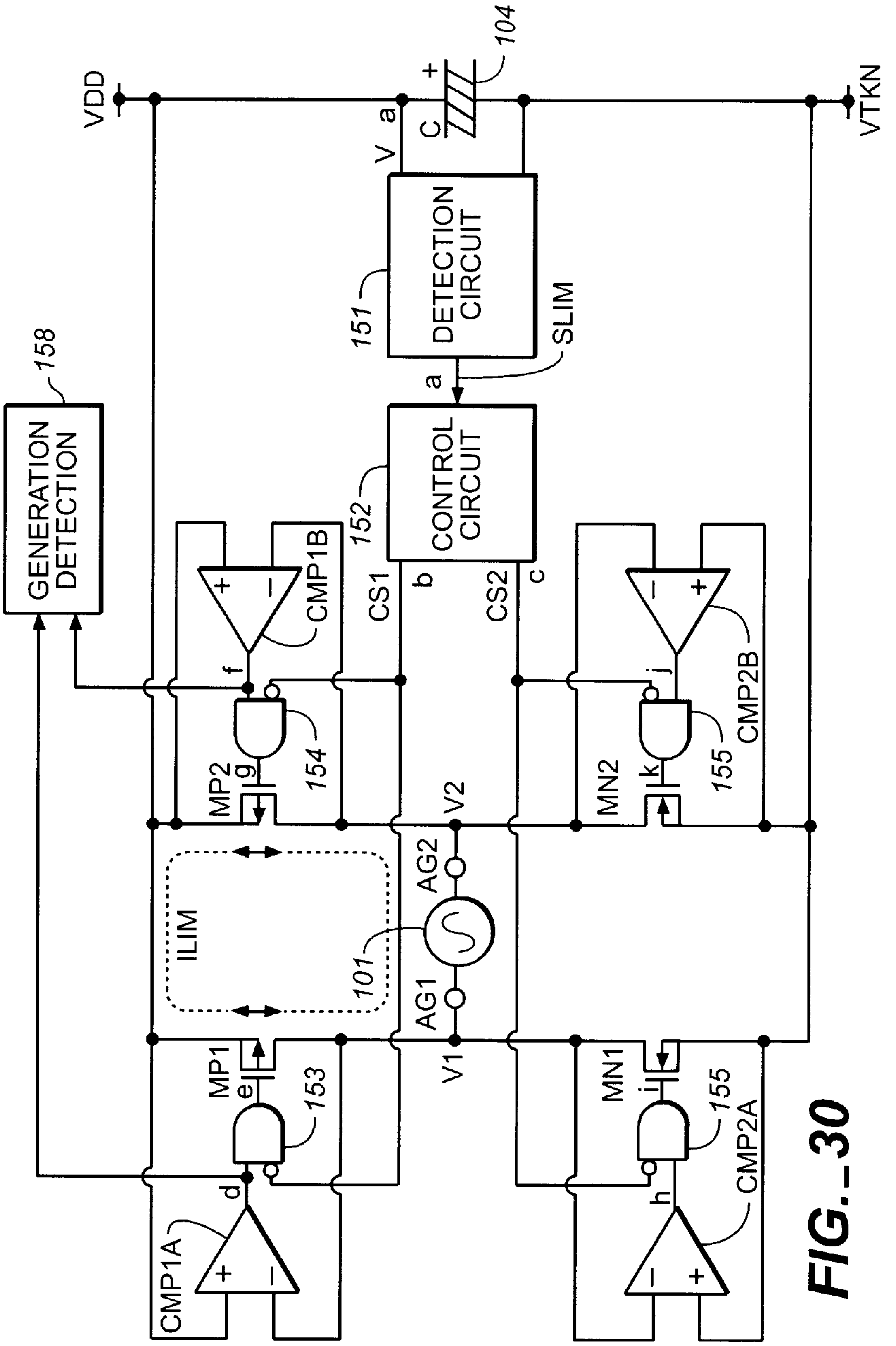
FIG. 30 is a block diagram illustrating the schematic configuration of an eleventh embodiment.

FIG. 30 illustrates the configuration of a charging circuit including a generation detecting circuit and a limiter circuit according to the eleventh embodiment.

In FIG. 30, the charging circuit is formed of: a detection circuit 151 which detects a charging voltage Va of the storage device (large-capacitance capacitor) 104 and compares the charging voltage Va with a reference voltage, and outputs a limiter signal SLIM for preventing overcharging when the charging voltage Va is equal to or higher than the predetermined voltage; a control circuit 152 for outputting, based on the limiter signal SLIM, a control signal CS1 which is obtained by delaying the rising timing of the limiter signal SLIM and a control signal CS2 which is obtained by delaying the falling timing of the limiter signal SLIM; a comparator CMP1A for outputting a comparison result signal d by comparing the voltage of the high-potential power supply VDD with terminal voltage V1 of the output terminal AG1 of the generator portion 101; a comparator CMP1B for outputting a comparison result signal f by comparing the voltage of the high-potential power supply VDD with the terminal voltage V2 of the output terminal AG2 of the generator portion 101; a comparator CMP2A for outputting a comparison result signal h by comparing the voltage of the low-potential power supply VTKN with the terminal voltage V1 of the output terminal AG1 of the generator portion 101; a comparator CMP2B for outputting a comparison result signal j by comparing the voltage of the low-potential power supply VTKN with the terminal voltage V2 of the output terminal AG2 of the generator portion 101; an AND circuit 153 for computing a logical AND of the control signal CS1 supplied to one inverting input terminal and the comparison result signal d supplied to the other input terminal so as to output a driving signal e; an AND circuit 154 for computing a logical AND of the control signal CS1 supplied to one inverting input terminal and the comparison result signal f supplied to the other input terminal so as to output a driving signal g; an AND circuit 155 for computing a logical AND of a control signal CS2 supplied to one inverting input terminal and a comparison result signal h supplied to the other input terminal so as to output a driving signal i; an AND circuit 156 for computing a logical AND of the control signal CS2 supplied to one inverting input signal and a comparison result signal j supplied to the other input terminal so as to output a driving signal k; a P-channel FETMP1 which is connected at its source to the high-potential power supply VDD and at its drain to the output terminal AG1 and which is controlled to be on/off by the driving signal e; a P-channel FETMP2 which is connected at its source to the high-potential power supply VDD and at its drain to the output terminal AG2 and which is controlled to be on/off by the driving signal g; an N-channel FETMN1 which is connected at its source to the low-potential power supply VSS and at its drain to the output terminal AG1 and which is controlled to be on/off by the driving signal i; an N-channel FETMN2 which is connected at its source to the low-potential power supply VSS and at its drain to the output terminal AG2 and which is controlled to on/off by the driving signal k; and a generation detecting circuit 158 for detecting power generation based on the comparison result signal d and the comparison result signal f.

The generation detecting operation is described below.

The control signal CS1 obtained by delaying the rising timing of the limiter signal SLIM is supplied to the inverting input terminals of the AND circuit 153 and the AND circuit 154, while the control signal CS2 obtained by delaying the falling timing of the limiter signal SLIM is supplied to the inverting input terminals of the AND circuit 155 and the AND circuit 156. Accordingly, the off time of the N-channel FETMN1 and MN2 is controlled to be longer than the on time of the P-channel FETMP1 and MP2.

More specifically, when the limiter signal SLIM becomes an "H" level, the N-channel FETMN1 and MN2 are first turned off, and then, the P-channel FETMP1 and MP2 are turned on.

Accordingly, in the state in which the limiter is on, the limiter current ILIM flows, as indicated by the broken lines shown in FIG. 39.

In this case, the terminal voltage range VRNG of the output terminals AG1 and AG2 of the generator device AG is expressed by:

$$VRNG=VDD\pm(ILIM\times RMPON)$$

where RMPON indicates the on resistance of the P-channel FETMP1 and MP2.

Accordingly, in the AC period of generation power, the outputs of the comparators CMP1A and CMP1B become an "L" level, thereby making it possible to detect power generation.

[15] TWELFTH EMBODIMENT

According to a twelfth embodiment, an amount-of-charging indicator function for indicating the amount of charging is implemented by using a generation detecting circuit.

Figure 31:
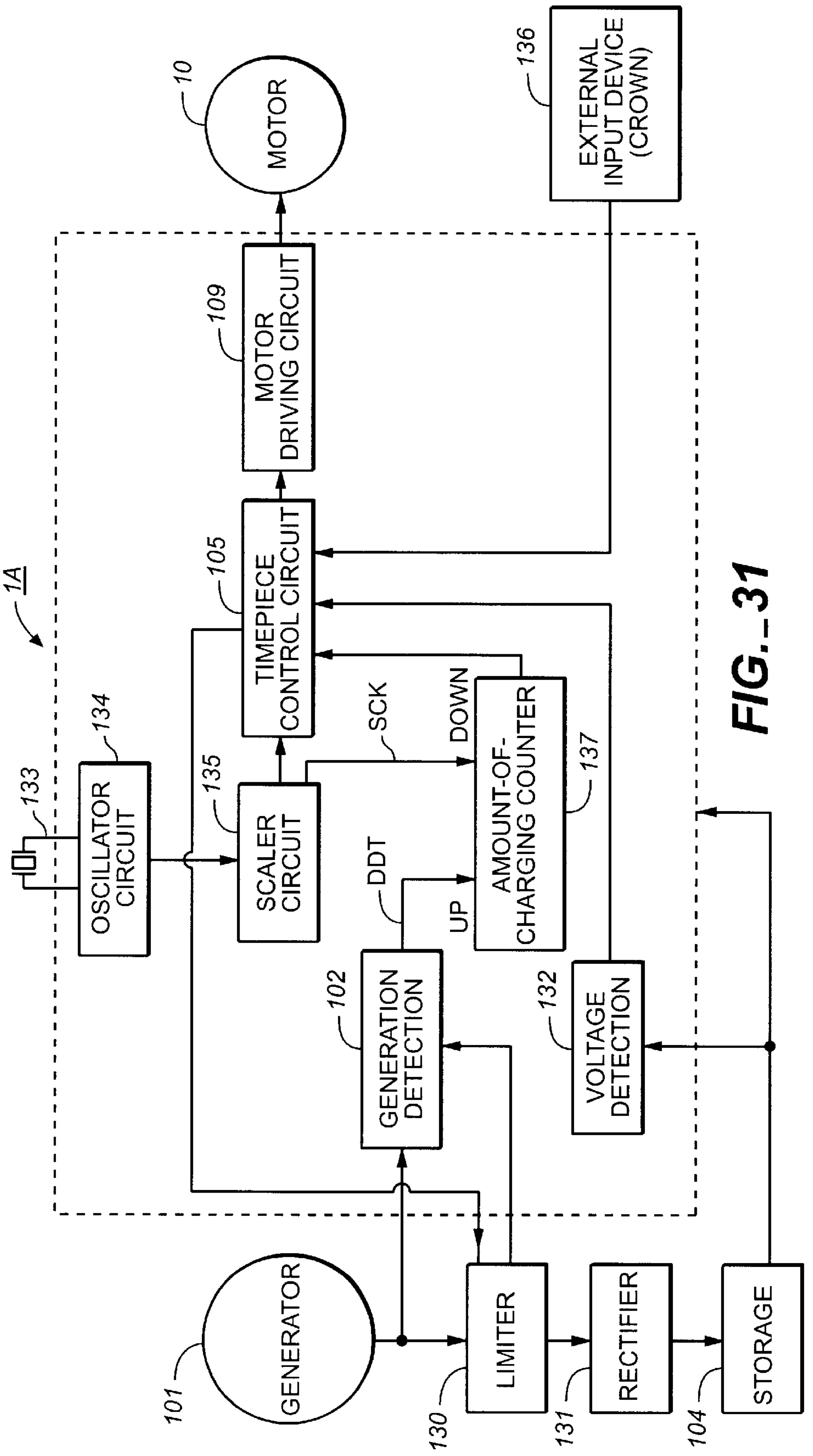
FIG. 31 is a block diagram illustrating the schematic configuration of a twelfth embodiment.

FIG. 31 is a block diagram schematically illustrating the configuration of the twelfth embodiment. In FIG. 31, the same elements as those shown in FIG. 18 are designated with like reference numerals.

A timepiece apparatus 1A of the twelfth embodiment is formed of: a generator portion 101 for generating AC power; a limiter circuit 130 for preventing an application of an excessive voltage of AC power generated by the generator portion 101 to a circuit at the subsequent stage; a rectifier circuit 131 for converting the alternating current into a direct current; a storage device 104 for storing the rectified power; a generation detecting circuit 102 for detecting whether power for charging the storage device 104 is generated in the generator portion 101 based on the generation state of the generator portion 101 and the operating state of the limiter circuit 130, and for outputting generation detected data DDT; a voltage detection circuit 132 for detecting a stored voltage of the storage device 104; an oscillator circuit 134 for oscillating a reference pulse of a stable frequency by using a reference oscillation source 133, such as a quartz oscillator; a scaler circuit 135 for combining a reference pulse with a scaled pulse obtained by scaling the reference pulse so as to generate a pulse signal having different pulse widths and timing, for example, a reference clock signal SCK; a timepiece control circuit 105 which is operated by electric energy stored in the storage device 104 and which outputs a motor driving pulse for performing timepiece control; a motor driving circuit 109 for outputting a driving signal for actually driving the pulse motor 10 based on the motor driving pulse; an external input device 136 for providing various instructions by a user; and an amount-of-charging counter 137, which serves as an up/down counter for counting the amount of charging, based on the generation detected data DDT and the reference clock signal SCK, for reporting the amount of charging of the storage device 104 to the user.

In this case, the generation detected data DDT corresponds to, for example, the raw generation-detected data DDET10 shown in FIG. 34.

The operation for implementing the amount-of-charging indicator function is discussed below.

When the generator portion 101 starts generating power, the generation detecting circuit 102 determines whether power for charging the storage device 104 is generated based on the generation state of the generator portion 101 and the operating state of the limiter circuit 130, and outputs the generation detected data DDT having a frequency corresponding to the generation period to the amount-of-charging counter 137.

Meanwhile, when the oscillator circuit 134 oscillates the reference pulse of a stable frequency by using the reference oscillation source 133, the scaler circuit 135 generates the reference clock signal SCK based on the reference pulse and the scaled pulse obtained by scaling the reference pulse, and outputs the reference clock signal SCK to the amount-of-charging counter 137.

Accordingly, the amount-of-charging counter 137 counts up by the generation detected data DDT and counts down by the reference clock signal SCK. The counted value is proportional to the amount of charging.

That is, a larger amount charging stored in the storage device increases the counted value, while a larger amount of discharging (proportional to the driving time of the timepiece apparatus) decreases the counted value.

As a result, by the operation of the external input device 136, the amount of charging can be reported to the user by, for example, forward-moving the seconds hand or by holding the seconds hand at a position in which the amount of charging is indicated for a predetermined time.

Alternatively, the amount-of-charging indicator may constantly indicate the amount of charging corresponding to the counted value of the amount-of-charging counter 137.

[16] ADVANTAGES OF SEVENTH THROUGH TWELFTH EMBODIMENTS

According to the foregoing seventh through twelfth embodiments, the charging state can be reliably detected in accordance with the actual charging state.

Thus, measures to prevent adverse influences on the driving of the motor caused by the electromagnetic noise level generated from the generator portion (generator) during the charging operation and to prevent adverse influences on the circuit operation caused by a change in the power supply voltage accompanied by a generation current due to the internal resistance of the secondary cell can be taken only when a large current flows, which may most probably cause the above-described adverse influences, i.e., when power is being generated while a current for charging the storage device flows. It is thus possible to inhibit an increase in the current consumption caused by excessively excising the above-mentioned measures, thereby making the driving time of the electronic apparatus longer.

The foregoing embodiments are configured to detect the generation voltage, which can be achieved without influencing the generation current or the generation performance. This is different from a generation detecting method in which a resistor is inserted in the charging path. It is thus possible to perform the generation detecting operation at any time since the generation detecting operation does not lower the charging performance.

[17] EXAMPLES OF MODIFICATIONS TO SEVENTH THROUGH TWELFTH EMBODIMENTS

[17.1] First Example of Modifications

In the foregoing seventh through twelfth embodiments, a timepiece apparatus for indicating time by driving analog hands is described as an example. It is however needless to say that the present invention is applicable to a digital timepiece apparatus for indicating time by an LCD.

[17.2] Second Example of Modifications

In the aforementioned seventh through twelfth embodiments, the watch-type timepiece apparatus 1 is described by way of example. However, the present invention is not restricted to a watch, and may be a portable pocket watch, a non-portable table clock, or a wall clock.

[17.3] Third Example of Modifications

In the seventh through twelfth embodiments, as the generator device 40, an electromagnetic generator device is used in which an oscillation movement of the oscillating weight 45 is conveyed to the rotor 43, and an electromotive force Vgen is generated in the output coil 44 by the rotation of the rotor 43. However, in the present invention, the generator device 40 is not limited to the above type, and may be, for example, a generator device which causes a rotational movement by resilience of a spring (corresponding to first energy) so as to generate an electromotive force, or a generator device which applies an externally induced or self-induced vibration or a displacement (corresponding to first energy) to a piezoelectric member so as to generate power by the piezoelectric effect.

Alternatively, a generator device which generates power by photoelectric conversion utilizing light energy, such as sun light (corresponding to first energy) may be used.

Alternatively, a generator device which generates power by thermal generation due to a temperature difference (thermal energy; corresponding to first energy) between a certain part and another part may be used.

Alternatively, an electromagnetic-induction-type generator device which receives floating electromagnetic waves, such as broadcast waves or communications waves and uses the electromagnetic energy (corresponding to first energy) may be used.

[17.4] Fourth Example of Modifications

Although in the foregoing seventh through twelfth embodiments the reference potential (GND) is set to Vdd (high potential), the reference potential (GND) may be set to VTKN (low potential).

[17.5] Fifth Example of Modifications

In the aforementioned seventh through twelfth embodiments, power generation is detected so as to prevent adverse influences on the electronic apparatus caused by power generation. However, the operation mode may be controlled by detecting power generation.

For example, in an electronic apparatus having a normal operation mode and a power-saving operation mode as the operation modes, when power generation is detected by the generation detecting device in the above-described embodiments, the operation mode may be shifted to the normal operation mode. When power generation is not detected by the generation detecting device, the operation mode may be shifted to the power-saving operation mode.

[18] OTHER ASPECTS OF SEVENTH THROUGH TWELFTH EMBODIMENTS

Other aspects of the foregoing seventh through twelfth embodiments may be as follows.

[18.1] First Example of Other Aspects

According to a first example of other aspects, in a generation detecting circuit, there are provided: a storage device for storing electric energy obtained by converting first energy in a generator device having a pair of output terminals; a comparator device (means) for outputting a comparison result signal by comparing the voltage of the output terminals of the generator device with a predetermined voltage corresponding to the terminal voltage of the storage device; and a generation detecting device (means) for outputting a detection signal indicating that a generation current flows when the voltage of the output terminals is found to exceed the terminal voltage of the storage device based on the comparison result signal.

[18.2] Second Example of Other Aspects

According to a second example of other aspects, in a generation detecting circuit for detecting whether power for charging a storage device is generated, the storage device being for storing electric energy obtained by converting first energy in a generator device, which is an alternating-current generator device having a first output terminal and a second output terminal, there are provided: a first comparator device (means) for outputting a first comparison result signal by comparing a first output terminal voltage, which is the terminal voltage of the first output terminal, with a predetermined voltage corresponding to the terminal voltage of the storage device; a second comparator device (means) for outputting a second comparison result signal by comparing a second output terminal voltage, which is the terminal voltage of the second output terminal, with a predetermined voltage corresponding to the terminal voltage of the storage device; and a generation detecting device (means) for outputting a detection signal indicating that a generation current flows when the first output terminal voltage or the second output terminal voltage is found to exceed the terminal voltage of the storage device based on the first comparison result signal and the second comparison result signal.

[18.3] Third Example of Other Aspects

According to a third example of other aspects, in a generation detecting circuit for detecting the generation state for charging a storage device for storing electric energy obtained by converting first energy in a generator device, there are provided: a step-up storage device connected to one output terminal of the generator device; a comparator device (means) for outputting a comparison result signal by comparing the stored voltage of the step-up storage device with a predetermined voltage corresponding to the terminal voltage of the storage device; and a generation detecting device (means) for outputting a detection signal indicating that a generation current flows when the output terminal voltage is found to exceed the predetermined voltage corresponding to the terminal voltage of the storage device based on the comparison result signal.

[18.4] Fourth Example of Other Aspects

According to a fourth example of other aspects, in the generation detecting circuit set forth in any one of the first through third examples of other aspects, the above-described comparator device (means) compares the offset voltage, which is obtained by offsetting one of the two input voltages by a predetermined amount, with the other voltage.

[18.5] Fifth Example of Other Aspects

According to a fifth example of other aspects, in the generation detecting circuit of the fourth example of other aspects, the predetermined voltage corresponding to the terminal voltage of the storage device is a voltage obtained by adding a predetermined offset voltage to the terminal voltage of the storage device.

[18.6] Sixth Example of Other Aspects

According to a sixth example of other aspects, in the generation detecting circuit according to the second or third example of other aspects, the above-described generation detecting device (means) includes an AND device (means) for outputting a logical AND of the first comparison result signal and the second comparison result signal as a raw generation-detection signal, and a smoothing device (means) for smoothing the raw generation-detection signal and outputting it as the above-described generation detection signal.

[18.7] Seventh Example of Other Aspects

According to a seventh example of other aspects, in the generation detecting circuit according to the second or third example of other aspects, the aforementioned generation detecting device (means) includes an OR device (means) for outputting a logical OR of the first comparison result signal and the second comparison result signal as a raw generation-detection signal, and a smoothing device (means) for smoothing the raw generation-detection signal and outputting it as the aforementioned generation-detection signal.

[18.8] Eighth Example of Other Aspects

According to an eighth example of other aspects, in the generation detecting circuit set forth in any one of the first through seventh examples of other aspects, the above-described generation current is a charging current for charging the storage device, and the generation detecting device (means) outputs the generation detection signal indicating the charging state when the voltage of the output terminals exceeds the terminal voltage of the storage device.

[18.9] Ninth Example of Other Aspects

According to a ninth example of other aspects, in the generation detecting circuit set forth in any one of the first through seventh examples of other aspects, there are provided: a stored-voltage detection device (means) for detecting the stored voltage of the storage device; and a closed-loop forming device (means) for forming a closed loop via a pair of input terminals by supplying the generation current flowing from one input terminal to the other input terminal via a bypassing circuit for bypassing the charging path to the storage device when the stored voltage detected by the stored-voltage detection device (means) exceeds a predetermined voltage. The generation current is a bypassing current flowing in the bypassing circuit, and the generation detecting device (means) outputs the generation detection signal indicating that the bypassing current flows when the above-described output terminal voltage exceeds the terminal voltage of the storage device.

[18.10] Tenth Example of Other Aspects

According to a tenth example of other aspects, in an electronic apparatus, there are provided: a generator device for converting first energy into electric energy; a storage device for storing the electric energy; a driven device (means) driven by the electric energy stored in the storage device, and the generation detecting circuit set forth in any one of the first through ninth examples of other aspects.

[18.11] Eleventh Example of Other Aspects

According to an eleventh example of other aspects, in the electronic apparatus set forth in the tenth example of other aspects, the aforementioned driven device (means) includes a timepiece device (means) for performing a timing operation.

[18.12] Twelfth Example of Other Aspects

According to a twelfth example of other aspects, in a generation detecting method, there are provided: a comparison step of comparing the voltage of a pair of output terminals of a generator device with a predetermined voltage corresponding to the terminal voltage of a storage device for storing electric energy obtained by converting first energy in the generator device; and a generation detection step of detecting that a generation current flows when the output terminal voltage is found to exceed the terminal voltage of the storage device based on a comparison result of the comparison step.

[18.13] Thirteenth Example of Other Aspects

According to a thirteenth example of other aspects, in the generation detecting method for detecting the generation state of a generator device, which is an alternating-current generator device having a first output terminal and a second output terminal, there are provided: a first comparison step of comparing a first output terminal voltage, which is the terminal voltage of the first output terminal, with a predetermined voltage corresponding to the terminal voltage of a storage device for storing electric energy obtained by converting first energy in the generator device; a second comparison step of comparing a second output terminal voltage, which is the terminal voltage of the second output terminal, with a predetermined voltage corresponding to the terminal voltage of the storage device; and a generation detection step of detecting a generation state when the first output terminal voltage or the second output terminal voltage is found to exceed the terminal voltage of the storage device based on the comparison results of the first comparison step and the second comparison step.

[18.14] Fourteenth Example of Other Aspects

According to a fourteenth example of other aspects, there are provided: a comparison step of comparing a predetermined voltage corresponding to the terminal voltage of a storage device for storing electric energy obtained by converting first energy in a generator device via a step-up storage device connected to one output terminal of the generator device with the stored voltage of the step-up storage device; and a generation detection step of detecting that a generation current flows when the output terminal voltage is found to exceed the predetermined voltage corresponding to the terminal voltage of the storage device based on the comparison result.

[18.15] Fifteenth Example of Other Aspects

According to a fifteenth aspect, in the generation detecting method set forth in any one of the twelfth through fourteenth examples of other aspects, the comparison step compares the offset voltage, which is obtained by offsetting one of the two input voltages by a predetermined amount, with the other voltage.

[18.16] Sixteenth Example of Other Aspects

According to a sixteenth example of other aspects, in the generation detecting method according to the fifteenth example of other aspects, the predetermined voltage corresponding to the terminal voltage of the storage device is a voltage obtained by adding a predetermined offset voltage to the terminal voltage of the storage device.

[18.17] Seventeenth Example of Other Aspects

According to a seventeenth example of other aspects, in the generation detection method set forth in any one of the twelfth through sixteenth examples of other aspects, the generation current is a charging current for charging the storage device, and the generation detection step detects a generation state when the voltage of the output terminals exceeds the terminal voltage of the storage device.

[18.18] Eighteenth Example of Other Aspects

According to an eighteenth example of other aspects, in the generation detecting method set forth in any one of the twelfth through seventeenth examples of other aspects, there are provided: a stored-voltage detection step of detecting a stored voltage of the storage device; and a closed-loop forming step of forming a closed loop via a pair of input terminals by supplying the generation current flowing from one input terminal to the other input terminal via a bypassing circuit for bypassing the charging path to the storage device when the stored voltage detected in the stored-voltage detection step exceeds a predetermined voltage. The generation current is a bypassing current flowing in the bypassing circuit, and the generation detection step detects that the bypassing current flows when the above-described output terminal voltage exceeds the terminal voltage of the storage device.

What is claimed is:

1. An electronic apparatus comprising:

power generating means for performing power generation;

storage means for storing electric energy generated by said power generating means;

at least one motor driven by the electric energy stored by said storage means;

pulse driving control means for controlling the driving of said at least one motor by outputting a normal driving-pulse signal;

power-generation magnetic-field detection means for detecting whether a magnetic field is generated by said power generation; and correcting-driving-pulse output means for outputting a correcting driving-pulse signal having an effective power larger than a normal driving-pulse signal to said motor when said power-generation magnetic-field detection means detects that the magnetic field is generated by said power generation, and wherein said power-generation magnetic-field detection means comprises charging-state determining means for detecting a charging current that flows from said power generating means into said storage means.

2. An electronic apparatus comprising:

power generating means for performing power generation;

storage means for storing electric energy generated by said power generating means;

at least one motor driven by the electric energy stored by said storage means;

pulse driving control means for controlling the driving of said at least one motor by outputting a normal driving-pulse signal;

power-generation magnetic-field detection means for detecting whether a magnetic field is generated by said power generation; and correcting-driving-pulse output means for outputting a correcting driving-pulse signal having an effective power larger than a normal driving-pulse signal to said motor when said power-generation magnetic-field detection means detects that the magnetic field is generated by said power generation, and wherein said power-generation magnetic-field detection means comprises overcharging-prevention-current generation determining means for determining that the magnetic field is generated by said power generation by detecting an overcharging-prevention current flowing into said power generating means when said storage means is in an overcharging-prevention state.

3. An electronic apparatus according to claim 1, wherein said power-generation magnetic-field detection means comprises generation-current determining means for determining whether a value of a generation current output from said power generating means exceeds a predetermined generation current value.

4. An electronic apparatus according to claim 1, wherein said power-generation magnetic-field detection means comprises stored-voltage determining means for calculating a stored voltage of said storage means based on a generation current output from said power generating means and for determining whether said stored voltage exceeds a predetermined reference stored voltage.

5. An electronic apparatus according to claim 1, wherein said power generating means comprises a pair of output terminals, and said electronic apparatus further comprises:

comparison means for outputting a comparison result signal by comparing a voltage of the output terminals of said power generating means with a predetermined voltage corresponding to a terminal voltage of said storage means; and power-generation detection means for outputting a power-generation detection signal indicating that a generation current flows when the voltage of said output terminals is found to exceed the terminal voltage of said storage means based on said comparison result signal.

6. An electronic apparatus according to claim 1, wherein said power-generation magnetic-field detection means determines via a path different from a charging path to said storage means whether the magnetic field is generated by said power generation, simultaneously with said charging.

7. An electronic apparatus according to claim 1 further comprising rotation detection means for detecting the presence or the absence of the rotation of said motor, and wherein said correcting-driving-pulse output means comprises first correcting-driving-pulse output means for outputting a first correcting driving pulse at a first timing when said rotation detection means detects that said motor is not being rotated, and second correcting-driving-pulse output means for outputting a second correcting driving pulse at a second timing, which is different from the first timing, when said power-generation magnetic-field detection means detects that the magnetic field is generated and when said rotation detection means detects that said motor is being rotated.

8. An electronic apparatus according to claim 1 further comprising rotation detection means for detecting the presence or the absence of the rotation of said motor, and wherein said correcting-driving-pulse output means comprises first correcting-driving-pulse output means for outputting a first correcting driving pulse having a first effective power when said rotation detection means detects that said motor is not being rotated, and second correcting-driving-pulse output means for outputting a second correcting driving pulse having a second effective power, which is larger than the first effective power, when said power-generation magnetic-field detection means detects that the magnetic field is generated by said power generation and said rotation detection means detects that said motor is being rotated.

9. An electronic apparatus according to claim 8, wherein the output timing of said first correcting driving pulse and the output timing of said second correcting driving pulse are the same output timing.

10. An electronic apparatus according to claim 1 wherein said correcting-driving-pulse output means outputs a correcting driving-pulse signal having an effective power larger than said normal driving-pulse signal to said motor during a predetermined period from the time when it is detected by said power-generation magnetic-field detection means that the magnetic field is generated by said power generation.

11. An electronic apparatus according to claim 1 further comprising:

rotation detection means for detecting the presence or the absence of the rotation of said motor; and rotation-detection inhibiting means for inhibiting the operation of said rotation detection means when said power-generation magnetic-field detection means detects that the magnetic field is generated by said power generation.

12. An electronic apparatus according to claim 1 further comprising rotation detection means for detecting the presence or the absence of rotation of said motor, and wherein said correcting-driving-pulse output means outputs the correcting driving-pulse signal to said motor when said power-generation magnetic-field detection means detects that the magnetic field is generated by said power generation and said rotation detection means detects either presence or absence of rotation of said motor.

13. An electronic apparatus according to claim 1 wherein said power-generation magnetic-field detection means detects whether the magnetic field is generated by said power generation during a predetermined period.

14. An electronic apparatus according to claim 13, wherein said predetermined period is set to be a period from the time when an output of a current normal driving-pulse signal is started by said pulse driving control means to when an output of a subsequent normal driving-pulse signal is started.

15. An electronic apparatus according to claim 13, wherein said predetermined period is set to include a period corresponding to a detection delay time of said power-generation magnetic-field detection means.

16. An electronic apparatus according to claim 1 wherein said correcting-driving-pulse output means outputs said correcting driving-pulse signal to said motor instead of said normal driving-pulse signal.

17. An electronic apparatus according to claim 7, wherein said first correcting driving pulse and said second correcting driving pulse are the same.

18. An electronic apparatus according to claim 7, wherein said power-generation magnetic-field detection means detects whether the magnetic field is generated by said power generation during a predetermined period, and also sets the start timing of said predetermined period to the rotation-detection start timing of said rotation detection means.

19. An electronic apparatus according to claim 18, wherein said predetermined period is set to include a period corresponding to a detection delay time of said power-generation magnetic-field detection means.

20. An electronic apparatus according to claim 1 further comprising high-frequency magnetic-field detection means for detecting a high-frequency magnetic field around said electronic apparatus, and wherein said correcting-driving-pulse output means outputs said correcting driving-pulse signal to said motor when said power-generation magnetic-field detection means detects that the magnetic field is generated by said power generation during said predetermined period and said high-frequency magnetic-field detection means detects either presence or absence of a high-frequency magnetic field around said electronic apparatus.

21. An electronic apparatus according to claim 1 further comprising alternating-current magnetic-field detection means for detecting an alternating-current magnetic field around said electronic apparatus, and wherein said correcting-driving-pulse output means outputs said correcting driving-pulse signal to said motor when said power-generation magnetic-field detection means detects that the magnetic field is generated by said power generation and said alternating-current magnetic-field detection means detects presence or absence of an alternating-current magnetic field around said electronic apparatus.

22. An electronic apparatus according to claim 1 further comprising:

external magnetic-field detection means for detecting a high-frequency magnetic field or an alternating-current magnetic field around said motor; and magnetic-field detection inhibiting means for inhibiting the operation of said external magnetic-field detection means when said power-generation magnetic-field detection means detects that the magnetic field is generated by said power generation.

23. An electronic apparatus according to claim 1 further comprising:

duty-ratio setting means for progressively lowering a duty ratio so as to reduce the effective power of said normal driving pulse based on the driving state of said motor and for setting a more preferable duty ratio; and duty-ratio control means for inhibiting said duty ratio from being changed by said duty-ratio setting means or for resetting said duty ratio to a predetermined initial duty ratio when said power-generation magnetic-field detection means detects that the magnetic field is generated by said power generation.

24. An electronic apparatus according to claim 1 wherein said electronic apparatus is a portable type.

25. An electronic apparatus according to claim 1 wherein said electronic apparatus further comprises timepiece means for performing a timing operation.

26. A control method for an electronic apparatus which comprises a generator device for performing power generation, a storage device for storing electric energy generated by said generator device, and a motor driven by the electric energy stored in said storage device, said control motor comprising:

controlling the driving of said motor by outputting a normal driving-pulse signal;

detecting whether a magnetic field is generated by said power generation; and outputting a correcting-driving-pulse signal having an effective power larger than said normal driving-pulse signal to said motor when a magnetic field generated by said power generation is detected, and wherein said magnetic-field detection comprises detecting a charging current that flows from said generator device into said storage device.

27. A control method for an electronic apparatus which comprises a generator device for performing power generation, a storage device for storing electric energy generated by said generator device, and a motor driven by the electric energy stored in said storage device, said control method comprising:

controlling the driving of said motor by outputting a normal driving-pulse signal;

detecting whether a magnetic field is generated by said power generation; and outputting a correcting-driving-pulse signal having an effective power larger than said normal driving-pulse signal to said motor when a magnetic field generated by said power generation is detected, and wherein said magnetic-field detection comprises detecting an overcharging-prevention current flowing into said power generator device when said storage device is in an overcharging-prevention state.

28. An electronic apparatus comprising:

a power generator that generates electric energy;

a storage device that stores electric energy generated by said power generator;

a motor driven by the electric energy stored by said storage device;

a pulse driving controller that controls the driving of said motor by outputting a normal driving-pulse signal;

a power-generation magnetic-field detector that detects whether a magnetic field is generated by generation of said electric energy; and a correcting-driving-pulse output unit that outputs a correcting driving-pulse signal having an effective power larger than a normal driving-pulse signal to said motor when said power-generation magnetic-field detector detects that the magnetic field is generated by said electric energy generation, and wherein said power-generation magnetic-field detector comprises a charging-state determining unit that detects a charging current flowing from said power generator into said storage device.

29. An electronic apparatus according to claim 28 wherein said power-generation magnetic-field detector comprises a generation-current determining unit that determines whether a value of a generation current output from said power generator exceeds a predetermined generation current value.

30. An electronic apparatus according to claim 28 wherein said power-generation magnetic-field detector comprises a stored-voltage determining unit that calculates a stored voltage of said storage device based on a generation current output from said power generator and that determines whether said stored voltage exceeds a predetermined reference stored voltage.

31. An electronic apparatus according to claim 28 wherein said power generator comprises a pair of output terminals, and said electronic apparatus further comprises:

a comparator that outputs a comparison result signal by comparing a voltage of the output terminals of said power generator with a predetermined voltage corresponding to a terminal voltage of said storage device; and a power-generation detection unit that outputs a power-generation detection signal indicating that a generation current flows when the voltage of said output terminals is found to exceed the terminal voltage of said storage device based on said comparison result signal.

32. An electronic apparatus according to claim 28 wherein said power-generation magnetic-field detector determines via a path different from a charging path to said storage device whether the magnetic field is generated by said power generator, simultaneously with said charging.

33. An electronic apparatus according to claim 28 further comprising a rotation detector that detects the presence or the absence of the rotation of said motor, and wherein said correcting-driving-pulse output unit comprises a first correcting-driving-pulse output unit that outputs a first correcting driving pulse at a first timing when said rotation detector detects that said motor is not being rotated, and a second correcting-driving-pulse output unit that outputs a second correcting driving pulse at a second timing, which is different from the first timing, when said power-generation magnetic-field detector detects that the magnetic field is generated and when said rotation detector detects that said motor is being rotated.

34. An electronic apparatus according to claim 28 further comprising a rotation detector that detects the presence or the absence of the rotation of said motor, and wherein said correcting-driving-pulse output unit comprises a first correcting-driving-pulse output unit that outputs a first correcting driving pulse having a first effective power when said rotation detector detects that said motor is not being rotated, and a second correcting-driving-pulse output unit that outputs a second correcting driving pulse having a second effective power, which is larger than the first effective power, when said power-generation magnetic-field detector detects that the magnetic field is generated by said power generator and said rotation detector detects that said motor is being rotated.

35. An electronic apparatus according to claim 34, wherein the output timing of said first correcting driving pulse and the output timing of said second correcting driving pulse are the same output timing.

36. An electronic apparatus according to claim 28 wherein said correcting-driving-pulse output unit outputs a correcting driving-pulse signal having an effective power larger than said normal driving-pulse signal to said motor during a predetermined period from the time when it is detected by said power-generation magnetic-field detector that the magnetic field is generated by said power generator.

37. An electronic apparatus according to claim 28 further comprising:

a rotation detector that detects the presence or the absence of the rotation of said motor; and a rotation-detection inhibiting unit that inhibits the operation of said rotation detector when said power-generation magnetic-field detector detects that the magnetic field is generated by said power generator.

38. An electronic apparatus according to claim 28 further comprising a rotation detector that detects the presence or the absence of rotation of said motor, and wherein said correcting-driving-pulse output unit outputs the correcting driving-pulse signal to said motor when said power-generation magnetic-field detector detects that the magnetic field is generated by said power generator and said rotation detector detects either presence or absence of rotation of said motor.

39. An electronic apparatus according to claim 28 wherein said power-generation magnetic-field detector detects whether the magnetic field is generated by said power generator during a predetermined period.

40. An electronic apparatus according to claim 39, wherein said predetermined period is set to be a period from the time when an output of a current normal driving-pulse signal is started by said pulse driving controller to when an output of a subsequent normal driving-pulse signal is started.

41. An electronic apparatus according to claim 39, wherein said predetermined period is set to include a period corresponding to a detection delay time of said power-generation magnetic-field detector.

42. An electronic apparatus according to claim 28 wherein said correcting-driving-pulse output unit outputs said correcting driving-pulse signal to said motor instead of said normal driving-pulse signal.

43. An electronic apparatus according to claim 33, wherein said first correcting driving pulse and said second correcting driving pulse are the same.

44. An electronic apparatus according to claim 33 wherein said power-generation magnetic-field detector detects whether the magnetic field is generated by said power generator during a predetermined period, and also sets the start timing of said predetermined period to the rotation-detection start timing of said rotation detector.

45. An electronic apparatus according to claim 33, wherein said predetermined period is set to include a period corresponding to a detection delay time of said power-generation magnetic-field detector.

46. An electronic apparatus according to claim 28 further comprising a high-frequency magnetic-field detector that detects a high-frequency magnetic field around said electronic apparatus, and wherein said correcting-driving-pulse output unit outputs said correcting driving-pulse signal to said motor when said power-generation magnetic-field detector detects that the magnetic field is generated by said power generator during said predetermined period and said high-frequency magnetic-field detector detects either presence or absence of a high-frequency magnetic field around said electronic apparatus.

47. An electronic apparatus according to claim 28 further comprising an alternating-current magnetic-field detector that detects an alternating-current magnetic field around said electronic apparatus, and wherein said correcting-driving-pulse output unit outputs said correcting driving-pulse signal to said motor when said power-generation magnetic-field detector detects that the magnetic field is generated by said power generator and said alternating-current magnetic-field detector detects presence or absence of an alternating-current magnetic field around said electronic apparatus.

48. An electronic apparatus according to claim 28 further comprising:

an external magnetic-field detector that detects a high-frequency magnetic field or an alternating-current magnetic field around said motor; and a magnetic-field detection inhibiting unit that inhibits the operation of said external magnetic-field detector when said power-generation magnetic-field detector detects that the magnetic field is generated by said power generator.

49. An electronic apparatus according to claim 28 further comprising:

a duty-ratio setting unit that progressively lowers a duty ratio so as to reduce the effective power of said normal driving pulse based on the driving state of said motor and that sets a more preferable duty ratio; and a duty-ratio controller that inhibits said duty ratio from being changed by said duty-ratio setting unit or that resets said duty ratio to a predetermined initial duty ratio when said power-generation magnetic-field detector detects that the magnetic field is generated by said power generator.

50. An electronic apparatus according to claim 28 wherein said electronic apparatus is a portable type.

51. An electronic apparatus according to claim 28 wherein said electronic apparatus further comprises a timepiece that performs a timing operation.

52. An electronic apparatus comprising:

a power generator that generates electric energy;

a storage device that stores said electric energy generated by said power generator;

at least one motor driven by the electric energy stored by said storage device;

a pulse driving controller that controls the driving of said at least one motor by outputting a normal driving-pulse signal;

a power-generation magnetic-field detector that detects whether a magnetic field is generated by said generation of said electric energy; and a correcting-driving-pulse output unit that outputs a correcting driving-pulse signal having an effective power larger than a normal driving-pulse signal to said at least one motor when said power-generation magnetic-field detector detects that the magnetic field is generated by said electric energy generation, and wherein said power-generation magnetic-field detector comprises an overcharging-prevention-current generation determining unit that determines that the magnetic field is generated by said electric energy generation by detecting an overcharging-prevention current flowing into said power generator when said storage device is in an overcharging-prevention state.

* * * * *

UNITED STATES PATENT AND TRADEMARK OFFICE

CERTIFICATE OF CORRECTION

PATENT NO. : 6,476,580 B1
DATED : November 5, 2002
INVENTOR(S) : Shinji Nakamiya et al.

It is certified that error appears in the above-identified patent and that said Letters Patent is hereby corrected as shown below:

Title page,
Item [56], please add:

-- U.S. PATENT DOCUMENTS 2001-0005895, 06/2001, Shimura et al.
6,278,663, 08/2001, Okeya et al.
6,262,554, 07/2001, Kojima et al.
6,194,862, 02/2001, Hara
6,163,126, 12/2000, Kojima et al.
6,137,252, 10/2000, Kojima et al.
6,108,279, 08/2000, Hara
5,982,134, 11/1999, Tanaka
5,889,736, 03/1999, Fujita et al.
5,889,734, 03/1999, Sato --.

Signed and Sealed this

Seventeenth Day of June, 2003

JAMES E. ROGAN
*Director of the United States Patent and Trademark Office*